United States Patent
Oh et al.

(10) Patent No.: US 10,694,259 B2
(45) Date of Patent: Jun. 23, 2020

(54) BROADCAST TRANSMISSION DEVICE, BROADCAST RECEPTION DEVICE, OPERATING METHOD OF BROADCAST TRANSMISSION DEVICE, AND OPERATING METHOD OF BROADCAST RECEPTION DEVICE

(71) Applicant: LG ELECTRONICS INC., Seoul (KR)

(72) Inventors: Sejin Oh, Seoul (KR); Woosuk Ko, Seoul (KR); Woosuk Kwon, Seoul (KR); Jangwon Lee, Seoul (KR); Sungryong Hong, Seoul (KR); Kyoungsoo Moon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 130 days.

(21) Appl. No.: 15/303,448

(22) PCT Filed: Apr. 9, 2015

(86) PCT No.: PCT/KR2015/003583
§ 371 (c)(1),
(2) Date: Oct. 11, 2016

(87) PCT Pub. No.: WO2015/156625
PCT Pub. Date: Oct. 15, 2015

(65) Prior Publication Data
US 2017/0034588 A1 Feb. 2, 2017

Related U.S. Application Data

(60) Provisional application No. 61/977,593, filed on Apr. 9, 2014, provisional application No. 61/981,210, filed
(Continued)

(51) Int. Cl.
*H04N 21/242* (2011.01)
*H04N 21/643* (2011.01)
(Continued)

(52) U.S. Cl.
CPC ..... *H04N 21/64322* (2013.01); *H04L 45/745* (2013.01); *H04L 61/2592* (2013.01);
(Continued)

(58) Field of Classification Search
CPC .................................. H04N 21/2442
(Continued)

(56) References Cited

U.S. PATENT DOCUMENTS 7,383,209 B2 * 6/2008 Hudetz ............... G06Q 20/208
705/26.61
9,712,874 B2 7/2017 Kim et al.
(Continued)

FOREIGN PATENT DOCUMENTS

CN 103181181 A 6/2013
CN 103329551 A 9/2013
(Continued)

OTHER PUBLICATIONS

ETSI, "Digital Video Broadcasting (DVB); Frame structure channel coding and modulation for a second generation digital terrestrial television broadcasting system (DVB-T2)," Final draft ETSI EN 302 755 V1.3.1, Nov. 2011, pp. 1-189.
(Continued)

*Primary Examiner* — Mushfikh I Alam
(74) *Attorney, Agent, or Firm* — Birch, Stewart, Kolasch & Birch, LLP

(57) ABSTRACT

An operating method of a broadcast reception device, according to an embodiment of the present invention includes receiving a broadcast signal; receiving media content presentation information including information neces-
(Continued)

sary to present media content based on the broadcast signal; and presenting the media content based on the media content presentation information.

6 Claims, 113 Drawing Sheets

Related U.S. Application Data on Apr. 18, 2014, provisional application No. 61/983,436, filed on Apr. 23, 2014.

(51) Int. Cl.
| | |
|---|---|
| *H04N 21/845* | (2011.01) |
| *H04N 21/262* | (2011.01) |
| *H04L 12/741* | (2013.01) |
| *H04L 29/12* | (2006.01) |
| *H04L 29/06* | (2006.01) |
| *H04L 29/08* | (2006.01) |
| *H04N 21/2362* | (2011.01) |
| *H04N 21/434* | (2011.01) |
| *H04N 21/84* | (2011.01) |

(52) U.S. Cl.
CPC ............ *H04L 65/608* (2013.01); *H04L 67/02* (2013.01); *H04N 21/2362* (2013.01); *H04N 21/26258* (2013.01); *H04N 21/4345* (2013.01); *H04N 21/84* (2013.01); *H04N 21/8456* (2013.01)

(58) Field of Classification Search
USPC .................................................. 725/74–104
See application file for complete search history.

(56) References Cited

U.S. PATENT DOCUMENTS

| | | | |
|---|---|---|---|
| 9,807,452 B2* | 10/2017 | Freeman | H04N 21/4385 |
| 2009/0165050 A1* | 6/2009 | Lee | H04N 21/235 |
| | | | 725/39 |
| 2010/0134701 A1* | 6/2010 | Eyer | H04N 21/235 |
| | | | 348/731 |
| 2011/0131464 A1* | 6/2011 | Ko | H04L 1/0041 |
| | | | 714/752 |
| 2011/0274204 A1* | 11/2011 | Ko | H04L 1/0057 |
| | | | 375/295 |
| 2012/0023251 A1 | 1/2012 | Pyle et al. | |
| 2012/0023253 A1* | 1/2012 | Rhyu | H04L 65/4069 |
| | | | 709/231 |
| 2012/0042335 A1 | 2/2012 | Hwang et al. | |
| 2012/0257586 A1* | 10/2012 | Mourad | H04H 20/16 |
| | | | 370/329 |
| 2012/0314762 A1 | 12/2012 | Herrmann et al. | |
| 2013/0124749 A1* | 5/2013 | Thang | H04L 65/4092 |
| | | | 709/231 |
| 2013/0247118 A1* | 9/2013 | Oyman | H04W 72/0413 |
| | | | 725/109 |
| 2013/0291040 A1* | 10/2013 | Rhyu | H04N 21/4622 |
| | | | 725/109 |
| 2013/0293677 A1* | 11/2013 | Lee | H04N 13/0059 |
| | | | 348/43 |
| 2014/0010154 A1* | 1/2014 | Hong | H04B 7/10 |
| | | | 370/328 |
| 2014/0059180 A1 | 2/2014 | Giladi | |
| 2014/0245359 A1* | 8/2014 | De Foy | H04W 36/0011 |
| | | | 725/62 |
| 2014/0351876 A1* | 11/2014 | Kano | H04N 21/4122 |
| | | | 725/133 |
| 2015/0256861 A1* | 9/2015 | Oyman | H04N 21/2343 |
| | | | 725/62 |
| 2016/0127756 A1* | 5/2016 | Oh | H04N 21/4345 |
| | | | 725/110 |
| 2016/0218883 A1* | 7/2016 | Lee | H04L 67/06 |
| 2017/0019431 A1 | 1/2017 | Kitahara et al. | |
| 2017/0055024 A1* | 2/2017 | Kitazato | H04N 21/8586 |
| 2017/0104803 A1* | 4/2017 | Giladi | H04L 65/601 |
| 2017/0134824 A1 | 5/2017 | Kitazato et al. | |

FOREIGN PATENT DOCUMENTS

| | | | |
|---|---|---|---|
| KR | 10-2012-0034550 A | 4/2012 | |
| KR | 10-1215232 B1 | 12/2012 | |
| KR | 10-1220785 B1 | 1/2013 | |
| WO | WO 2010/078281 A2 | 7/2010 | |
| WO | WO 2012/011735 A2 | 1/2012 | |
| WO | WO 2013/089437 A1 | 6/2013 | |
| WO | WO 2014/031885 A1 | 2/2014 | |
| WO | WO-2014171718 A1 * | 10/2014 | ......... H04N 21/4345 |
| WO | WO 2015/115253 A1 | 8/2015 | |
| WO | WO 2015/137149 A1 | 9/2015 | |
| WO | WO 2015/156150 A1 | 10/2015 | |

OTHER PUBLICATIONS

Köhnen et al., "A DVB/IP streaming testbed for hybrid digital media content synchronization," 2012 IEEE International Conference on Consumer Electronics-Berlin (ICCE-Berlin), Sep. 3, 2012, 5 pages.

Le Feuvre et al., "Extensions for Hybrid Delivery using MPEG-2 TS and DASH," Telecom ParisTech, ISO/IEC JTC1/SC29/WG11 MPEG2012/M26903, Shanghai, China, Oct. 15-19, 2012, 5 pages.

Le Feuvre et al., "Improvements to 13818-1 AMD6," Telecom ParisTech, TVN on behalf of the H2B2VS project, ISO/IEC JTC1/SC29/WG11 MPEG2014/M32287, San Jose, USA, Jan. 13-17, 2014 (retrieved on Jan. 8, 2014), 7 pages.

Le Feuvre et al., "On Hybrid Delivery," Telecom ParisTech, ISO/IEC JTC1/SC29/WG11 MPEG2012/M28136, Geneva, Jan. 21-25, 2013 (retrieved on Jan. 16, 2013), 4 pages.

* cited by examiner

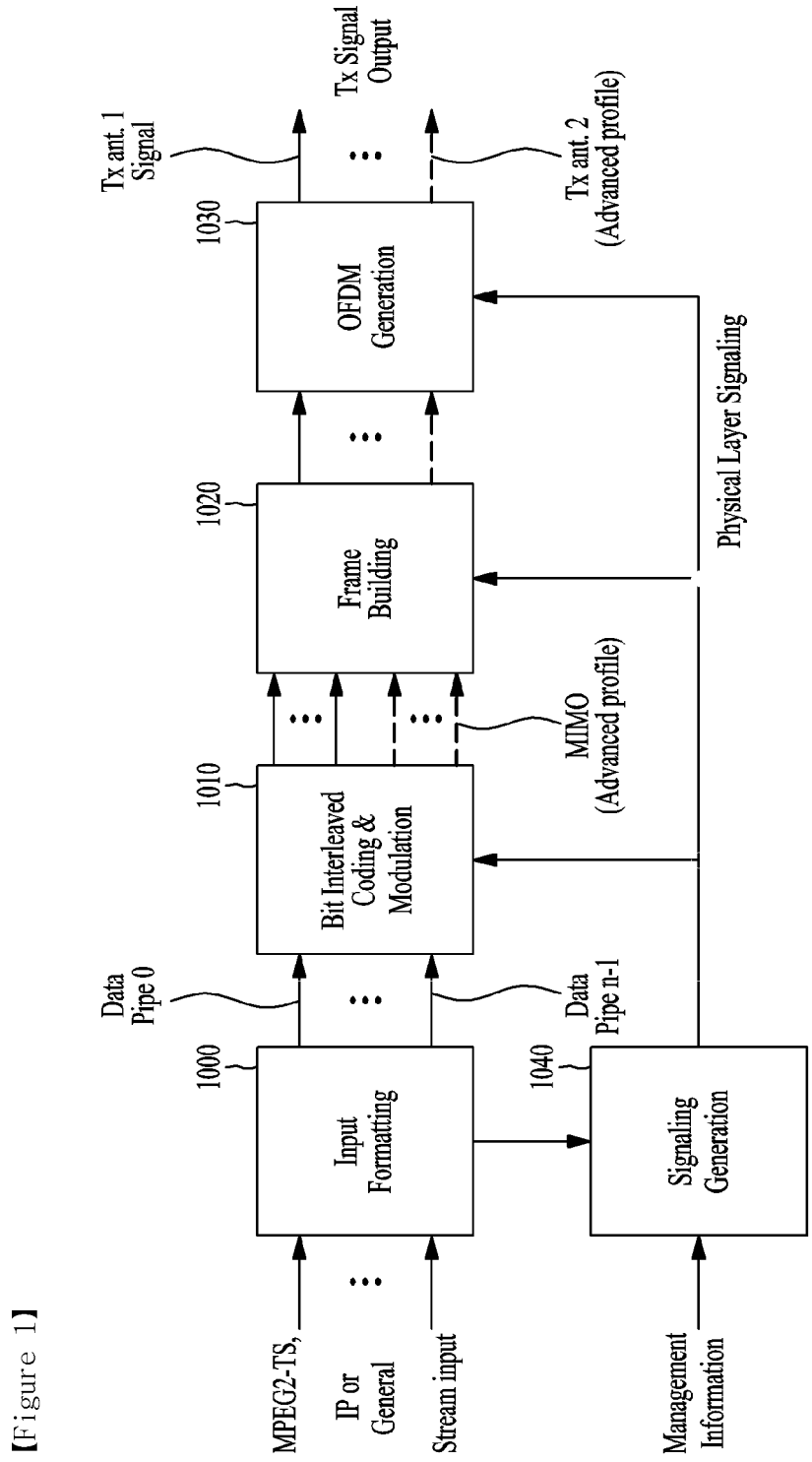
[Figure 1]

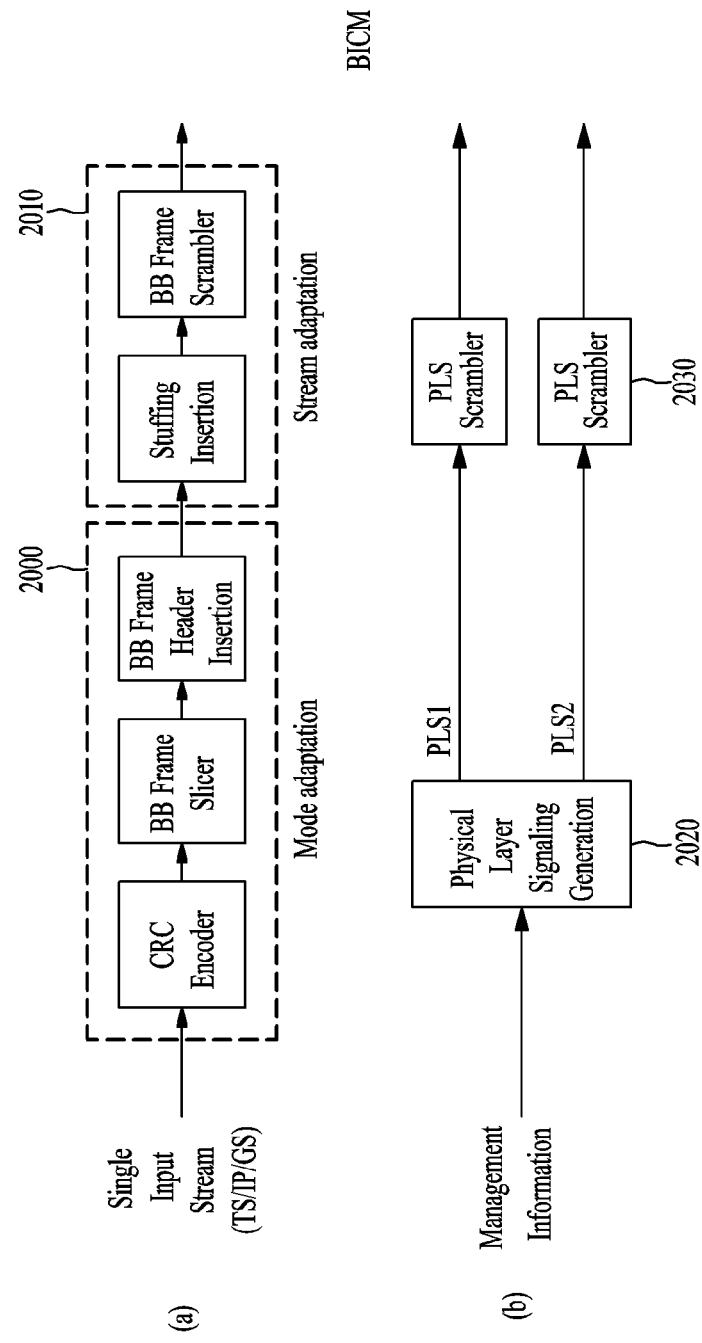
[Figure 2]

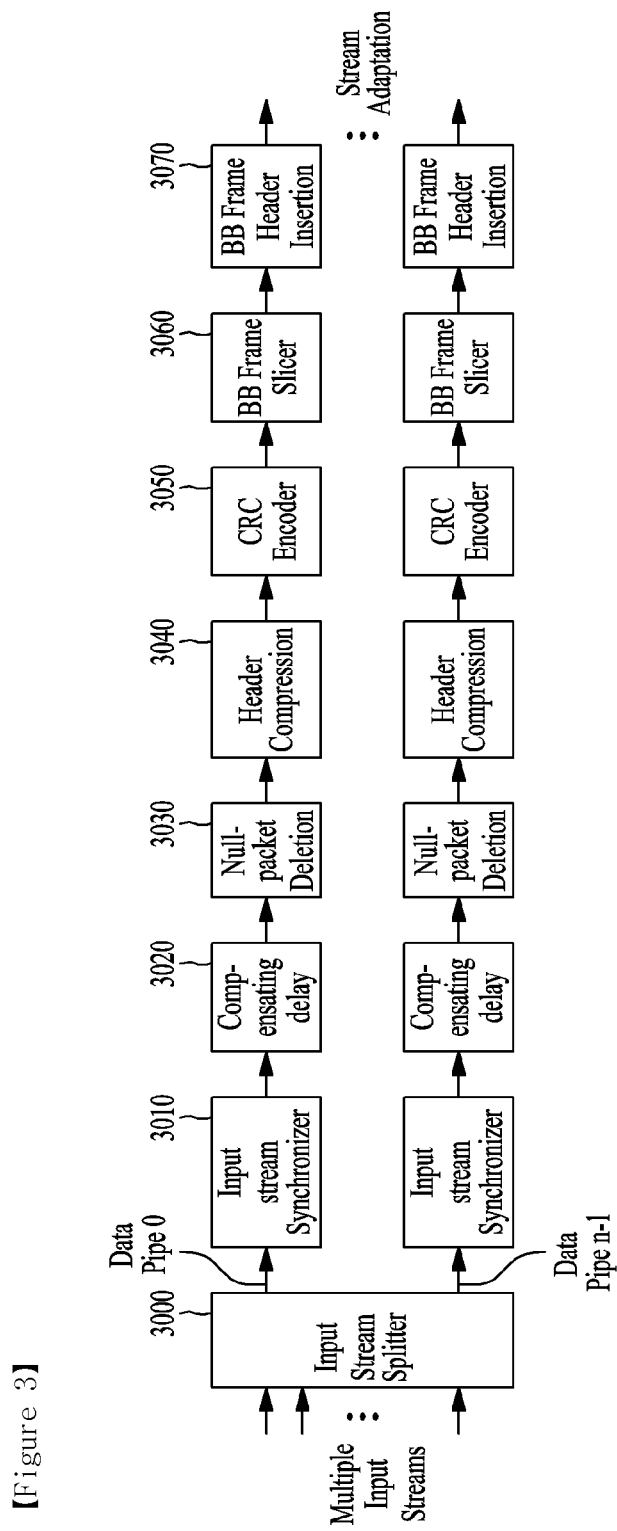
[Figure 3]

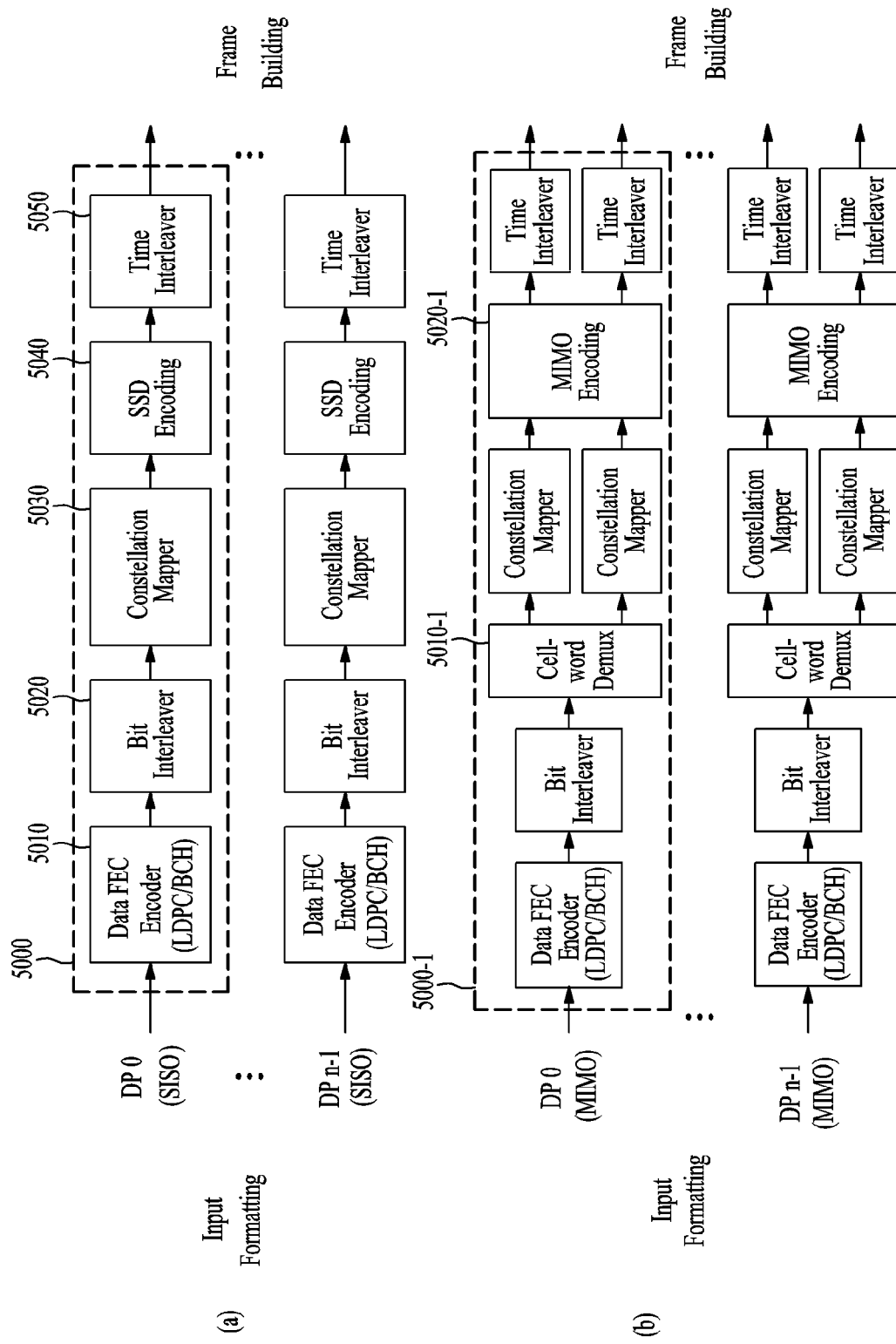
[Figure 4]

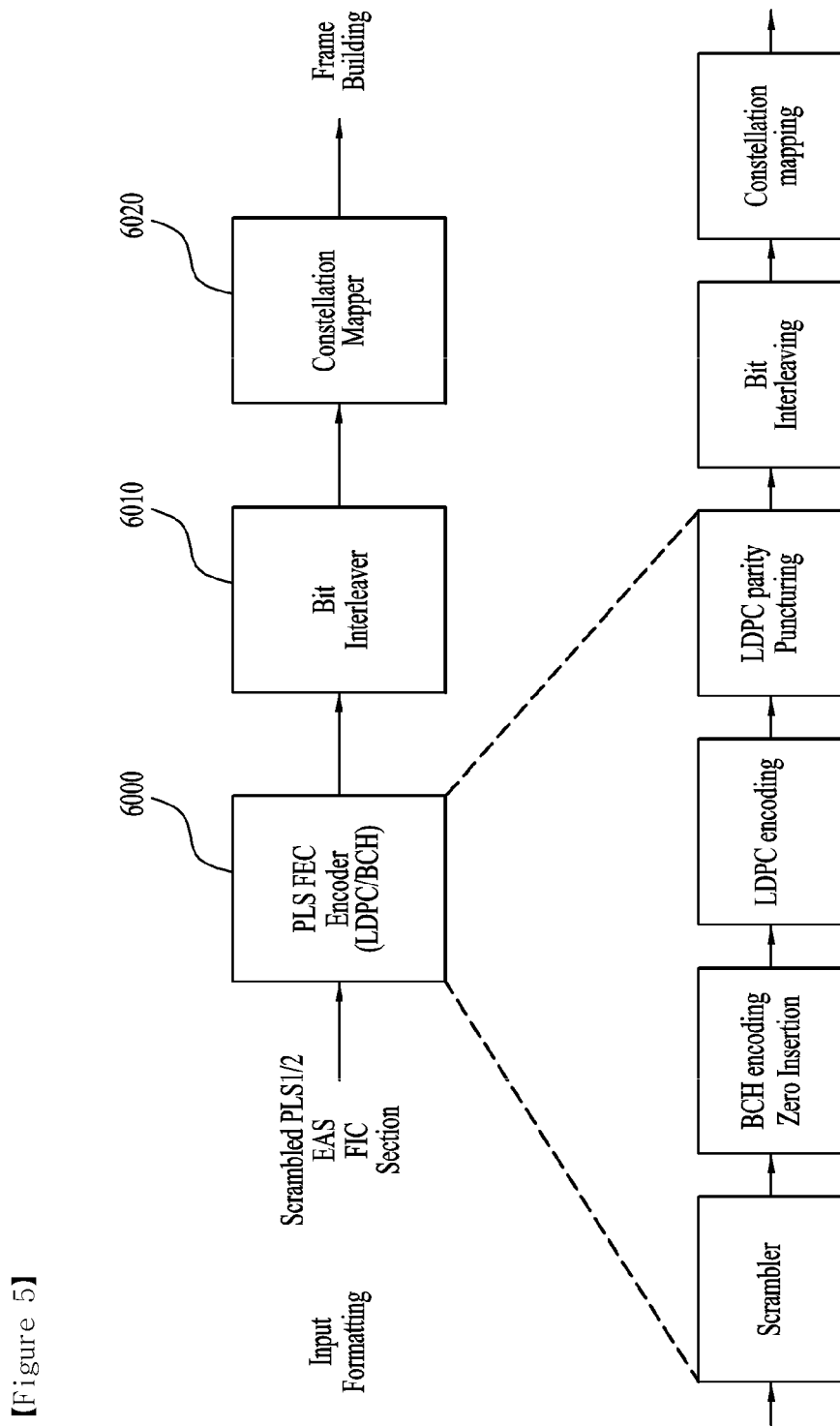
[Figure 5]

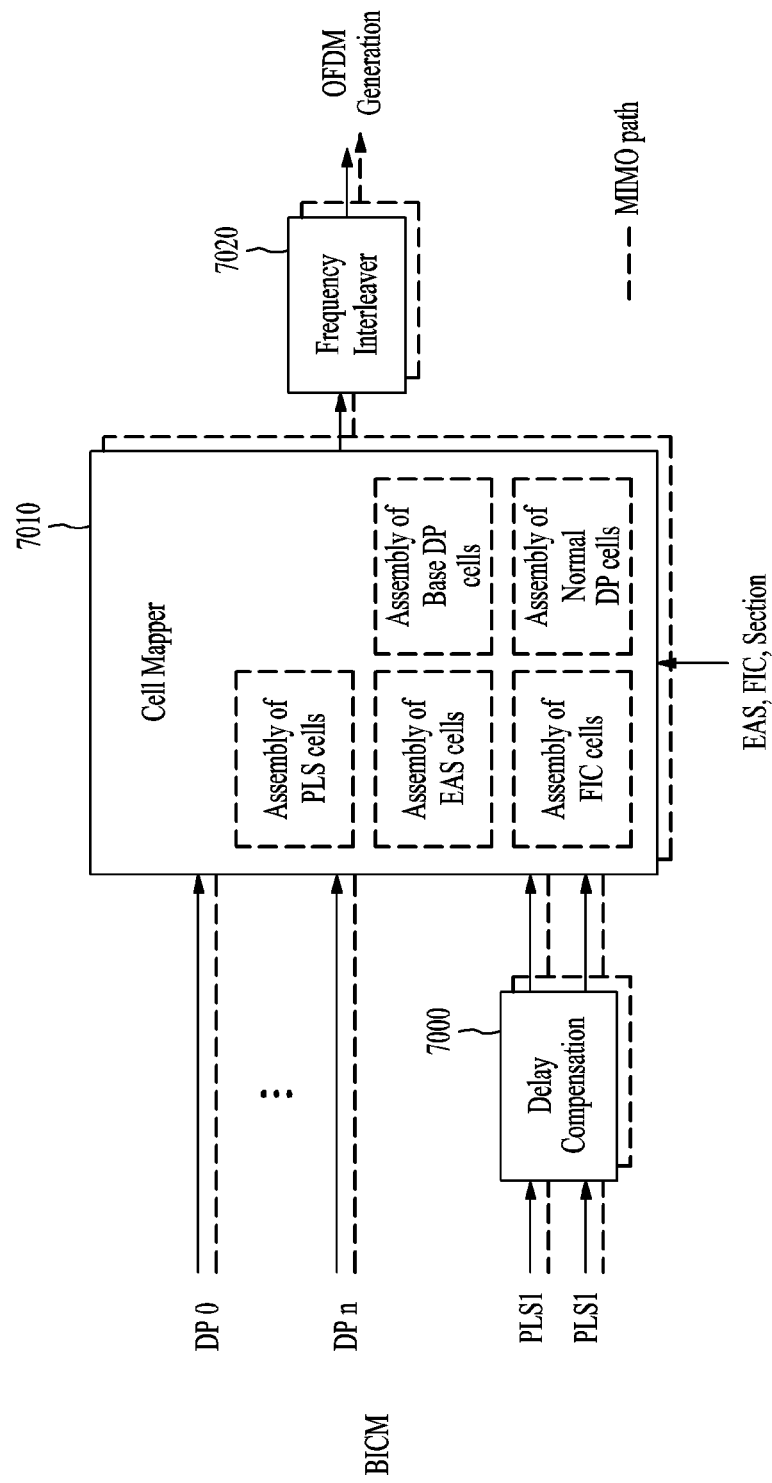
[Figure 6]

[Figure 7]
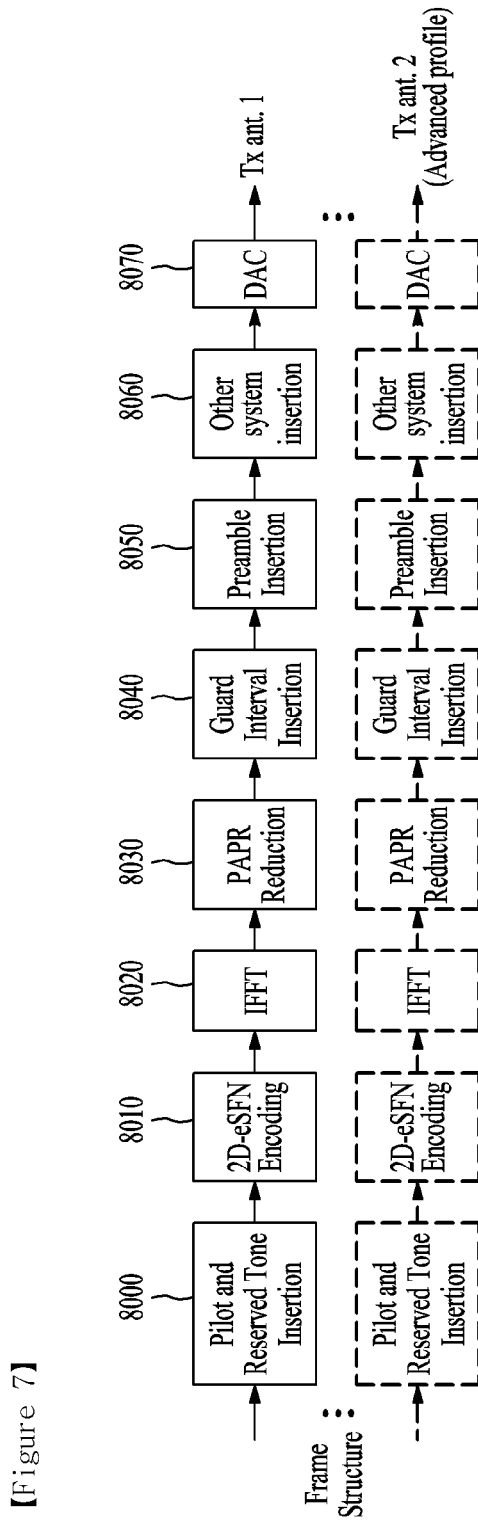

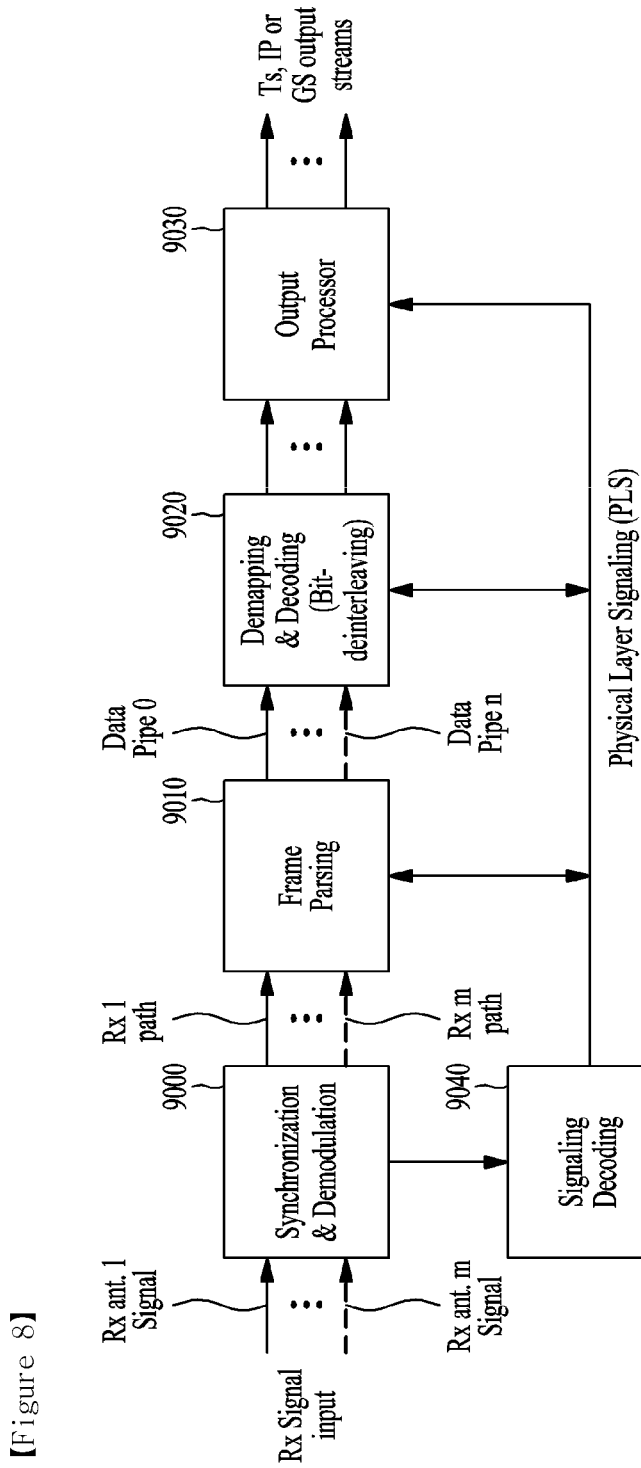
[Figure 8]

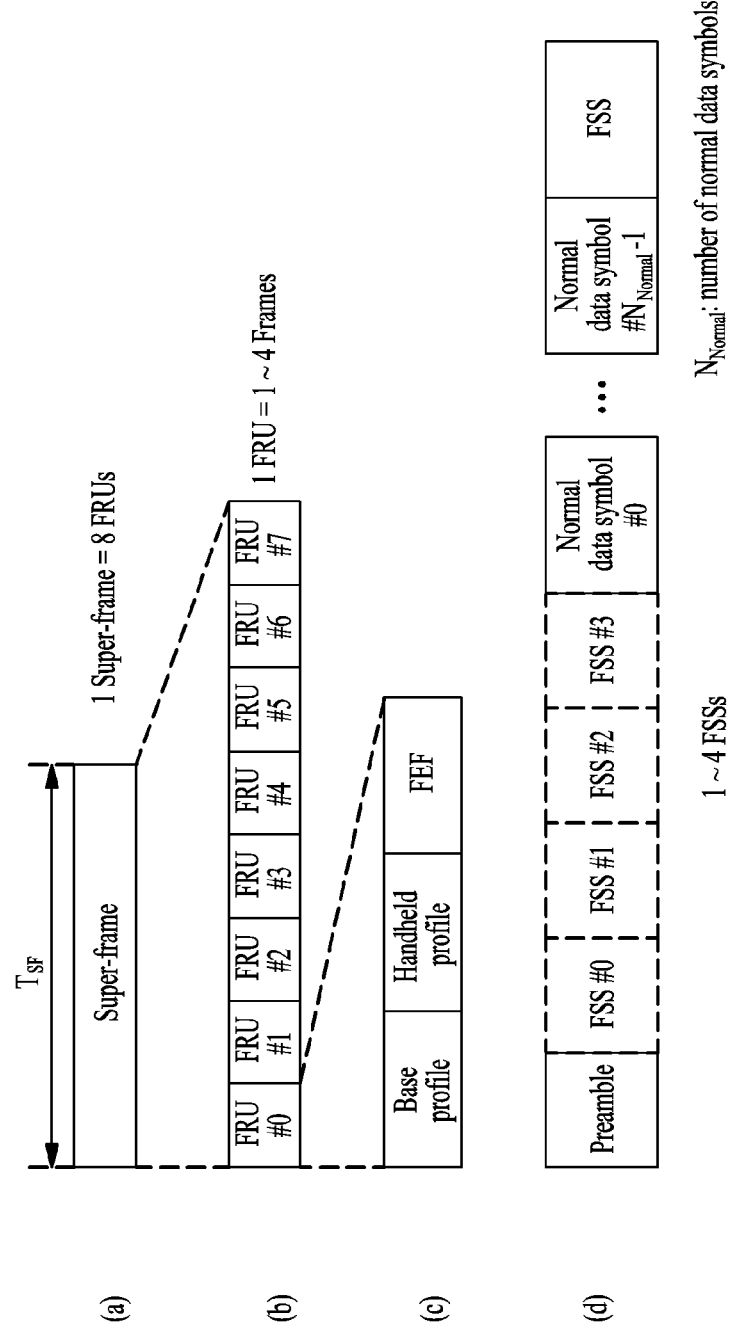

[Figure 10]
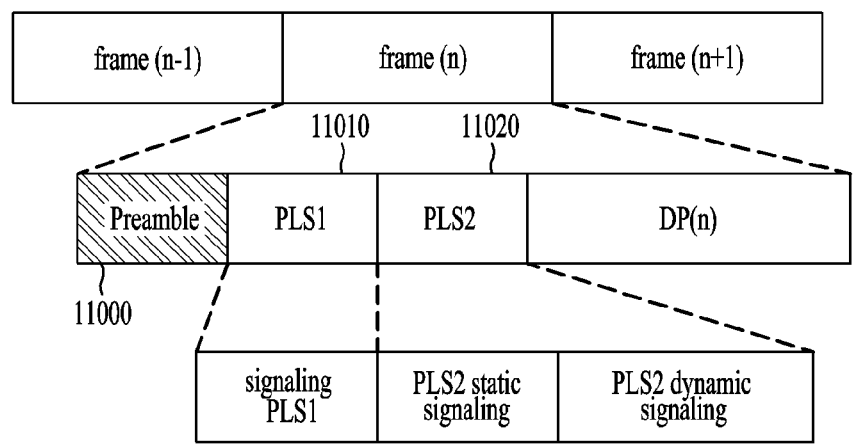

[Figure 11]

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

[Figure 12]

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE | 2 |
| PLS2_MOD | 3 |
| PLS2_SIZE_CELL | 15 |
| PLS2_STAT_SIZE_BIT | 14 |
| PLS2_SYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

[Figure 13]

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1: NUM_AUX | |
|         AUX_STREAM_TYPE | 4 |
|         AUX_PRIVATE_CONF | 28 |
|     end | |
| end | |

[Figure 14]

| Content | | | Bit |
|---|---|---|---|
| FRAME_INDEX | | | 5 |
| PLS_CHANGE_COUNTER | | | 4 |
| FIC_CHANGE_COUNTER | | | 4 |
| RESERVED | | | 16 |
| for i = 1: NUM_DP | | | |
| | DP_ID | | 6 |
| | DP_START | | 15 (or13) |
| | DP_NUM_BLOCK | | 10 |
| end | RESERVED | | 8 |
| EAC_FLAG | | | 1 |
| EAS_WAKE_UP_VERSION_NUM | | | 8 |
| if EAC_FLAG = 1 | | | |
| | EAC_LENGTH_BYTE | | 12 |
| else | | | |
| | EAC_COUNTER | | 12 |
| end | | | |
| for i=1:NUM_AUX | | | |
| | AUX_PRIVATE_DYN | | 48 |
| end | | | |
| CRC 32 | | | 32 |

[Figure 15]
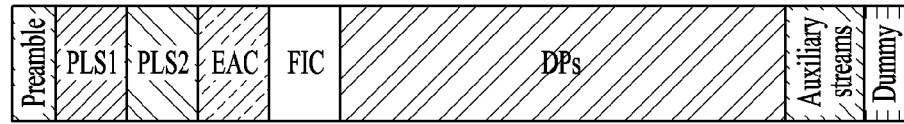

[Figure 16]
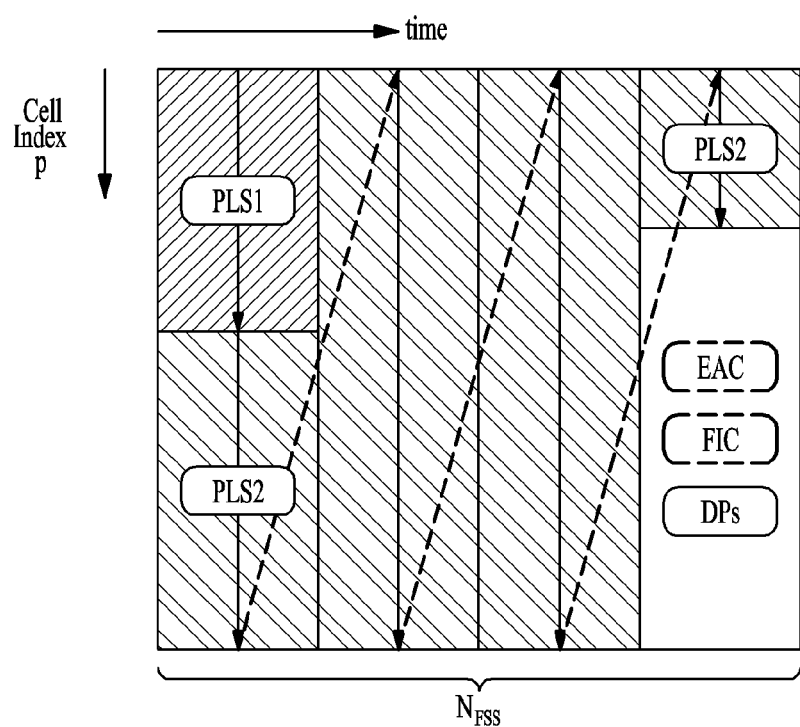

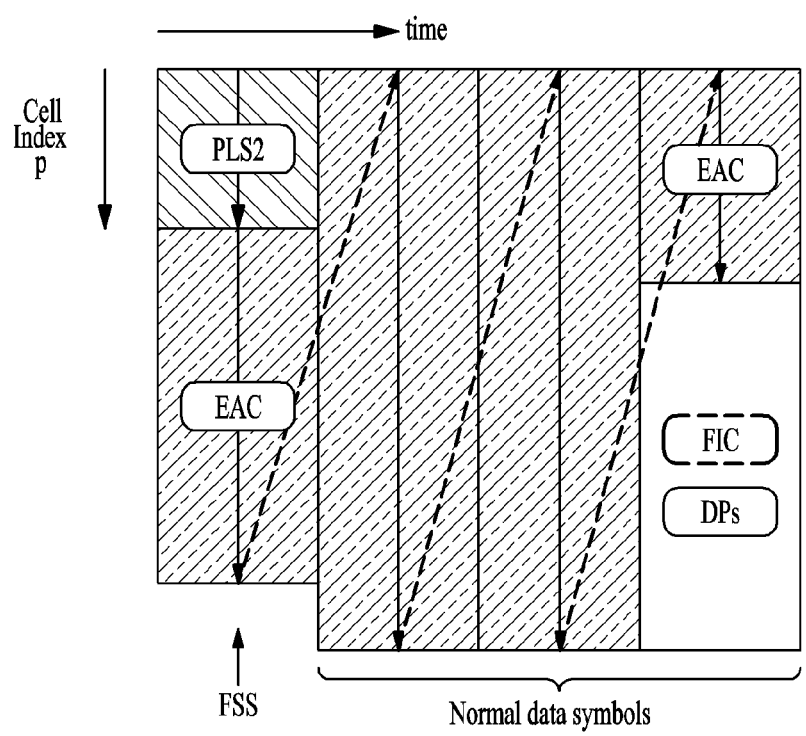
【Figure 17】

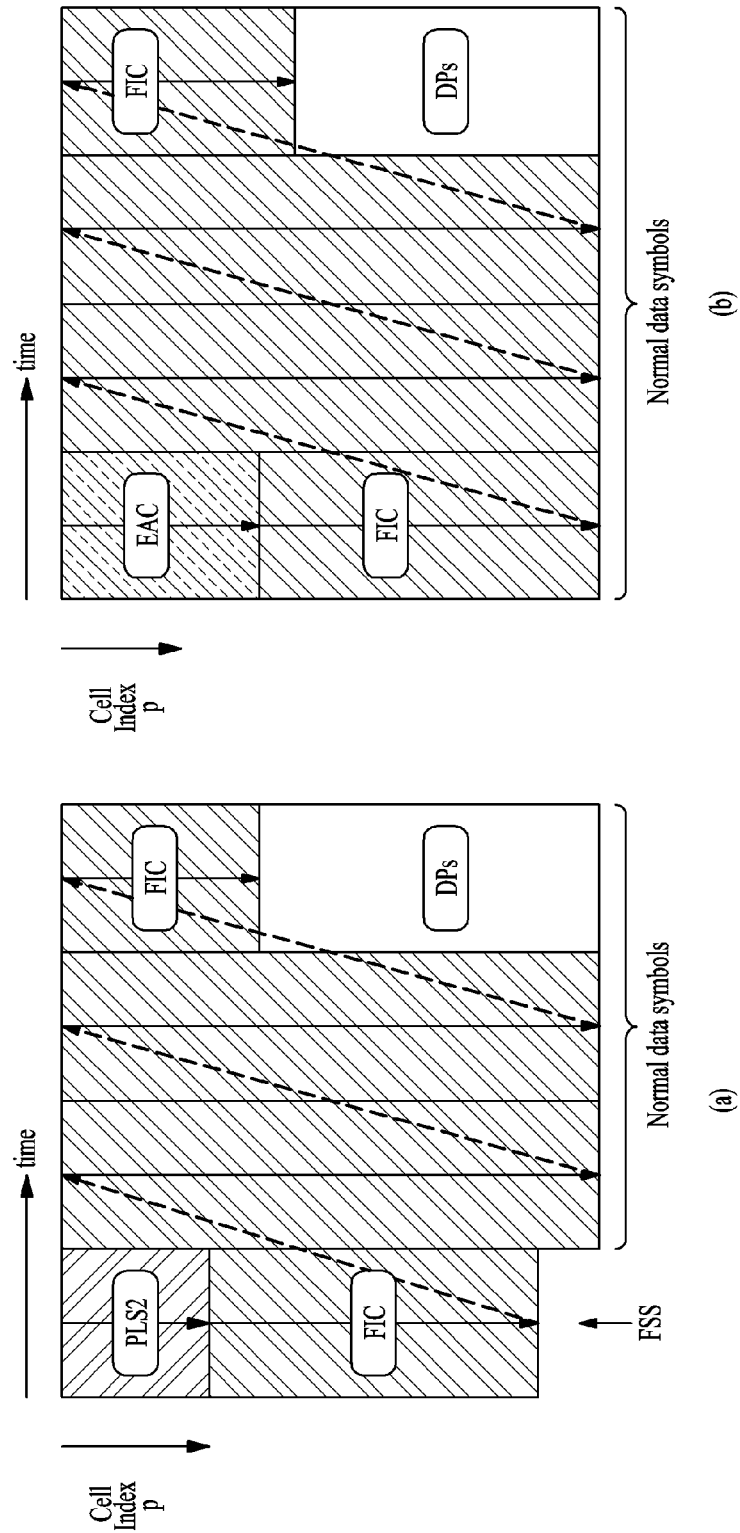
[Figure 18]

[Figure 19]
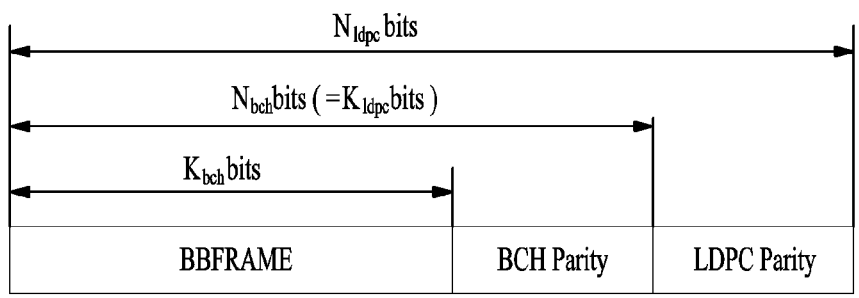

【Figure 20】
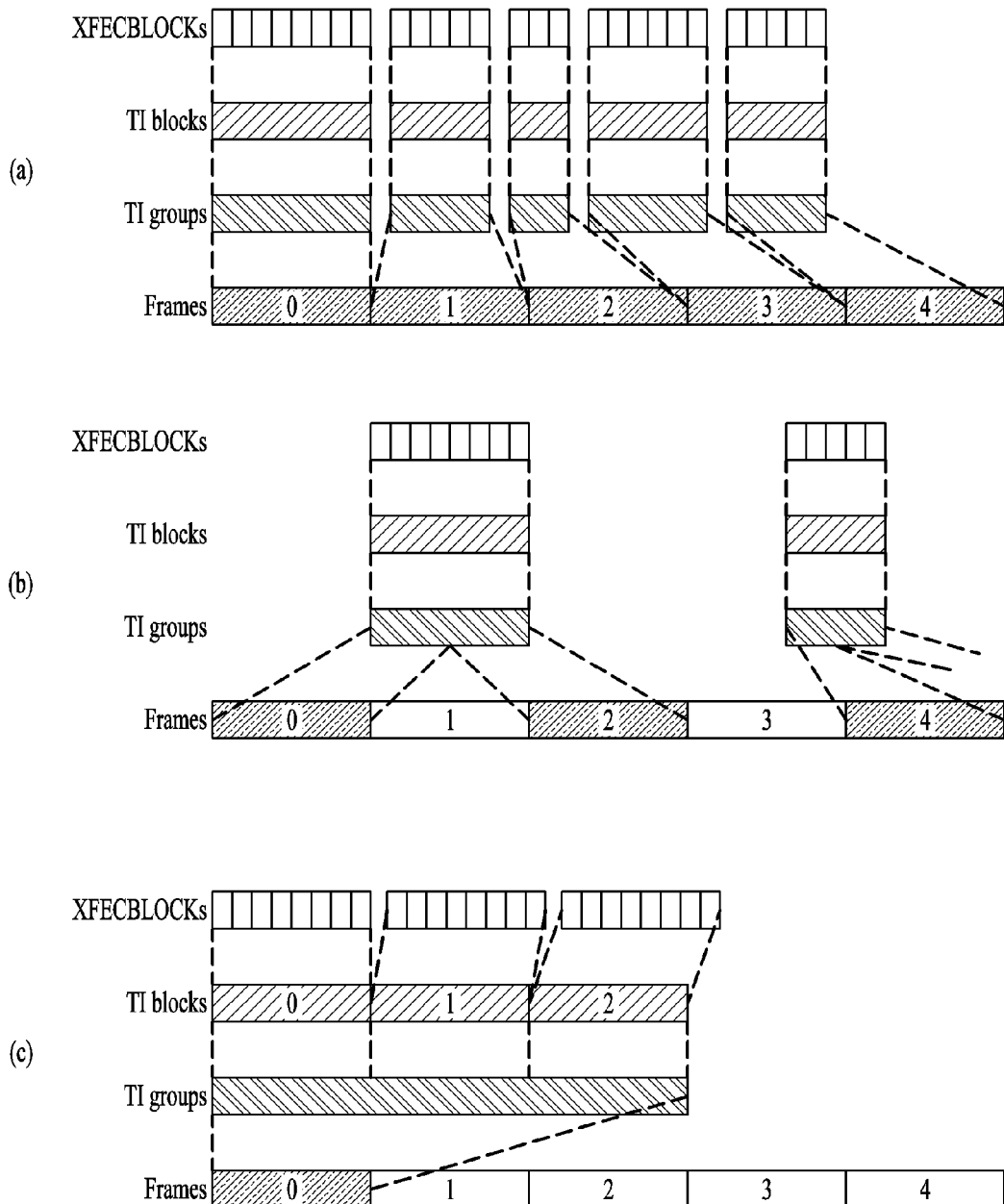

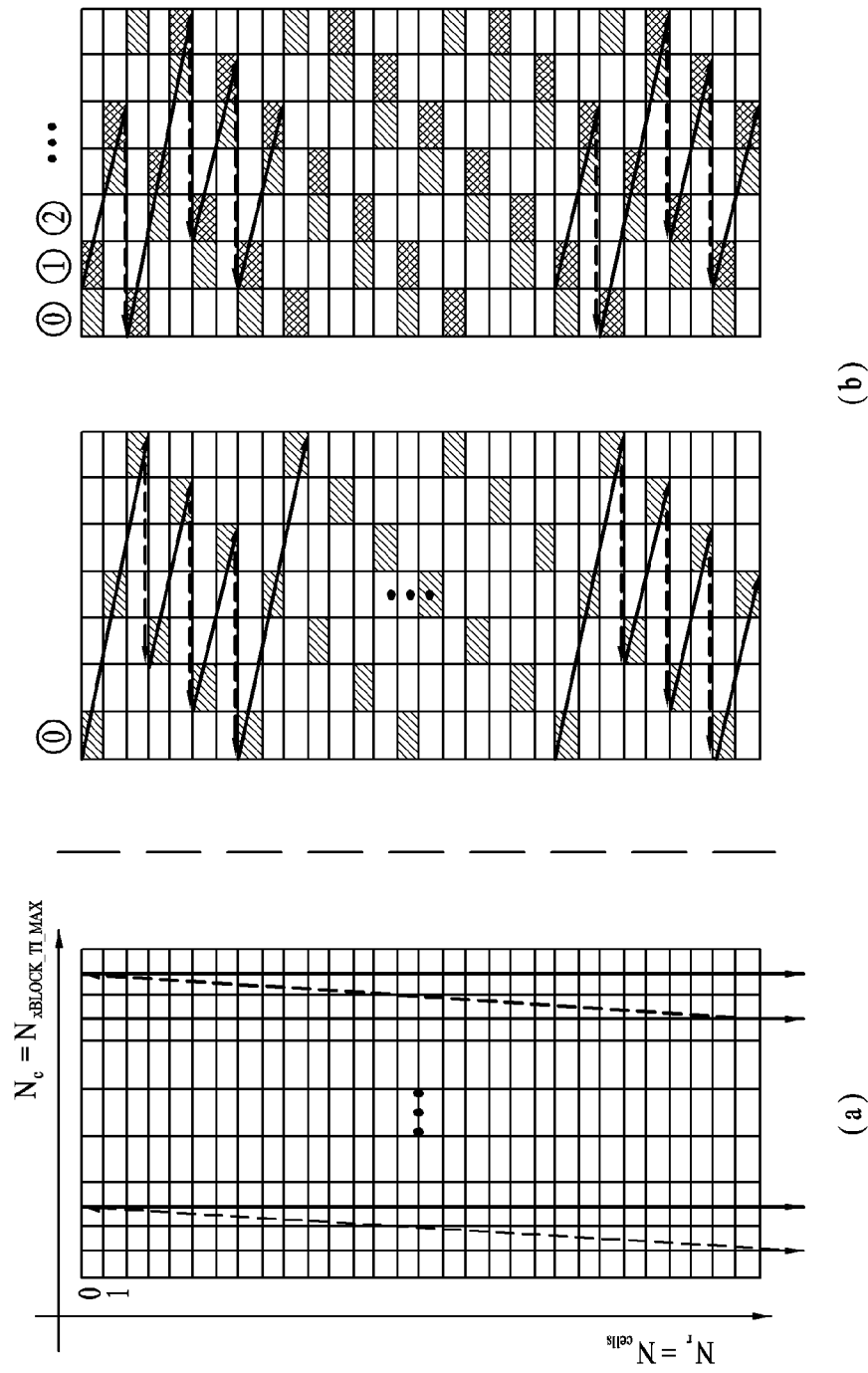
[Figure 21]

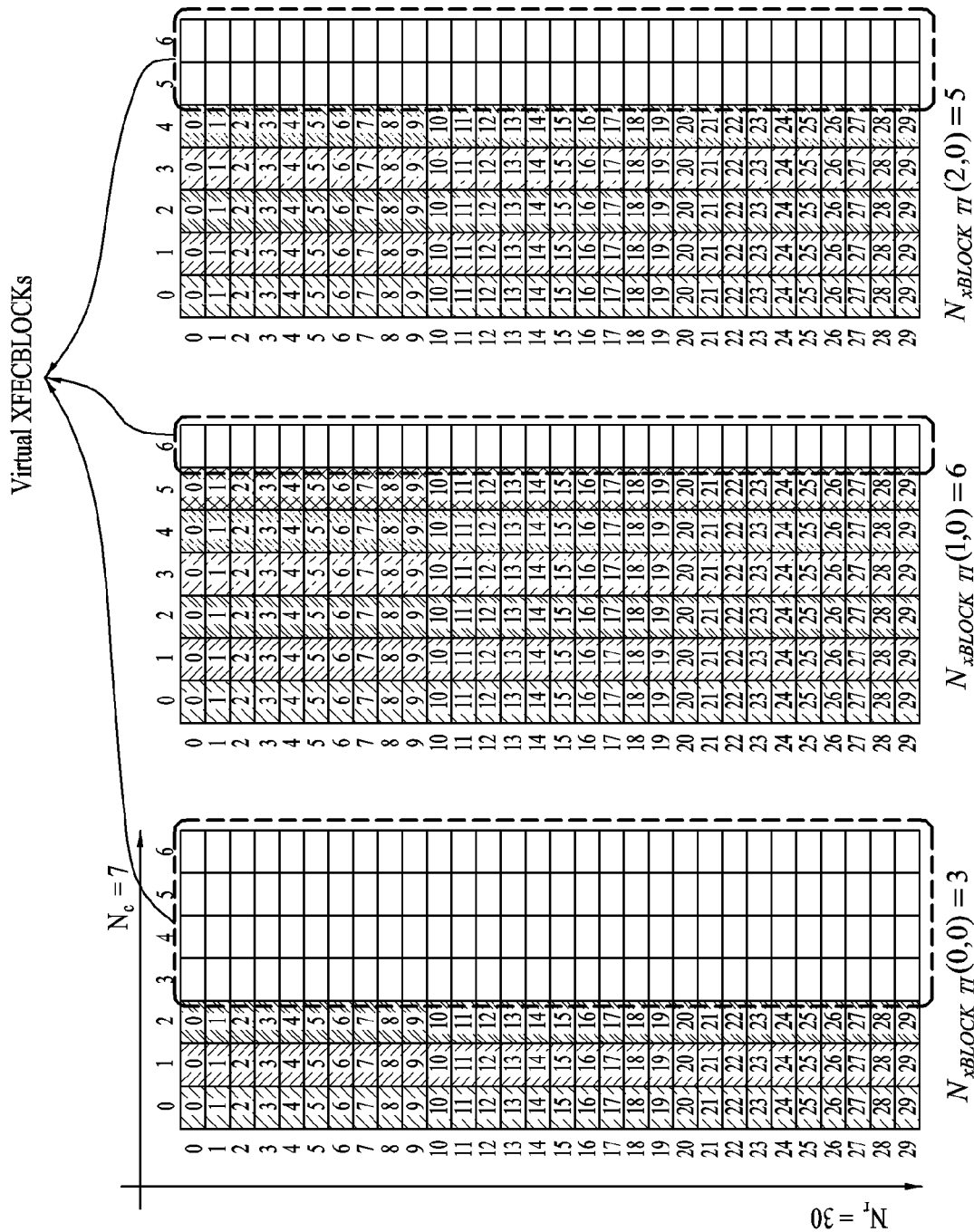
[Figure 22]

[Figure 23]
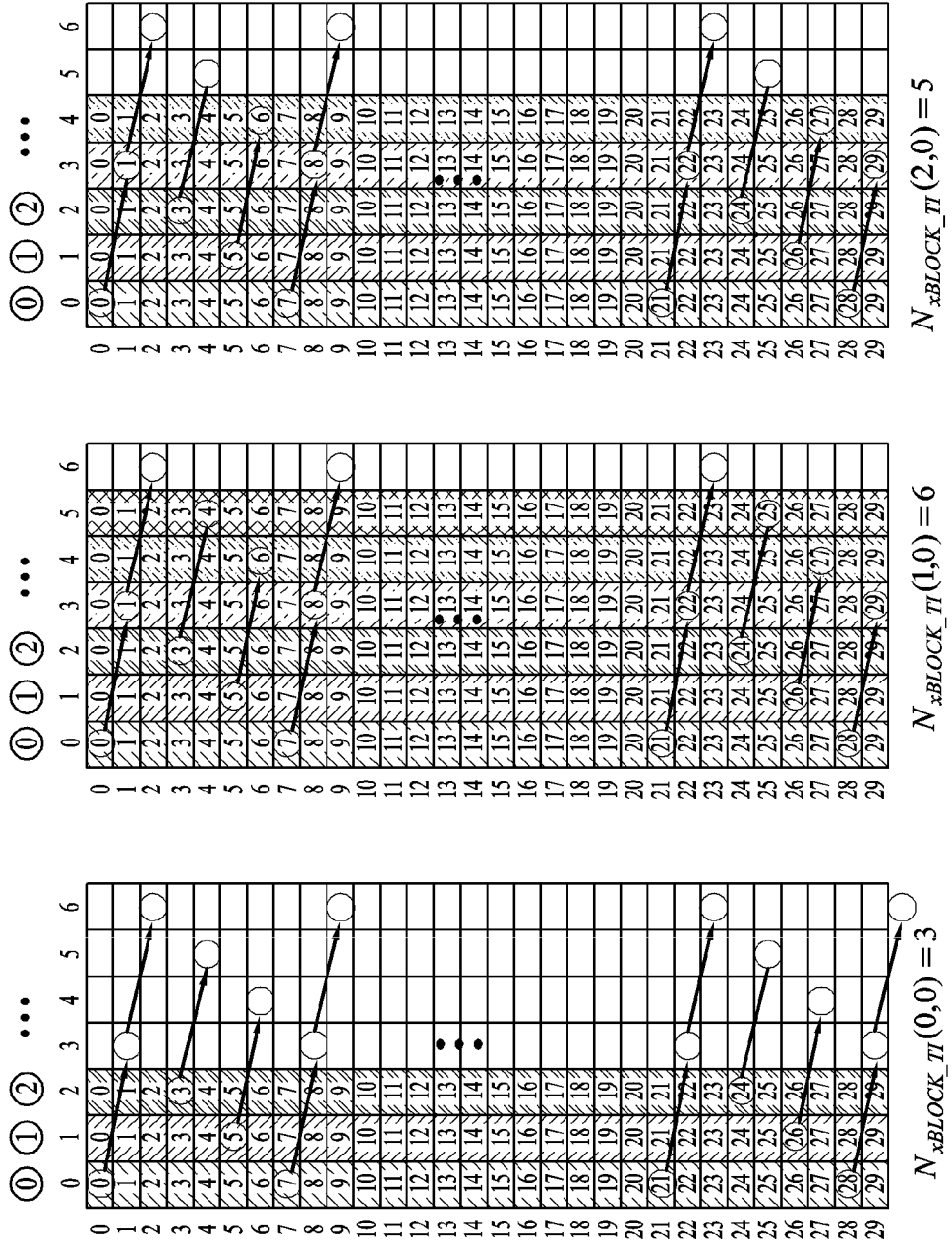

[Figure 24]

[Figure 25]
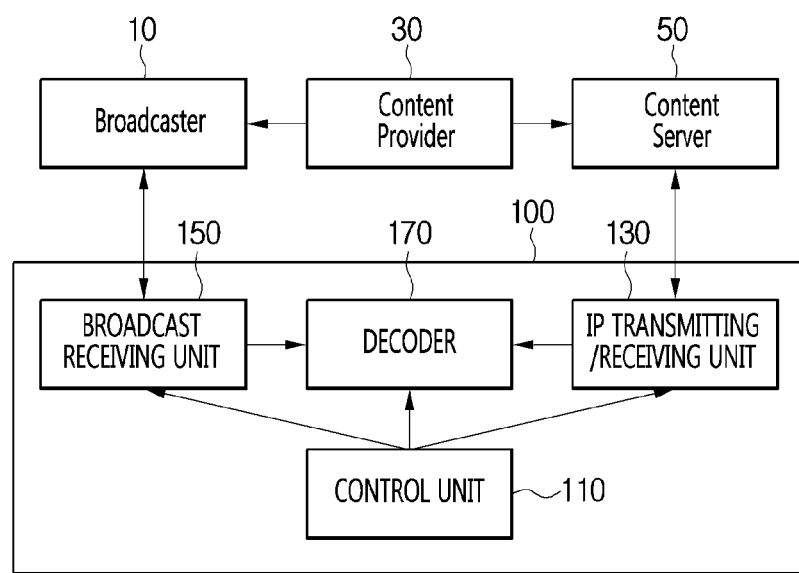

[Figure 26]
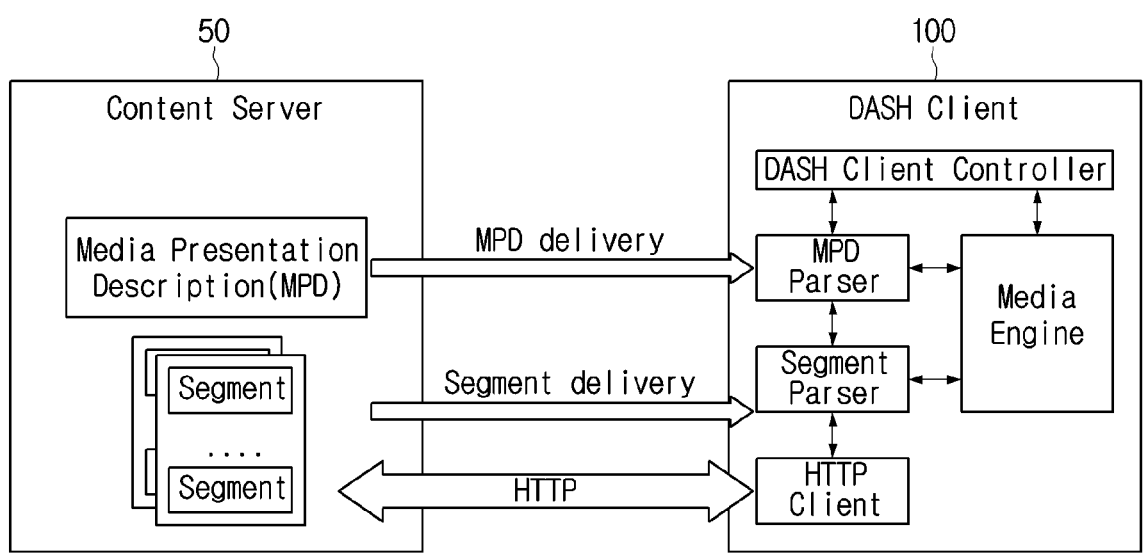

[Figure 27]
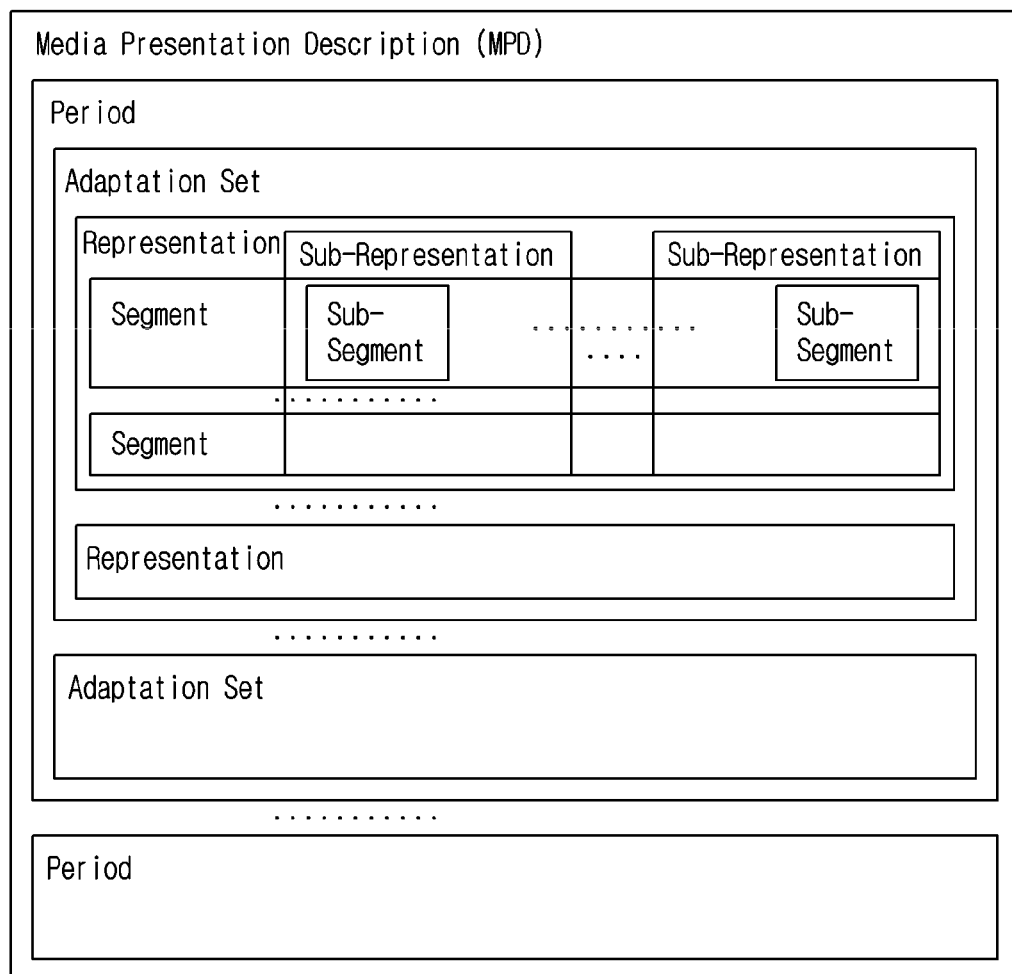

[Figure 28]

```
<!-- MPD Type -->
<xs:complexType name="MPDtype">
    <xs:sequence>
        <xs:element name="ProgramInformation" type="ProgramInformationType" minOccurs="0" maxOccurs="unbounded"/>
        <xs:element name="BaseURL" type="BaseURLType" minOccurs="0" maxOccurs="unbounded"/>
        <xs:element name="Location" type="xs:anyURI" minOccurs="0" maxOccurs="unbounded"/>
        <xs:element name="Period" type="PeriodType" maxOccurs="unbounded"/>
        <xs:element name="Metrics" type="MetricsType" minOccurs="0" maxOccurs="unbounded"/>
        <xs:any namespace="##other" processContents="lax" minOccurs="0" maxOccurs="unbounded"/>
    </xs:sequence>
    <xs:attribute name="id" type="xs:string"/>
    <xs:attribute name="profiles" type="xs:string" use="required"/>
    <xs:attribute name="type" type="PresentationType" default="static"/>
    <xs:attribute name="availabilityStartTime" type="xs:dateTime"/>
    <xs:attribute name="availabilityEndTime" type="xs:dateTime"/>
    <xs:attribute name="mediaPresentationDuration" type="xs:duration"/>
    <xs:attribute name="minimumUpdatePeriod" type="xs:duration"/>
    <xs:attribute name="minBufferTime" type="xs:duration" use="required"/>
    <xs:attribute name="timeShiftBufferDepth" type="xs:duration"/>
    <xs:attribute name="suggestedPresentationDelay" type="xs:duration"/>
    <xs:attribute name="maxSegmentDuration" type="xs:duration"/>
    <xs:attribute name="maxSubsegmentDuration" type="xs:duration"/>
    <xs:anyAttribute namespace="##other" processContents="lax"/>
</xs:complexType>

<!-- Presentation Type enumeration -->
<xs:simpleType name="PresentationType">
    <xs:restriction base="xs:string">
        <xs:enumeration value="static"/>
        <xs:enumeration value="dynamic"/>
    </xs:restriction>
</xs:simpleType>
```

【Figure 29】

```
<!-- Period -->
<xs:complexType name="PeriodType">
    <xs:sequence>
        <xs:element name="BaseURL" type="BaseURLType" minOccurs="0" maxOccurs="unbounded"/>
        <xs:element name="SegmentBase" type="SegmentBaseType" minOccurs="0"/>
        <xs:element name="SegmentList" type="SegmentListType" minOccurs="0"/>
        <xs:element name="SegmentTemplate" type="SegmentTemplateType" minOccurs="0"/>
        <xs:element name="AdaptationSet" type="AdaptationSetType" minOccurs="0" maxOccurs="unbounded"/>
        <xs:element name="Subset" type="SubsetType" minOccurs="0" maxOccurs="unbounded"/>
        <xs:any namespace="##other" processContents="lax" minOccurs="0" maxOccurs="unbounded"/>
    </xs:sequence>
    <xs:attribute ref="xlink:href"/>
    <xs:attribute ref="xlink:actuate" default="onRequest"/>
    <xs:attribute name="id" type="xs:string" />
    <xs:attribute name="start" type="xs:duration"/>
    <xs:attribute name="duration" type="xs:duration"/>
    <xs:attribute name="bitstreamSwitching" type="xs:boolean" default="false"/>
    <xs:anyAttribute namespace="##other" processContents="lax"/>
</xs:complexType>
```

[Figure 30]
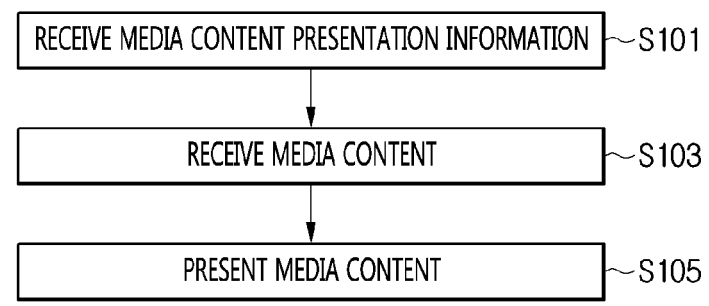

[Figure 31]

| Syntax | No.Bits | Format |
|---|---|---|
| MPD_section () { | | |
|     table_id | 8 | '0xFA' |
|     section_syntax_indicator | 1 | '0' |
|     private_indicator | 1 | '1' |
|     reserved | 2 | '11' |
|     private_section_length | 12 | uimsbf |
|     table_id_extension{ | | |
|       protocol_version | 8 | uimsbf |
|       sequence_number | 8 | uimsbf |
|     } | | |
|     reserved | 2 | '11' |
|     mpd_data_version | 5 | uimsbf |
|     current_next_indicator | 1 | '1' |
|     section_number | 8 | uimsbf |
|     last_section_number | 8 | uimsbf |
|     MPD_id_length/*M*/ | 16 | uimsbf |
|     MPD_id_bytes() | 8*M | |
|     reserved | 2 | '11' |
|     MPD_coding | 2 | uimsbf |
|     MPD_byte_length/*N*/ | 12 | uimsbf |
|     MPD_bytes() | 8*N | |
| } | | |

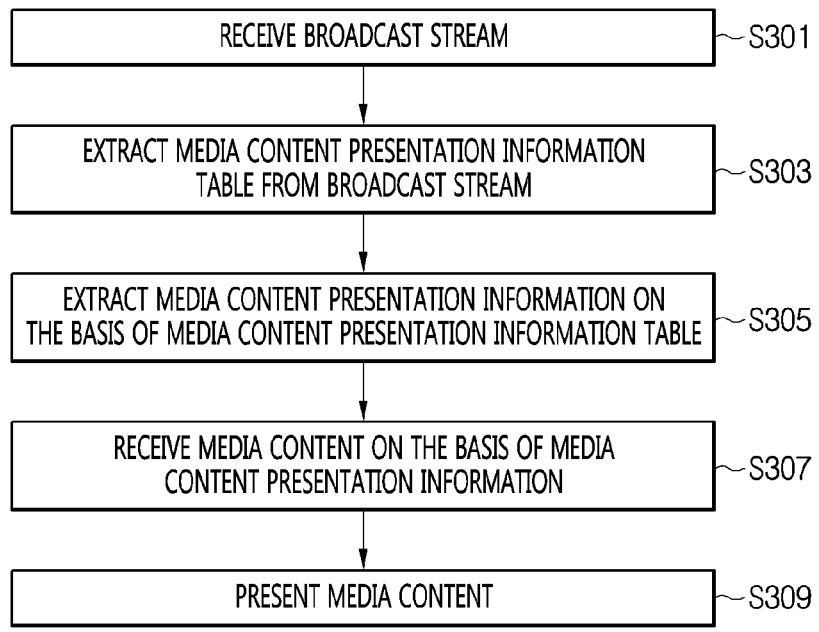
[Figure 32]

[Figure 33]

| Syntax | No.Bits | Format |
|---|---|---|
| MPD_URL_section () { | | |
|     table_id | 8 | '0xFA' |
|     section_syntax_indicator | 1 | '0' |
|     private_indicator | 1 | '1' |
|     reserved | 2 | '11' |
|     private_section_length | 12 | uimsbf |
|     table_id_extension{ | | |
|       protocol_version | 8 | uimsbf |
|       sequence_number | 8 | uimsbf |
|     } | | |
|     reserved | 2 | '11' |
|     mpd_data_version | 5 | uimsbf |
|     current_next_indicator | 1 | '1' |
|     section_number | 8 | uimsbf |
|     last_section_number | 8 | uimsbf |
|     MPD_id_length/*M*/ | 16 | uimsbf |
|     MPD_id_bytes() | 8*M | |
|     reserved | 4 | '1111' |
|     MPD_URL_length/*N*/ | 12 | uimsbf |
|     MPD_URL_bytes() | 8*N | |
| } | | |

[Figure 34]
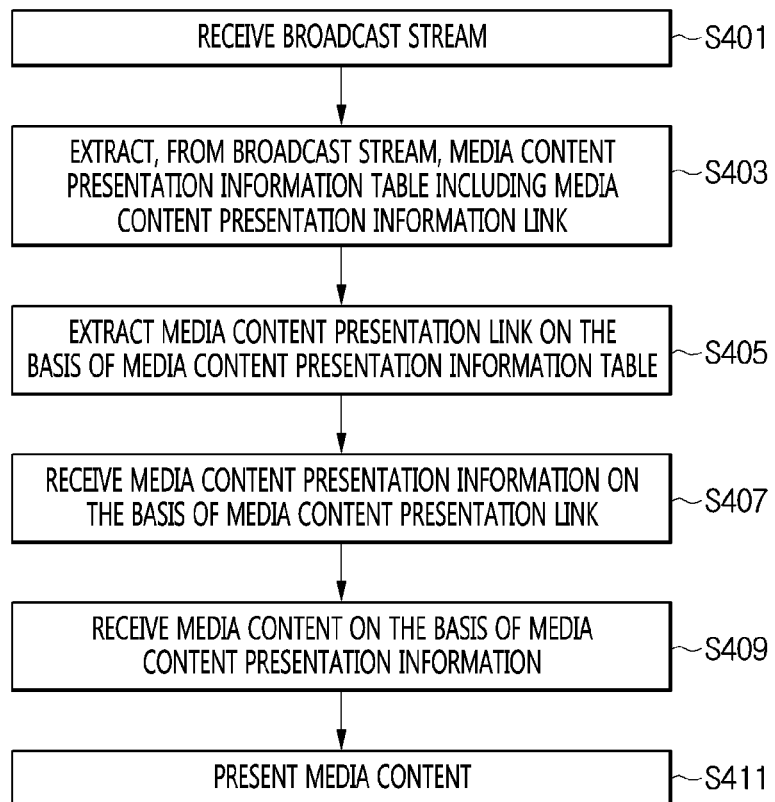

[Figure 35]
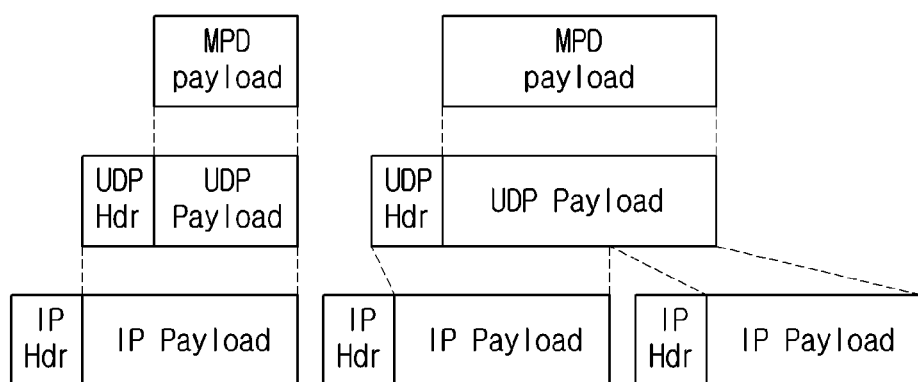

[Figure 36]

| Syntax | No.Bits | Format |
|---|---|---|
| MPD_UDP_datagram() {<br>    UDP_header<br>    reserved<br>    MPD_payload_type<br>    MPD_payload<br>} | <br><br>4<br>4<br>N | <br><br>'1111'<br>uimsbf |

[Figure 37]

| Syntax | No.Bits | Format |
|---|---|---|
| MPD_payload() { | | |
|     sequence_number | 8 | uimsbf |
|     MPD_coding | 2 | uimsbf |
|     MPD_byte_length /* N */ | 14 | uimsbf |
|     MPD_bytes() | 8*N | |
| } | | |

[Figure 38]
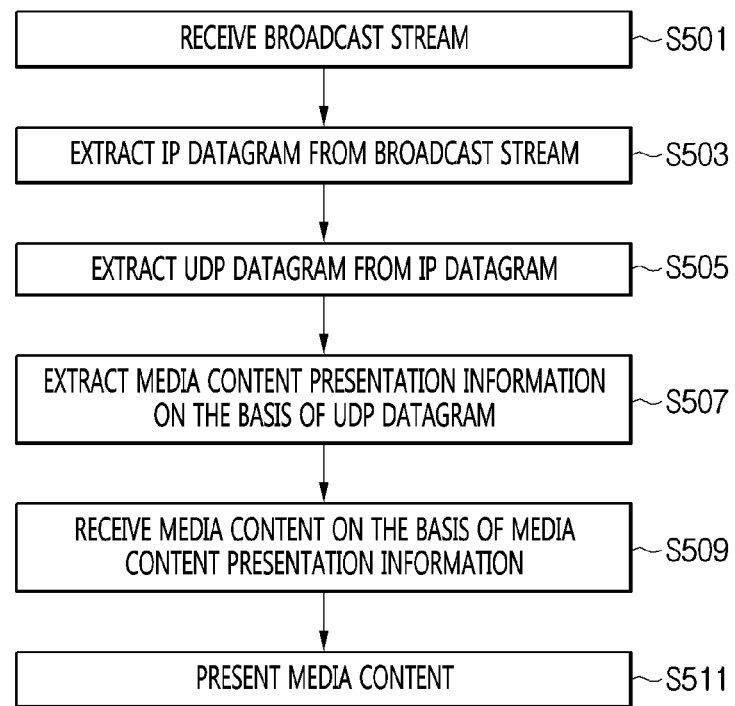

[Figure 39]

| Syntax | No. of Bits | Format |
|---|---|---|
| MPD_descriptor{ | | |
|     descriptor_tag | 8 | uimsbf |
|     descriptor_length | 8 | uimsbf |
|     simulcast_flag | 1 | uimsbf |
|     MPD_version | 4 | uimsbf |
|     MPD_transport_mode | 3 | uimsbf |
|     MPD_bootstrap_data(MPD_transport_mode) | | |
| } | | |

【Figure 40】

| Syntax | No. of Bits | Format |
|---|---|---|
| MPD_bootstrap_data (){<br>    MPD_data_length<br>    for (i = 0; i < MPD_data_length; i++){<br>        MPD_data_byte<br>    }<br>} | 8<br><br><br>1 | <br><br><br>bslbf |

[Figure 41]

| Syntax | No. of Bits | Format |
|---|---|---|
| MPD_bootstrap_data (){<br>    MPD_URL_length<br>    for (i = 0; i < MPD_URL_length; i++){<br>        MPD_URL<br>    }<br>} | 8<br><br><br>8 | <br><br><br>bslbf |

[Figure 42]

| Syntax | No. of Bits | Format |
|---|---|---|
| MPD_bootstrap_data (){<br>    reserved<br>    MPD_pid<br>} | 3<br>13 | bslbf<br>uimsbf |

[Figure 43]

| Syntax | No. of Bits | Format |
|---|---|---|
| MPD_bootstrap_data (){ | | |
|     transport_stream_id | 16 | uimsbf |
|     reserved | 3 | bslbf |
|     MPD_pid | 13 | uimsbf |
| } | | |

[Figure 44]

| Syntax | No. of Bits | Format |
|---|---|---|
| MPD_bootstrap_data (){ | | |
|     IP_version_flag | 1 | bslbf |
|     source_IP_address_flag | 1 | bslbf |
|     if(source_IP_address_flag) | | |
|         source_IP_address | 32or128 | uimsbf |
|     destination_IP_address | 32or128 | uimsbf |
|     destination_port_number | 16 | uimsbf |
|     dataPipe_id | 8 | uimsbf |
| } | | |

[Figure 45]

| Syntax | No. of Bits | Format |
|---|---|---|
| MPD_bootstrap_data (){ | | |
|    IP_version_flag | 1 | bslbf |
|    source_IP_address_flag | 1 | bslbf |
|    if(source_IP_address_flag) | | |
|       source_IP_address | 32or128 | uimsbf |
|    destination_IP_address | 32or128 | uimsbf |
|    destination_port_number | 16 | uimsbf |
|    dataPipe_id | 8 | uimsbf |
|    flute_tsi | | |
| } | | |

[Figure 46]
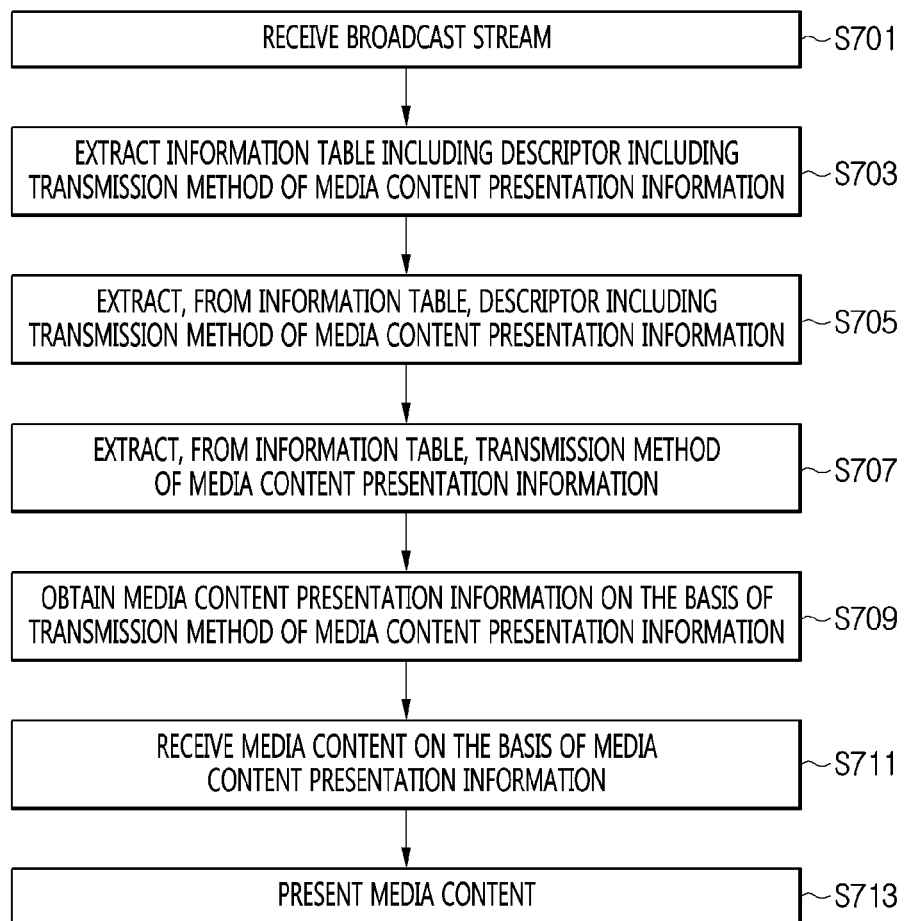

[Figure 47]
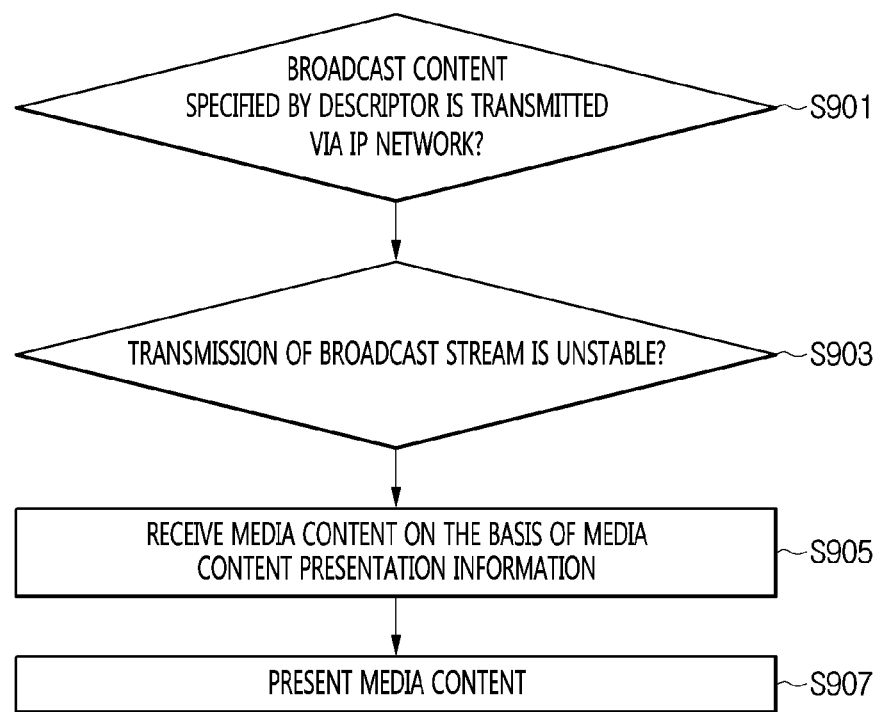

[Figure 48]
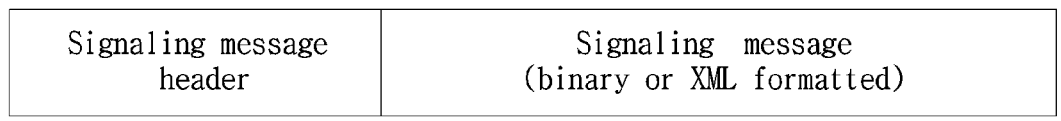
(a)
| Syntax | No. of Bits | Format |
|---|---|---|
| signaling_message_header | | |
|     signaling_id | 8 | uimsbf |
|     signaling_length | 12 | uimsbf |
|     reserved | 4 | '1111' |
|         signaling_id_extension | | |
|             protocol_version | 8 | uimsbf |
|             reserved | 8 | uimsbf |
|     } | | |
|     reserved | 2 | '11' |
|         version_number | 5 | uimsbf |
|         current_next_indicator | 1 | uimsbf |
|         fragment_number | 8 | uimsbf |
|         last_fragment_number | 8 | uimsbf |
| } | | |
(b)

[Figure 49]

| Signaling message header | MPD or signaling message including MPD (binary or XML formatted) |
|---|---|

(a)

| Syntax | No. of Bits | Format |
|---|---|---|
| MPD_signaling_message_header | | |
|   signaling_id | 8 | TBD |
|   signaling_length | 12 | uimsbf |
|   reserved | 4 | '1111' |
|     signaling_id_extension | | |
|       protocol_version | 8 | uimsbf |
|       sequence_number | 8 | uimsbf |
|   } | | |
|   reserved | 2 | '11' |
|     version_number | 5 | uimsbf |
|     current_next_indicator | 1 | uimsbf |
|     fragment_number | 8 | uimsbf |
|     last_fragment_number | 8 | uimsbf |
| } | | |

(b)

[Figure 50]
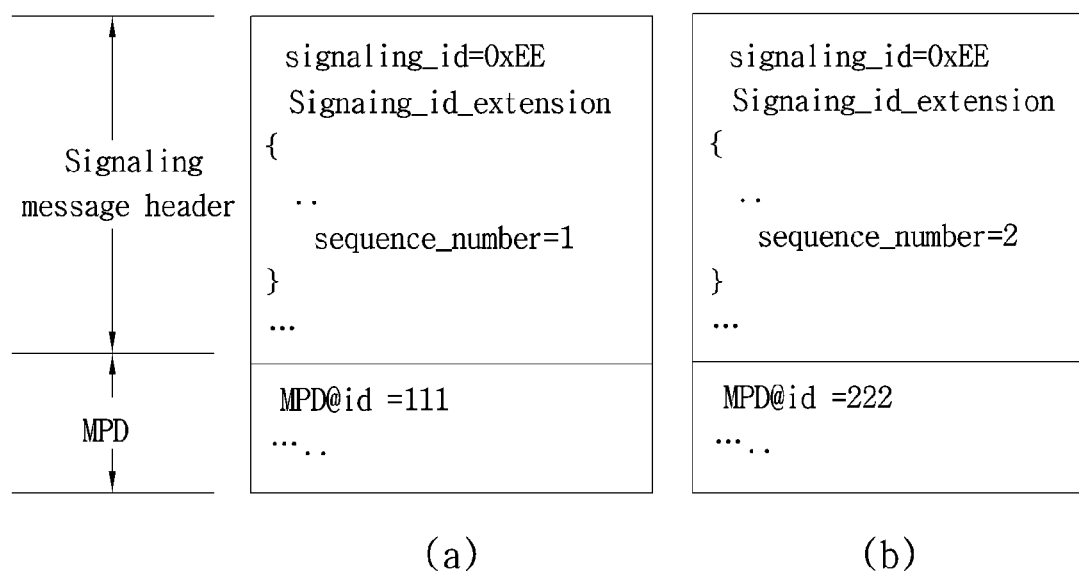

[Figure 51]

| Syntax | No. Bits | Format |
|---|---|---|
| MPD_signaling_message | | |
|   signaling_id | 8 | TBD |
|   signaling_length | 12 | uimsbf |
|   reserved | 4 | '1111' |
|   signaling_id_extension | | |
|     protocol_version | 8 | uimsbf |
|     sequence_number | 8 | uimsbf |
|   } | | |
|   reserved | 2 | '11' |
|   version_number | 5 | uimsbf |
|   current_next_indicator | 1 | uimsbf |
|   fragment_number | 8 | uimsbf |
|   last_fragment_number | 8 | uimsbf |
|   reserved | 2 | '11' |
|   MPD_coding | 2 | uimsbf |
|   MPD_byte_length/* N */ | 12 | uimsbf |
|   MPD_bytes() | 8*N | |
| } | | |

[Figure 52]

| Value | Designation |
|---|---|
| 0x00 | Plain text |
| 0x01 | Compressed by gzip |
| 0x02-0x03 | Reserved for future use |

[Figure 53]

| Syntax | No. Bits | Format |
|---|---|---|
| MPD_signaling_message | | |
|   signaling_id | 8 | TBD |
|   signaling_length | 12 | uimsbf |
|   reserved | 4 | '1111' |
|   signaling_id_extension{ | | |
|     protocol_version | 8 | uimsbf |
|     sequence_number | 8 | uimsbf |
|   } | | |
|   reserved | 2 | '11' |
|   version_number | 5 | uimsbf |
|   current_next_indicator | 1 | uimsbf |
|   fragment_number | 8 | uimsbf |
|   last_fragment_number | 8 | uimsbf |
|   MPD_id_length/* M */ | 16 | uimsbf |
|   MPD_id_bytes() | 8*M | |
|   reserved | 2 | '11' |
|   MPD_coding | 2 | uimsbf |
|   MPD_byte_length/* N */ | 12 | uimsbf |
|   MPD_bytes() | 8*N | |
| } | | |

[Figure 54]

| Syntax | No. Bits | Format |
|---|---|---|
| MPD_URL_signaling_message{ | | |
|   signaling_id | 8 | TBD |
|   signaling_length | 12 | uimsbf |
|   reserved | 4 | '1111' |
|   signaling_id_extension{ | | |
|     protocol_version | 8 | uimsbf |
|     sequence_number | 8 | uimsbf |
|   } | | |
|   reserved | 2 | '11' |
|   version_number | 5 | uimsbf |
|   current_next_indicator | 1 | uimsbf |
|   fragment_number | 8 | uimsbf |
|   last_fragment_number | 8 | uimsbf |
|   reserved | 4 | '11' |
|   MPD_URL_length/* N */ | 12 | uimsbf |
|   MPD_URLbytes() | 8*N | |
| } | | |

[Figure 55]

| Syntax | No. Bits | Format |
|---|---|---|
| MPD_URL_signaling_message{ | | |
|   signaling_id | 8 | TBD |
|   signaling_length | 12 | uimsbf |
|   reserved | 4 | '1111' |
|   signaling_id_extension{ | | |
|     protocol_version | 8 | uimsbf |
|     sequence_number | 8 | uimsbf |
|   } | | |
|   reserved | 2 | '11' |
|   version_number | 5 | uimsbf |
|   current_next_indicator | 1 | uimsbf |
|   fragment_number | 8 | uimsbf |
|   last_fragment_number | 8 | uimsbf |
|   MPD_id_length/* M */ | 16 | uimsbf |
|   MPD_id_bytes() | 8*M | |
|   reserved | 4 | '11' |
|   MPD_URL_length/* N */ | 12 | uimsbf |
|   MPD_URL_bytes() | 8*N | |
| } | | |

[Figure 56]

| Syntax | No. of Bits | Format |
|---|---|---|
| service_map_signaling_message<br>  ...<br>  num_services<br>  for (i=0;i< num_services; i++)<br>  { | 8 | uimsbf |
|     service_id | 16 | uimsbf |
|     service_type | 8 | uimsbf |
|     short_service_name_length/* m */ | 3 | uimsbf |
|     short_service_name | 16*m | bslbf |
|     channel_number<br>    ... | 16 | uimsbf |
|     signaling_delivery_mode | 8 | |
|     signaling_location (signaling_delivery_mode)<br>    ... | var | |
|     num_service_level_descriptors | 8 | uimsbf |
|     for(m=0; m< num_service_level_descriptors; m++)<br>    { | | |
|       service_level_descriptor()<br>    }<br>  }<br>} | var | |

[Figure 57]

| siginaling_delivery_mode value | Designation |
|---|---|
| 0x00 | IPv4/IPv6 flows through same broadcast or over the cellular network |
| 0x01 | IPv4/IPv6 flows through different broadcast |
| 0x02 | Session-based flows (e.g., ALC/LCT, FLUTE sessions) through same broadcast |
| 0x03 | Session-based flows (e.g., ALC/LCT, FLUTE sessions) through different broadcast |
| 0x04 | packet-based flows through same broadcast |
| 0x05 | packet-based flows through different broadcast |
| 0x06 | URL |
| 0x07-0xFF | Reserved |

[Figure 58]

| Syntax | No. of Bits | Format |
|---|---|---|
| signaling_location(){ | | |
|   IP_version_flag | 1 | bslbf |
|   source_IP_address_flag | 1 | bslbf |
|   destination_IP_address_flag | 1 | bslbf |
|   reserved | 5 | '1111' |
|   if (source_IP_address_flag) | | |
|     source_IP_address | 32 or 128 | uimsbf |
|   if (destination _IP_address_flag | | |
|     destination_IP_address | 32 or 128 | uimsbf |
|   port_num_count | 8 | |
|   if(port_num_count > 0) | | |
|     destination_UDP_port_num | 16 | uimsbf |
| } | | |

[Figure 59]

| Syntax | No. of Bits | Format |
|---|---|---|
| signaling_location(){ | | |
|    broadcast_id | 16 | uimsbf |
|    IP_version_flag | 1 | bslbf |
|    source_IP_address_flag | 1 | bslbf |
|    destination_IP_address_flag | 1 | bslbf |
|    reserved | 5 | '1111' |
|    if (source_IP_address_flag) | | |
|       source_IP_address | 32 or 128 | uimsbf |
|    if (destination _IP_address_flag) | | |
|       destination_IP_address | 32 or 128 | uimsbf |
|    port_num_count | 8 | |
|     if(port_num_count > 0) | | |
|       destination_UDP_port_num | 16 | uimsbf |
| } | | |

[Figure 60]

| Syntax | No. of Bits | Format |
|---|---|---|
| signaling_location(){ | | |
|     IP_version_flag | 1 | bslbf |
|     source_IP_address_flag | 1 | bslbf |
|     destination_IP_address_flag | 1 | bslbf |
|     reserved | 5 | '1111' |
|     if (source_IP_address_flag) | | |
|         source_IP_address | 32 or 128 | uimsbf |
|     if (destination _IP_address_flag) | | |
|         destination_IP_address | 32 or 128 | uimsbf |
|     destination_UDP_port_num | 16 | uimsbf |
|     tsi | 16 | uimsbf |
| } | | |

【Figure 61】

| Syntax | No. of Bits | Format |
|---|---|---|
| signaling_location(){ | | |
|   broadcast_id | 16 | uimsbf |
|   IP_version_flag | 1 | bslbf |
|   source_IP_address_flag | 1 | bslbf |
|   source_IP_address_flag | 1 | bslbf |
|   reserved | 5 | '1111' |
|   if (source_IP_address_flag) | | |
|     source_IP_address | 32 or 128 | uimsbf |
|   if (destination _IP_address_flag) | | |
|     destination_IP_address | 32 or 128 | uimsbf |
|   destination_UDP_port_num | 16 | uimsbf |
|   tsi | 16 | uimsbf |
| } | | |

[Figure 62]

| Syntax | No. of Bits | Format |
|---|---|---|
| signaling_location(){ | | |
|    IP_version_flag | 1 | bslbf |
|    source_IP_address_flag | 1 | bslbf |
|    destination_IP_address_flag | 1 | bslbf |
|    reserved | 5 | '1111' |
|    if (source_IP_address_flag) | | |
|      source_IP_address | 32 or 128 | uimsbf |
|    if (destination _IP_address_flag | | |
|      destination_IP_address | 32 or 128 | uimsbf |
|    destination_UDP_port_num | 16 | uimsbf |
|    packet_id | 16 | uimsbf |
| } | | |

[Figure 63]

| Syntax | No. of Bits | Format |
|---|---|---|
| signaling_location(){ | | |
|   broadcast_id | 16 | uimsbf |
|   IP_version_flag | 1 | bslbf |
|   source_IP_address_flag | 1 | bslbf |
|   destination_IP_address_flag | 1 | bslbf |
|   reserved | 5 | '11111' |
|   if (source_IP_address_flag) | | |
|     source_IP_address | 32 or 128 | uimsbf |
|   if (destination _IP_address_flag) | | |
|     destination_IP_address | 32 or 128 | uimsbf |
|   destination_UDP_port_num | 16 | uimsbf |
|   packet_id | 16 | uimsbf |
| } | | |

[Figure 64]

| Syntax | No. of bits | Format |
|---|---|---|
| signaling_location() {<br>    URL_length<br>    for (i=0;I< URL_length; i++ ){<br>        URL_char<br>    }<br>} | 8<br><br><br>8 | <br><br><br>bslbf |

[Figure 65]
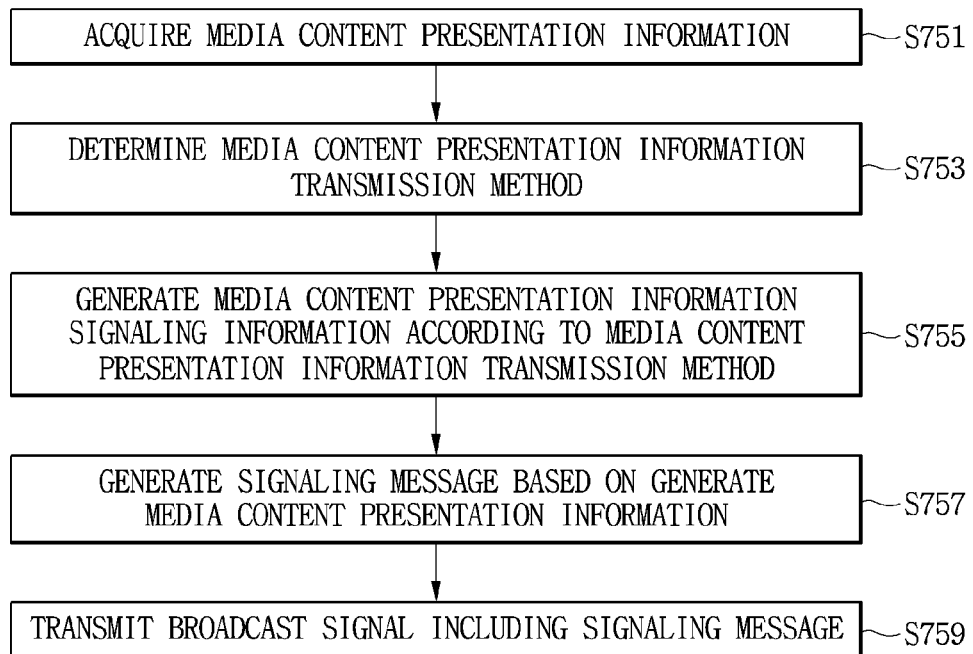

[Figure 66]
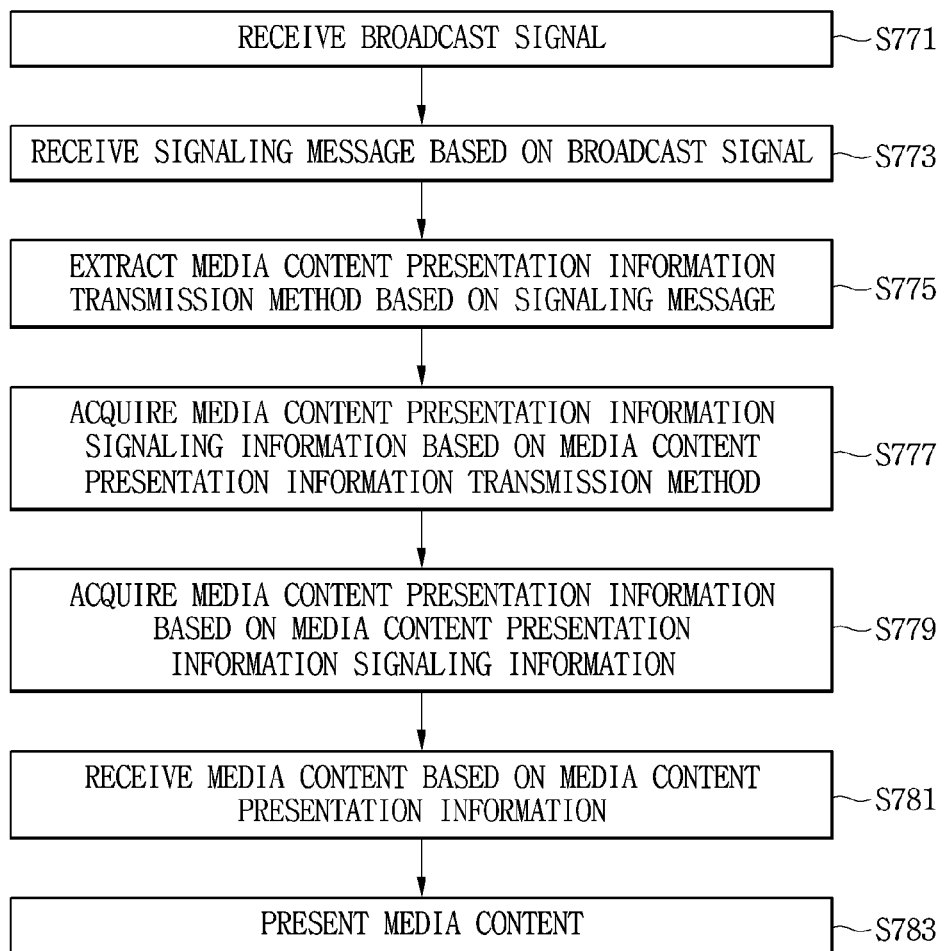

[Figure 67]

| Syntax | No. of Bits | Format |
|---|---|---|
| DASHTime_Payload { | | |
|    DASHTimePacket_identifier | 8 | uimsbf |
|    mpd_force_update | 1 | uimsbf |
|    period_switch_timer | 31 | uimsbf |
|    presentation_time | 64 | uimsbf |
|    for (i = 0; i < N; i++){ | | |
|       period_id | 8 | bslbf |
|    } | | |
| } | | |

【Figure 68】

| Syntax | No. of Bits | Format |
|---|---|---|
| DASHTime_private_data { <br>   presentation_time <br>   for (i = 0; i < N; i++){ <br>      period_id <br>   } <br>} | 64 <br><br><br>8 | uimsbf <br><br><br>bslbf |

[Figure 69]

| Syntax | No. of Bits | Format |
|---|---|---|
| DASHTime_private_data { <br>    DASHTimePacket_identifier <br>    presentation_time <br>    for (i = 0; i < N; i++){ <br>       period_id <br>    } <br> } | <br> 8 <br> 64 <br> <br> 8 | <br> uimsbf <br> uimsbf <br> <br> bslbf |

[Figure 70]
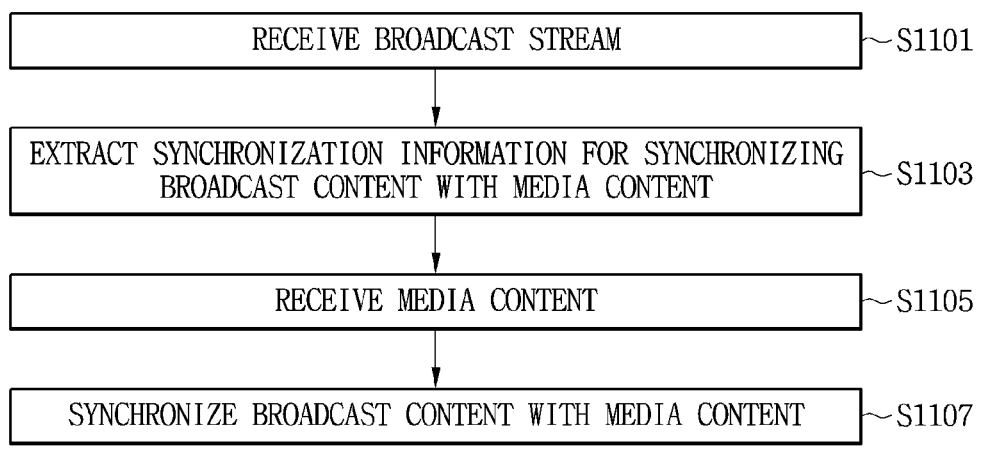

[Figure 71]

| Format | Description |
|---|---|
| atsc://TSID, SSID, PID | TSID is the ID of the source transport stream (TS)<br>SSID is the ID of source indicating the program in source TS<br>PID is the value of the PID carrying the media stream |
| atsc://TSID, PNUM, PID | TSID is the ID of the source transport stream (TS)<br>PNUM is the program number indicating the program in source TS<br>PID is the value of the PID carrying the media stream |
| atsc://TSID, CHNUM, PID | TSID is the ID of the source transport stream (TS)<br>CHNUM is the number indicating associated channel number in source TS. The channel number is formatted as "major channel number-minor channel number"<br>PID is the value of the PID carrying the media stream |

[Figure 72]

```
<?xml version="1.0" encoding="UTF-8"?>
  <MPD xmlns:xsi="http://www.w3.org/2001/XMLSchema-instance"
    xsi:schemaLocation="urn:mpeg:DASH:schema:MPD:2011 DASH-MPD.xsd"
    xmlns="urn:mpeg:DASH:schema:MPD:2011"
    id="a1fd4476-3523-4a1d-99e2-472ae55eb343"
    type="dynamic"
    availabilityStartTime="2012-07-07T07:07:07"
    minBufferTime="PT10S"
    profiles="urn:mpeg:dash:profile:mp2t-simple:2011">

<BaseURL>http://cdn1.example.com/</BaseURL>

<Period id= "abc01" start="PT0S">
      <AdaptationSet mimeType="video/mp2t " codecs="avc1.4D401F">
          <Representation id= "rep1 ">
              <SegmentBase media= "atsc://0x0aa4, 0x0022, 0x011" timescale= "25000"/>
          <Representation id="rep2 " bandwidth= "25000 ">
            <SegmentTemplate  media="$RepresentationID$_$Number%08$.ts"
                duration="4" startNumber="1"/>
      </AdaptationSet>
      <AdaptationSet mimeType="video/mp2t " codecs= "mp4a">
          <Representation id= "rep3 ">
              <SegmentBase media= "atsc://0x0aa4, 0x0022, 0x012" timescale= "25000"/>
      </AdaptationSet>
    </Period>
                      ......
</MPD>
```

[Figure 73]
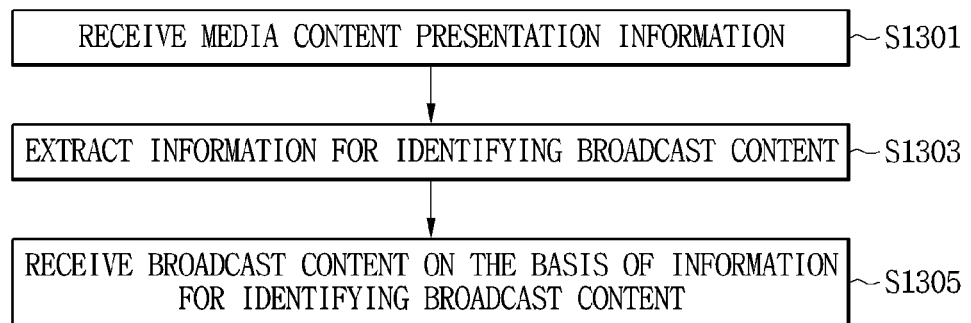

[Figure 74]
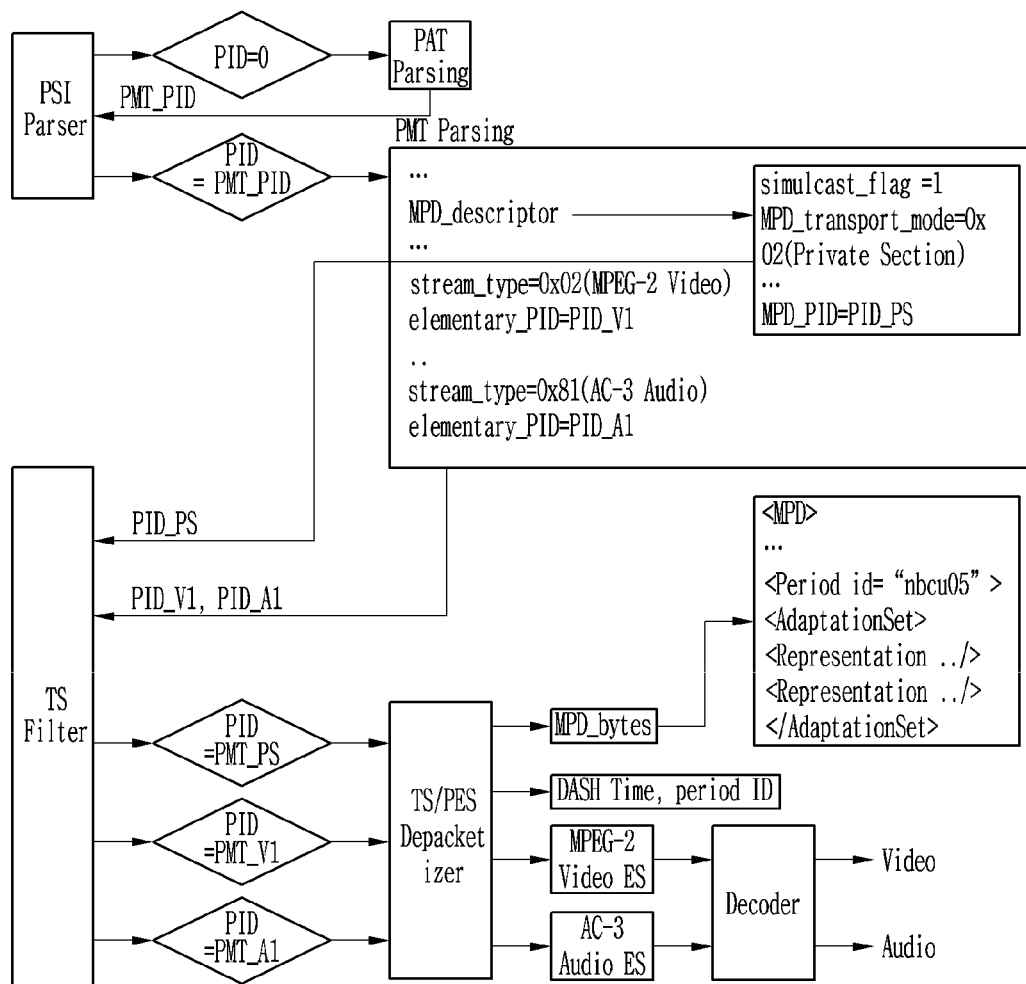

[Figure 75]
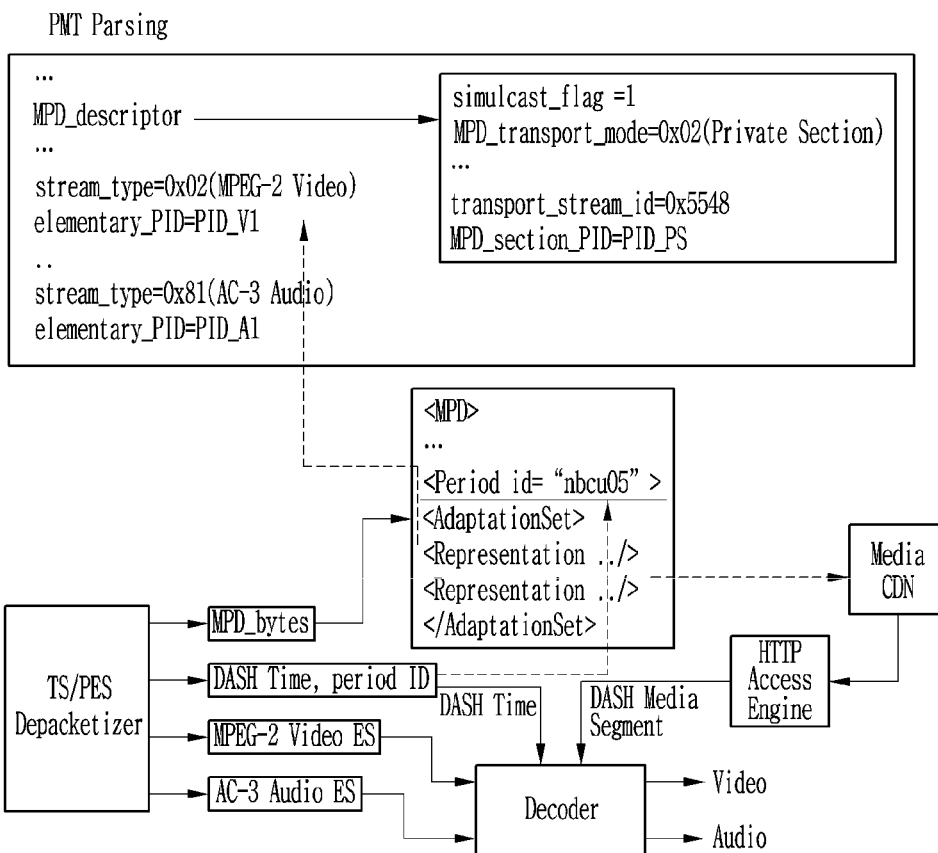

[Figure 76]
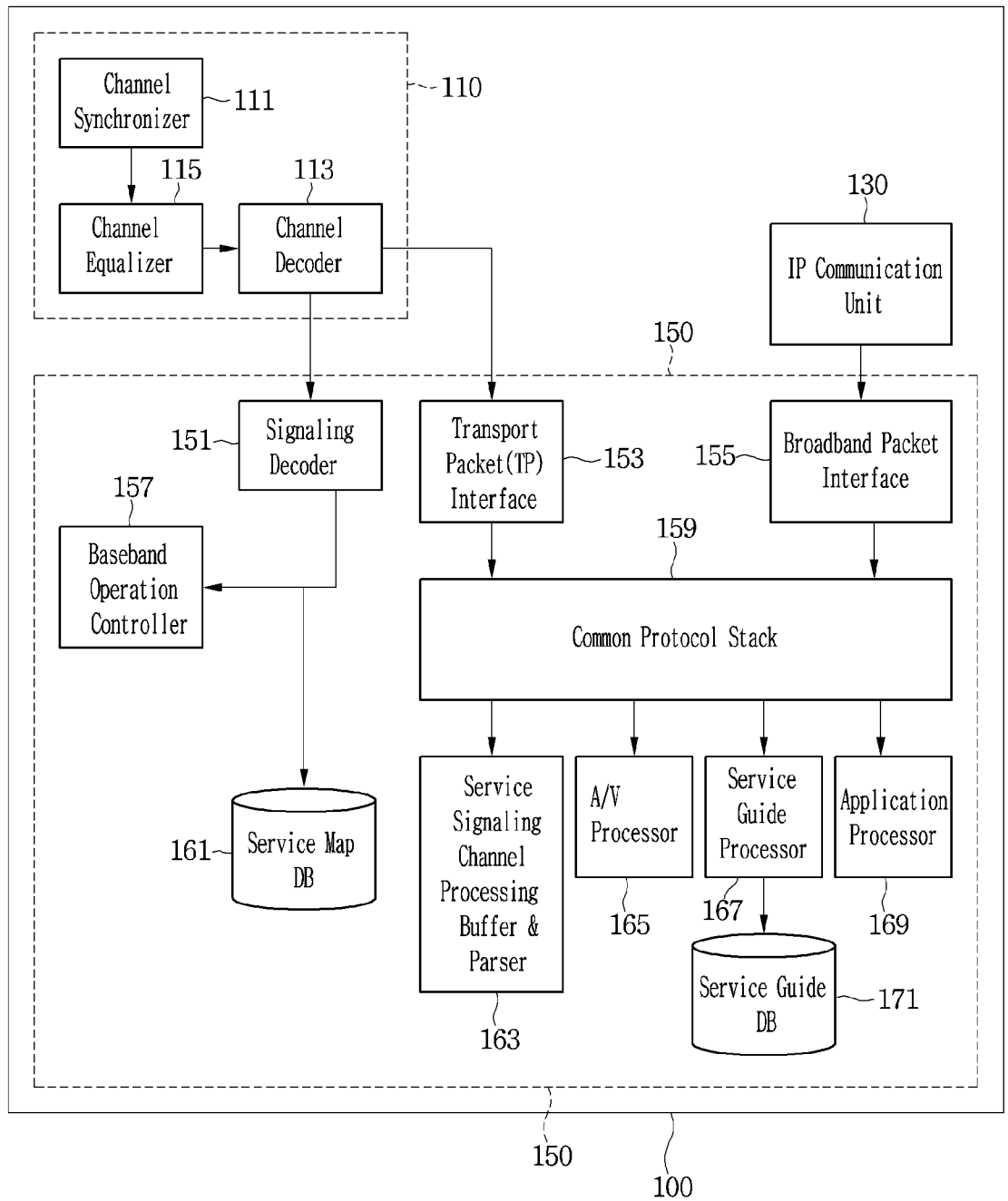

[Figure 77]
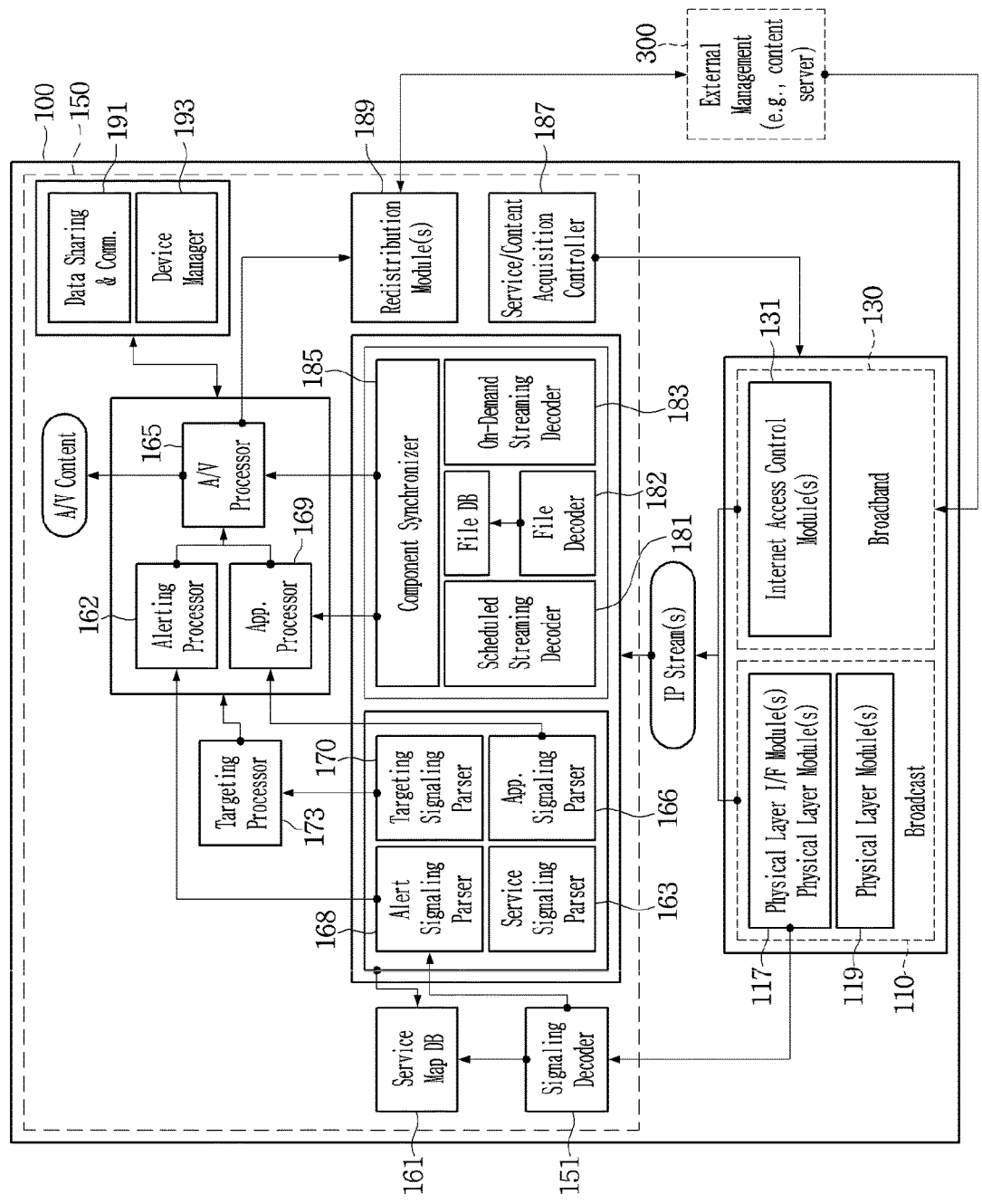

[Figure 78]
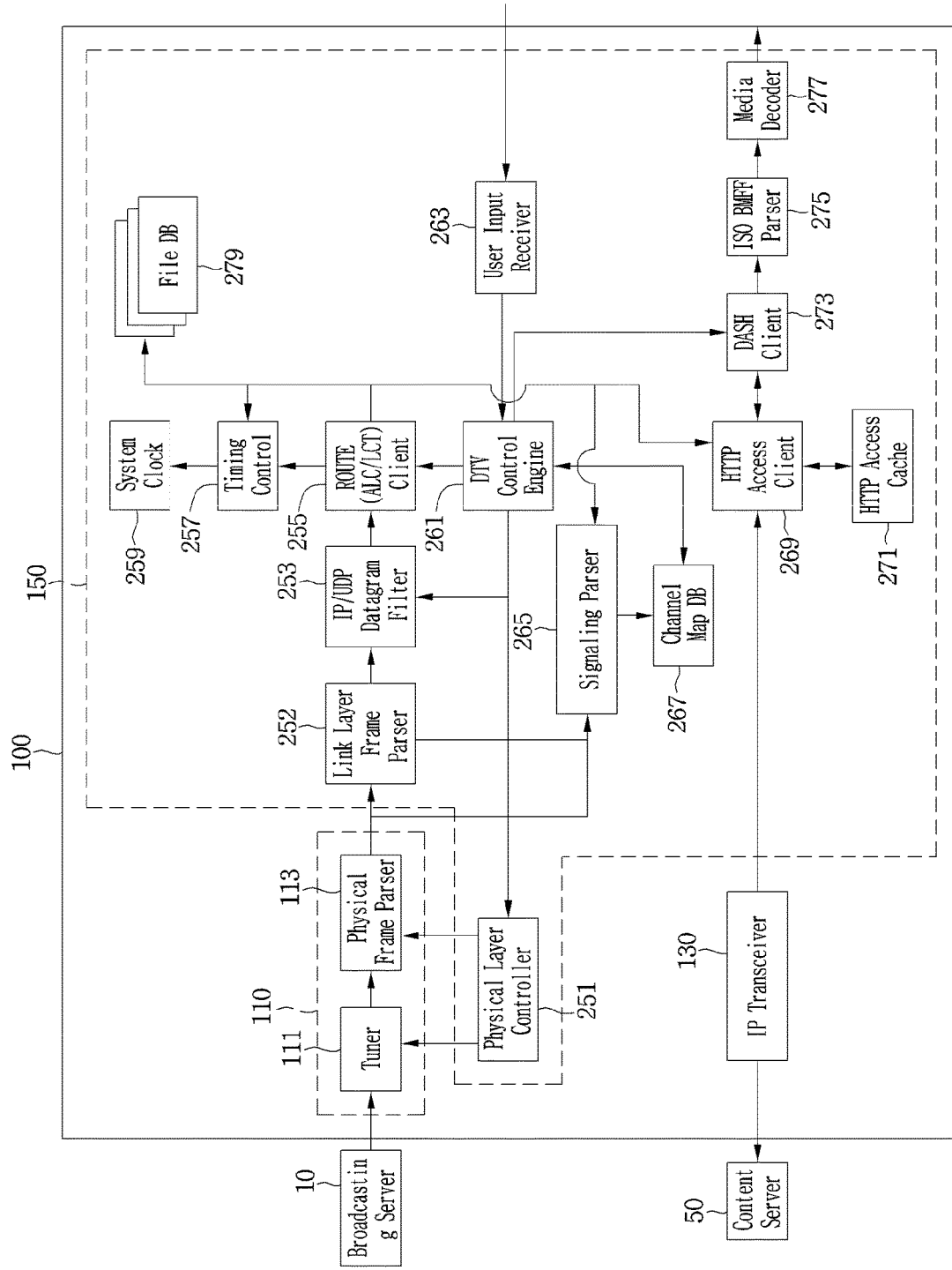

[Figure 79]
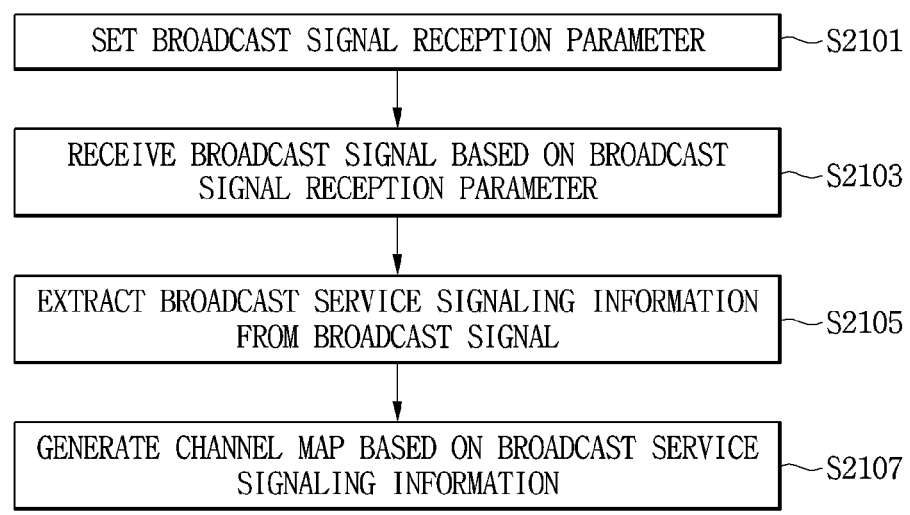

[Figure 80]
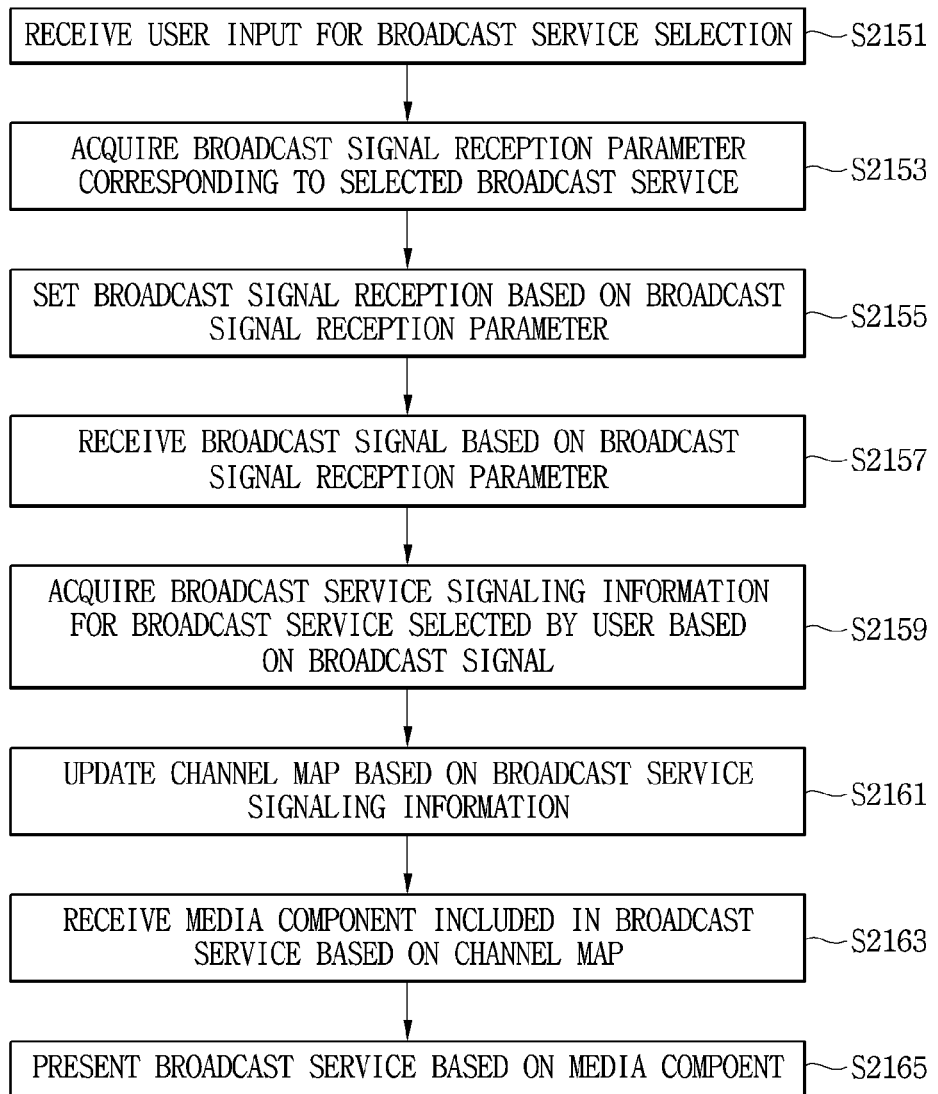

[Figure 81]
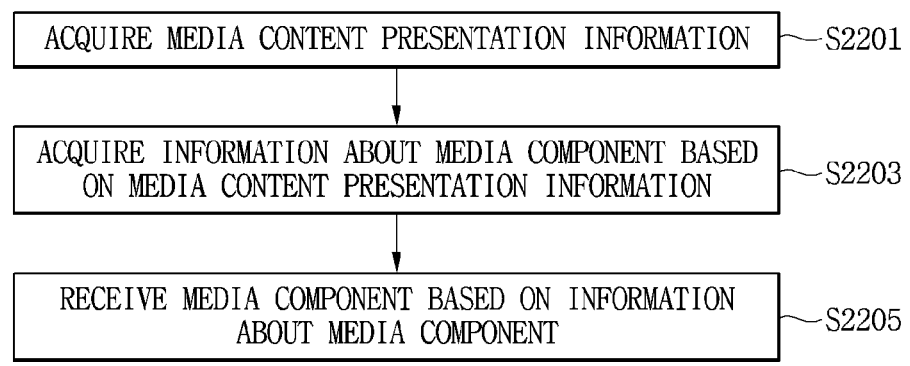

[Figure 82]
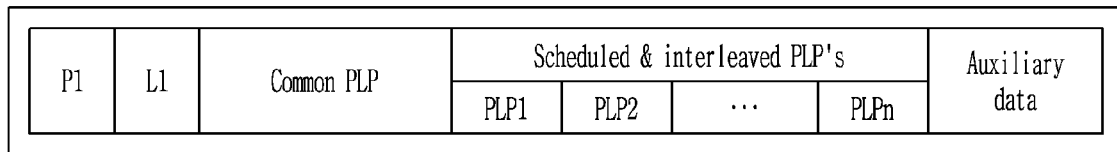

[Figure 83]
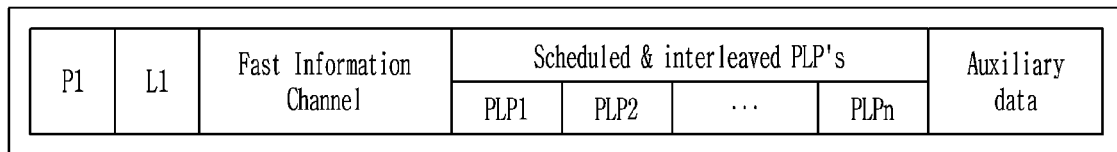

[Figure 84]

| Element or Attribute Name | Use | Description |
|---|---|---|
| MPD | | The root element that carries the Media Presentation Description for a Media Presentation |
| ... | | |
| @presentation StartTime | CM Must be present for @type='dynamic' | specifies the anchor for the presentation computations for any Segments in the Media Presentation. For @type='dynamic', this attribute shall be present. |
| ... | | |

Legend:

For attributes: M=Mandatory, O=Optional, OD=Optional with Default Value, CM=Conditionally Mandatory.

For elements: <minOccurs>..<maxOccurs> (N=unbounded)

Elements are bold; attributes are nonbold and preceded with an @.

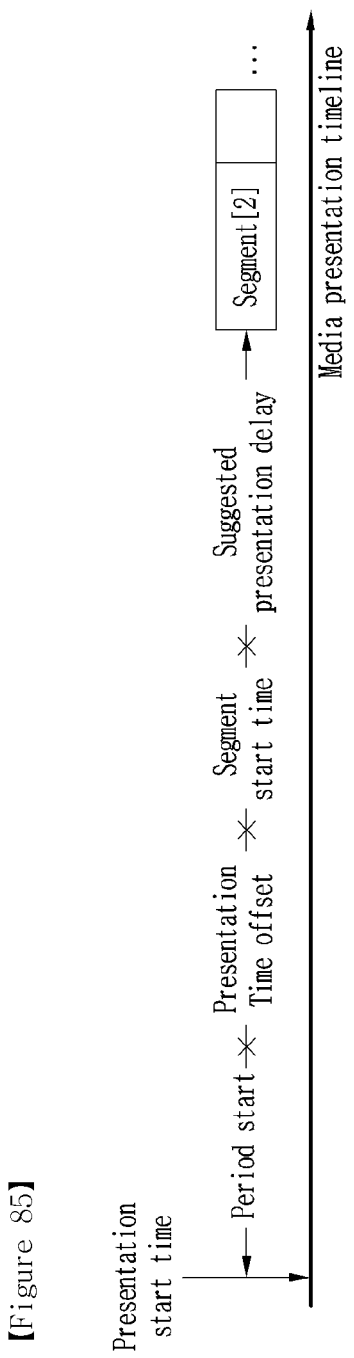
[Figure 85]

[Figure 86]
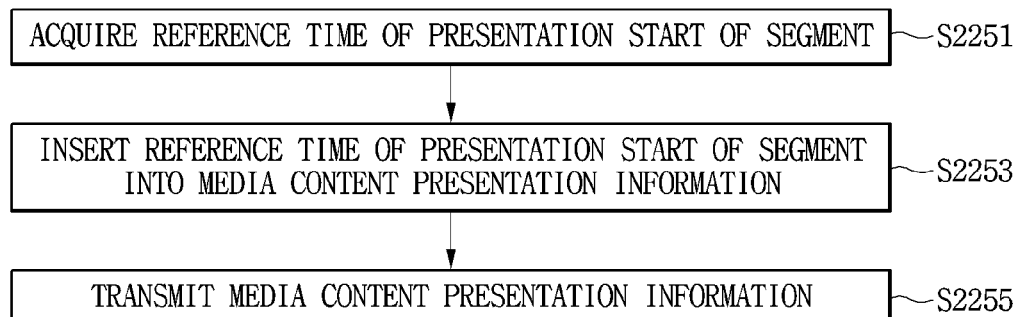

[Figure 87]
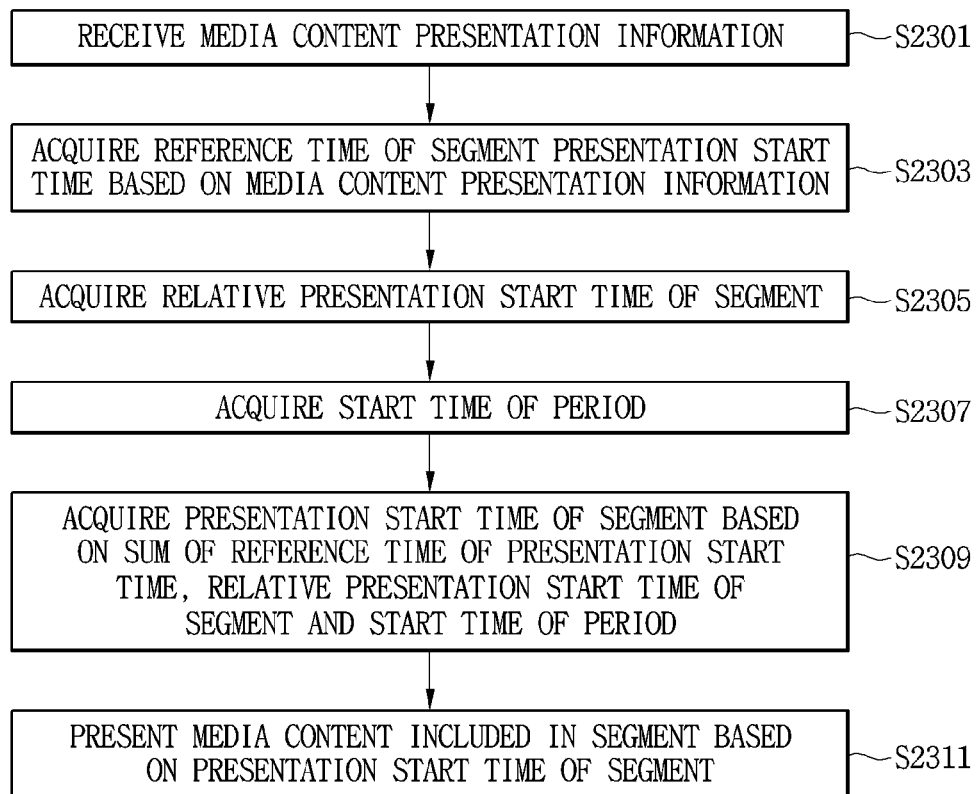

[Figure 88]

| | | |
|---|---|---|
| Presentable Component <> | | |
| represents a Presentable Component | | |
| Attributes | | |
| | Targeting / personalization properties | |
| | Content advisory rating | |
| | Content / Service protection properties | |
| | Target device(s) [0..n] Possible values | |
| | | All Devices |
| | | Primary Device |
| | | Companion Device |
| | | Inset on Primary Screen ( "Picture – in – Picture" ) |
| | AssociatedTo | |

[Figure 89]
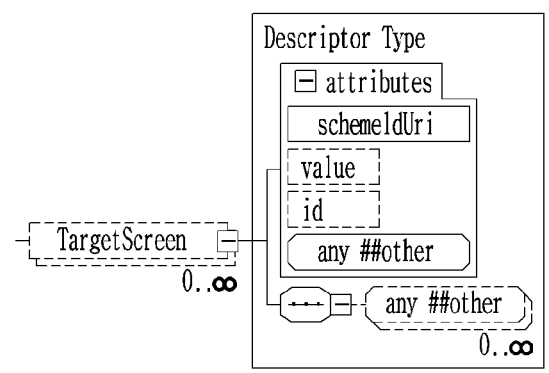

[Figure 90]

| TargetScreen@value | description |
|---|---|
| All | All devices |
| primary | Primary device, e.g., TV |
| companion | Companion device |
| Inset | Inset on primary screen |

[Figure 91]

```
<xs:element name="TargetingProperty"type="TargetingPropertyType"/>
<xs:complexType name="TargetingPropertyType">
  <xs:sequence maxOccurs="unbounded">
   <xs:element name="TargetingCriterion"type="TargetingCriterionType"/>
  </xs:sequence>
  <xs:attribute name="schemeIdUri"type="xs:anyURI"use="required"/>
</xs:complexType>
<xs:complexType name="TargetingCriterionType">
  <xs:sequence>
    <xs:element name="CriterionValue"type="xs:base64Binary"maxOccurs="unbounded"/>
  </xs:sequence>
  <xs:attribute name="id"type="xs:anyURI"use="required"/>
  <xs:attribute name="CriterionType"type="xs:unsignedByte"use="required"/>
</xs:complexType>
```

[Figure 92]
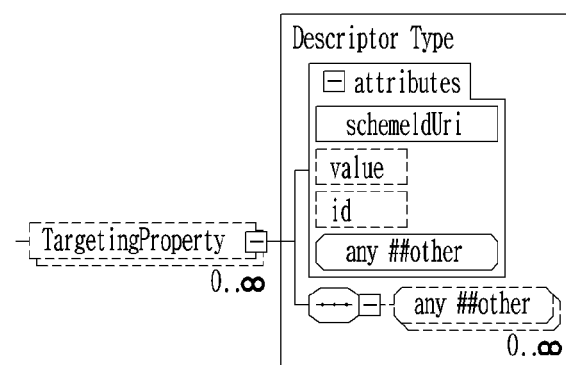

[Figure 93]
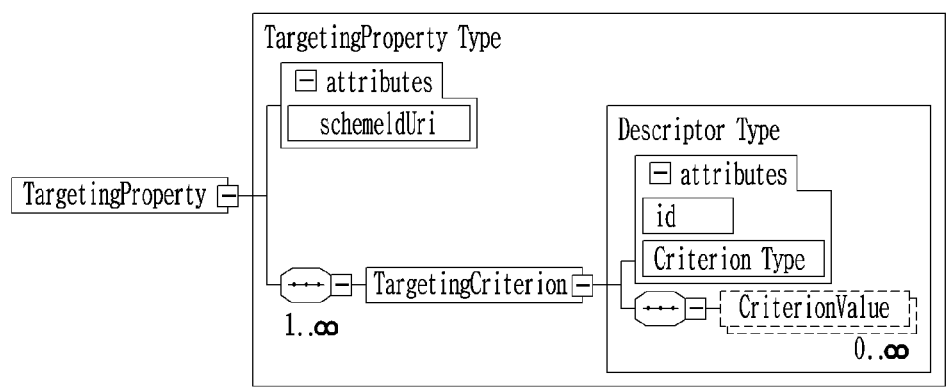

【Figure 94】

| Element or Attribute Name | Use | Description |
|---|---|---|
| Common attributes and elements | | |
| ... | | |
| @presentable | OD default:true | indicates as a presentable component |
| @associatedTo | O | specifies the associated Adaptation Sets or Representations by providing a white space separated list of the @id values of the associated Adaptation Sets or Representations. |
| TargetingProperty | 0 ... N | specifies targeting or personalization properties used for the associated Adaption Sets, Representations, or Sub Representations |
| TargetScreen | 0 ... N | specifies targeting screens or devices where the associated Adaption Sets, Representations, or Sub Representations can be offered or rendered. |
| Legend: For attributes: M=Mandatory, O=Optional, OD=Optional with Default Value, Elements are bold ; attributes are non bold and preceded with an @. | | |

[Figure 95]

```
<xs:complexType name =" RepresentationBaseType">
<xs:sequence >
  <xs:element name =" FramePacking " type=" DescriptorType" minOccurs ="0" maxOccurs ="unbounded"/>
  <xs:element name =" AudioChannelConfiguration " type=" DescriptorType " minOccurs ="0" maxOccurs="unbounded"/>
  <xs:element name =" ContentProtection" type=" DescriptorType" minOccurs ="0" maxOccurs ="unbounded"/>
  <xs:element name =" EssentialProperty" type=" DescriptorType" minOccurs ="0" maxOccurs ="unbounded"/>
  <xs:element name =" SupplementalProperty" type=" DescriptorType" minOccurs ="0" maxOccurs ="unbounded"/>
  <xs:element name =" InbandEventStream " type=" DescriptorType" minOccurs ="0" maxOccurs ="unbounded"/>
  <xs:element name =" TargetingProperty" type=" DescriptorType" minOccurs ="0" maxOccurs ="unbounded"/>
  <xs:element name =" TargetScreen " type=" DescriptorType" minOccurs ="0" maxOccurs ="unbounded"/>
  <xs:any namespace =" ##other" processContents ="lax" minOccurs ="0" maxOccurs ="unbounded"/>
< xs:sequence >
<xs:attribute name ="profiles" type="xs:string"/>
<xs:attribute name ="width" type="xs:unsignedInt"/>
<xs:attribute name ="height" type="xs:unsignedInt"/>
<xs:attribute name =" sar " type=" RatioType"/>
<xs:attribute name =" frameRate " type=" FrameRateType"/>
<xs:attribute name =" audioSamplingRate " type="xs:string"/>
<xs:attribute name =" mimeType " type="xs:string"/>
<xs:attribute name =" segmentProfiles" type="xs:string"/>
<xs:attribute name ="codecs" type="xs:string"/>
<xs:attribute name =" maximumSAPPeriod" type="xs:double"/>
<xs:attribute name =" startWithSAP " type=" SAPType"/>
<xs:attribute name =" maxPlayoutRate" type=" xs:double"/>
<xs:attribute name =" codingDependency " type="xs:boolean"/>
<xs:attribute name =" scanType " type=" VideoScanType"/>
<xs:attribute name =" associatedTo " type=" UIntVectorType"/>
<xs:attribute name =" presentable " type="xs:boolean"/>
< xs:anyAttribute namespace ="##other" processContents ="lax"/>
< xs:complexType>
```

[Figure 96]
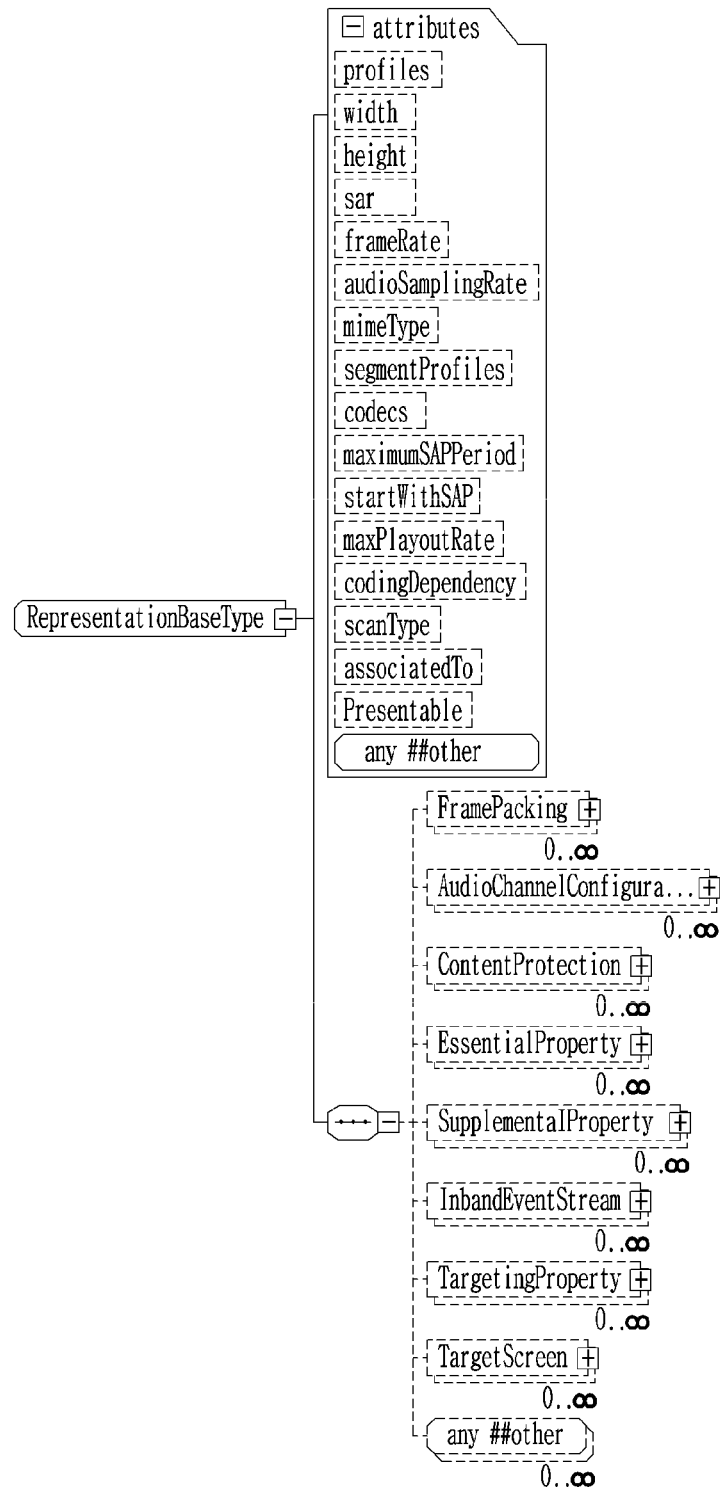

[Figure 97]

| Element or Attribute Name | Use | Description |
|---|---|---|
| Content Component | | description of a content component |
| ... | | |
| @presentable | OD default:true | indicates as a presentable component |
| @associatedTo | | specifies the associated Adaptation Sets or Representations by providing a white space separated list of the @id values of the associated Adaptation Sets or Representations. |
| TargetingProperty | 0 ... N | specifies targeting or personalization properties used for the associated Adaption Sets, Representations, or Sub-Representations |
| TargetScreen | 0 ... N | specifies targeting screens or devices where the associated Adaption Sets, Representations, or Sub Representations can be offered or rendered. |
| | | |

Legend:
    For attributes: M=Mandatory, O=Optional, OD=Optional with Default Value, CM=Conditionally Mandatory.
    For elements: <minOccurs>..<maxOccurs> (N=unbounded)
Elements are bold ; attributes are non bold and preceded with an @.

[Figure 98]

```
<xs:complexType name =" ContentComponentType"/>
<xs:sequence>
  <xs:element name ="Accessibility" type ="DescriptorType" minOccurs ="0"maxOccurs ="unbounded"/>
  <xs:element name ="Role " type ="DescriptorType" minOccurs ="0"maxOccurs ="unbounded"/>
  <xs:element name ="TargetingProperty" type="DescriptorType" minOccurs ="0"maxOccurs =" unbounded"/>
  <xs:element name ="TargetScreen " type ="DescriptorType" minOccurs ="0"maxOccurs ="unbounded"/>
  <xs:element name ="Rating " type ="DescriptorType" minOccurs ="0"maxOccurs ="unbounded"/>
  <xs:element name ="Viewpoint " type ="DescriptorType" minOccurs ="0"maxOccurs ="unbounded"/>
  <xs:any namespace ="## other"processContents ="lax"minOccurs ="0"maxOccurs ="unbounded"/>
</xs:sequence>
<xs:attribute name =" id" type ="xs:unsignedInt"/>
<xs:attribute name ="lang" type ="xs:language"/>
<xs:attribute name ="contentType " type="xs:string"/>
  <xs:attribute name ="par " type ="RatioType"/>
<xs:attribute name ="associatedTo " type ="UIntVectorType"/>
<xs:attribute name ="presentable " type ="xs:boolean"/>
<xs:anyAttribute namespace  ="## other"processContents ="lax"/>
</xs:complexType>
```

[Figure 99]
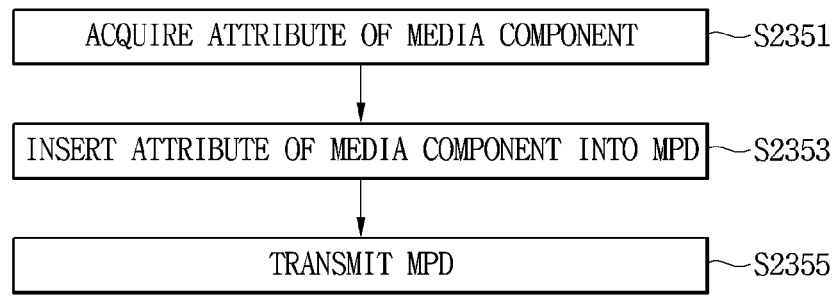

[Figure 100]
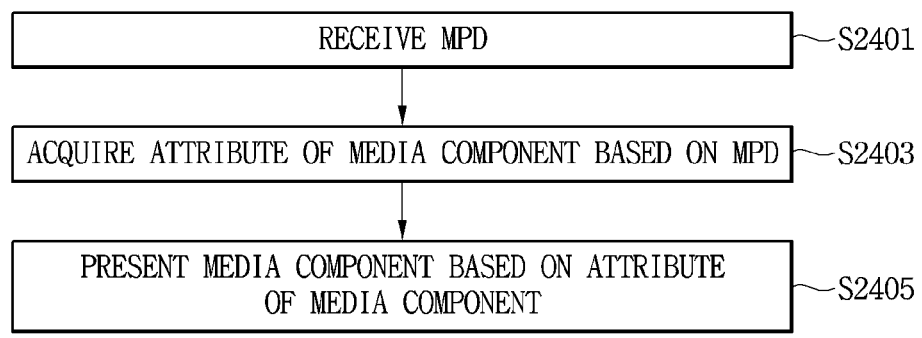

【Figure 101】

| Continuous Component | A Content Component that is presented in a continuous stream (e.g., audio, video or closed captioning). |
|---|---|
| Composite component | A Content Component that consists of a collection of Continuous Components which have the same Content type, and which represent the same scene, and which are to be combined in some combination to produce a presentation (e.g., music, dialog and effects audio components that are to be mixed to give complete audio, or left and right 3D views that are to be combined to give 3D pictures). |

[Figure 102]

```
<xs:complexType name ="CompositeType">
 <xs:sequence >
  <xs:element name =" TargetingProperty " minOccurs =" 0"/>
  <xs:element name =" AtscRating " minOccurs =" 0"/>
  <xs:element name =" TargetScreen  " minOccurs =" 0"/>
  <xs:any namespace =" ##other "processContents =" lax " minOccurs =" 0 " maxOccurs =" unbounded"/>
 </xs:sequence >
<xs:attribute  name =" contains" type =" UIntVectorType " use =" required"/>
<xs:attribute  name=" id" type =" xs:unsignedInt"/>
<xs:attribute  name=" presentable " type =" xs:boolean " default =" false"/>
<xs:attribute name =" associatedTo " type =" xs:unsignedInt"/>
<xs:anyAttribute namespace =" ##other "processContents=" lax"/>
</xs:complexType >
<!-- Whitespace-separated list of unsigned integers -->
<xs:simpleType name=" UIntVectorType">
<xs:list itemType =" xs:unsignedInt"/>
</xs:simpleType >
```

[Figure 103]
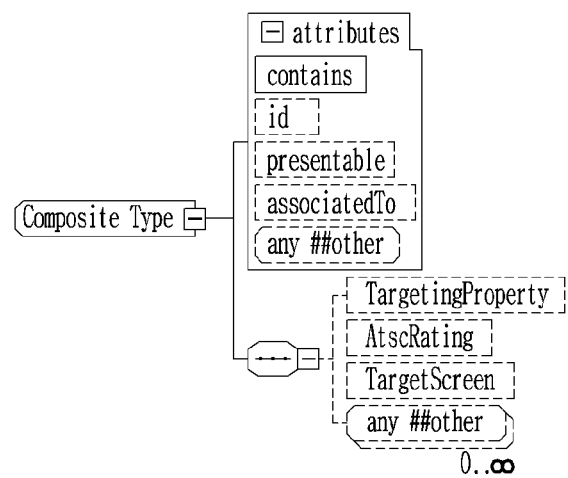

[Figure 104]

```
< xs :complexType name=" DescriptorType">
< xs :sequence >
  <xs :any namespace ="## other "processContents =" lax" minOccurs ="0 " maxOccurs =" unbounded"/>
</xs :sequence >
< xs :attribute name ="schemeIdUri " type =" xs :anyURI " use =" required"/>
< xs :attribute name =" value " type ="xs :string"/>
< xs :attribute name =" id" type ="xs :string"/>
< xs :anyAttribute namespace =" ## other "processContents =" lax"/>
</xs :complexType >
< xs :complexType name =" CompositeType ">
< xs :sequence >
< xs :element name =" TargetingProperty " type =" DescriptorType " minOccurs ="0 " maxOccurs ="unbounded"/>
< xs :element name =" AtscRating  " type =" DescriptorType  " minOccurs ="0 " maxOccurs ="unbounded"/>
< xs :element name =" TargetScreen  " type =" DescriptorType  " minOccurs ="0 " maxOccurs ="unbounded"/>
<xs :any namespace  ="## other "processContents =" lax" minOccurs ="0 " maxOccurs ="unbounded"/>
</xs :sequence >
< xs :attribute  name ="contains " type ="UIntVectorType" use =" required"/>
< xs :attribute name =" id" type ="xs :unsignedInt"/>
< xs :attribute  name ="presentable " type ="xs:boolean " default ="false"/>
< xs :attribute name =" associatedTo " type =" xs :unsignedInt"/>
< xs :anyAttribute  namespace =" ## other "processContents =" lax"/>
</xs :complexType >
```

[Figure 105]
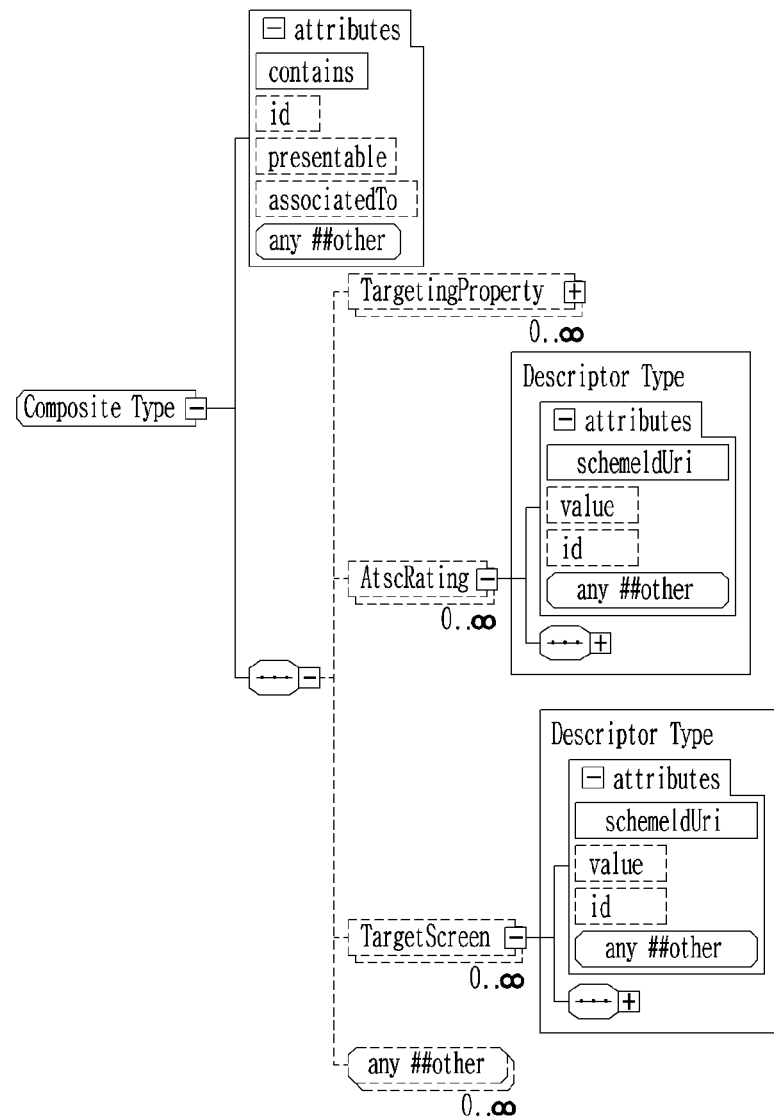

[Figure 106]

```
< xs :complexType name =" CompositeType">
< xs :complexContent >
<xs :extension base =" RepresentationBaseType">
< xs :sequence >
<xs :element name =" TargetingProperty " type ="DescriptorType " minOccurs =" 0 " maxOccurs ="unbounded"/>
<xs :element name =" AtscRating " type =" DescriptorType " minOccurs ="0 " maxOccurs =" unbounded"/>
<xs :element name =" TargetScreen  " type =" DescriptorType " minOccurs ="0 " maxOccurs ="unbounded"/>
<xs :any namespace =" ## other "processContents  =" lax" minOccurs  ="0 " maxOccurs ="unbounded"/>
</xs :sequence >
< xs :attribute  name ="contains " type ="UIntVectorType " use ="required"/>
< xs :attribute name =" id" type ="xs :unsignedInt"/>
< xs :attribute  name ="presentable " type ="xs :boolean " default ="false"/>
< xs :attributename =" associatedTo " type =" xs :unsignedInt"/>
< xs :anyAttribute namespace ="## other "processContents ="lax"/>
</xs :extension >
</ xs :complexContent >
</xs :complexType >
```

[Figure 107]

```
< xs :complexType name ="CompositeType">
< xs :complexContent >
< xs :extension base ="RepresentationBaseType">
< xs :sequence >
< xs :element name ="AtscRating " type =" DescriptorType " minOccurs=" 0 " maxOccurs ="unbounded"/>
<xs :any namespace ="## other"processContents =" lax" minOccurs="0 " maxOccurs ="unbounded"/>
</xs :sequence >
< xs :attribute name ="contains" type ="UIntVectorType " use ="required"/>
< xs :attribute name =" id" type ="xs :unsignedInt"/>
< xs :anyAttribute namespace =" ## other" processContents ="lax"/>
</xs :extension >
</xs :complexContent >
</xs :complexType >
```

[Figure 108]
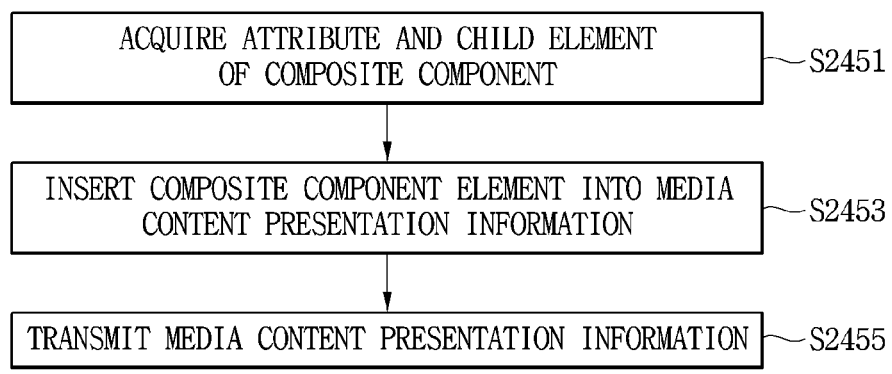

[Figure 109]
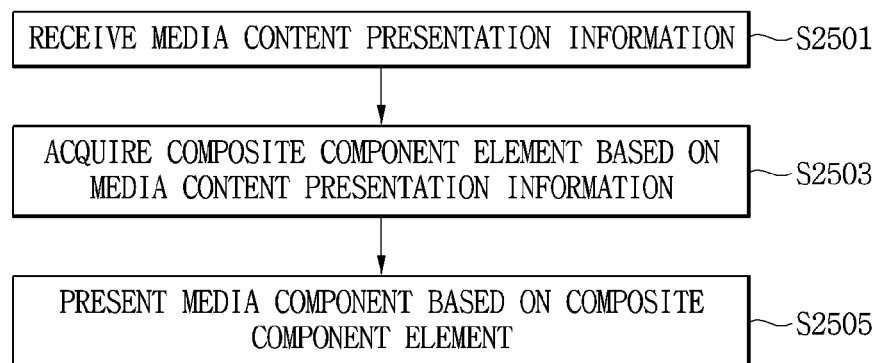

[Figure 110]
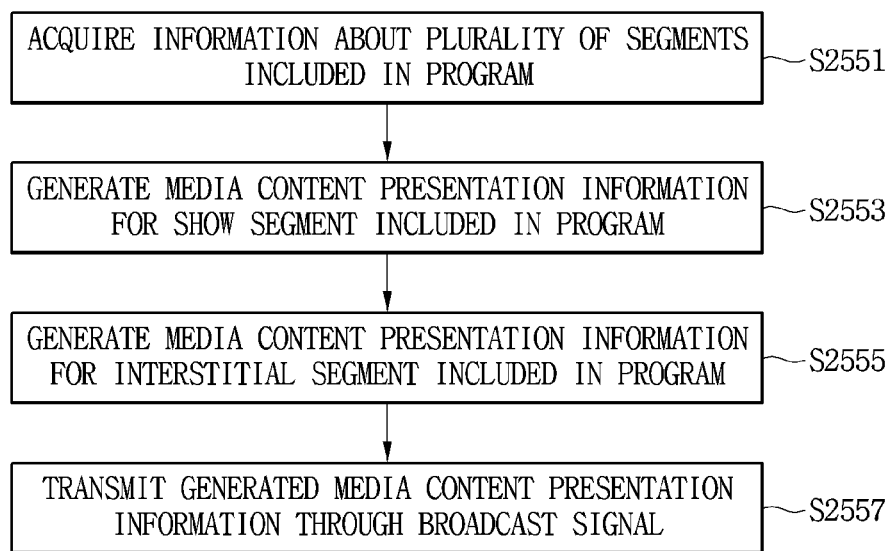

[Figure 111]
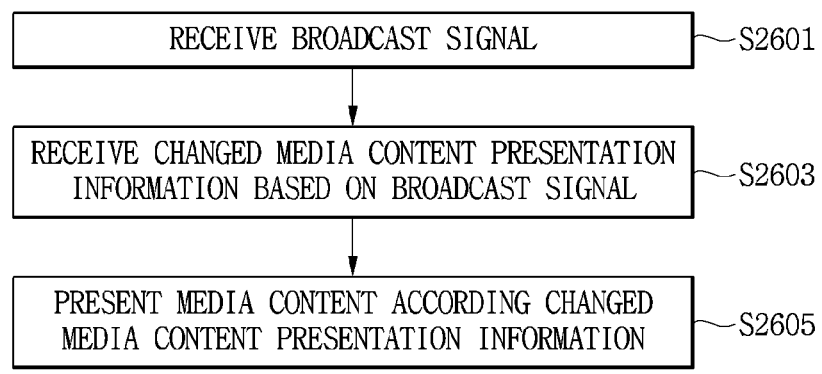

[Figure 112]

```
Service_id
..
num_components{
    representation_id
    IP_address
    port
    tsi
    dataPipe_id
}
 num_app_signaling{
    app_signaling_id
    FLUTE delivery session
}
```

[Figure 113]
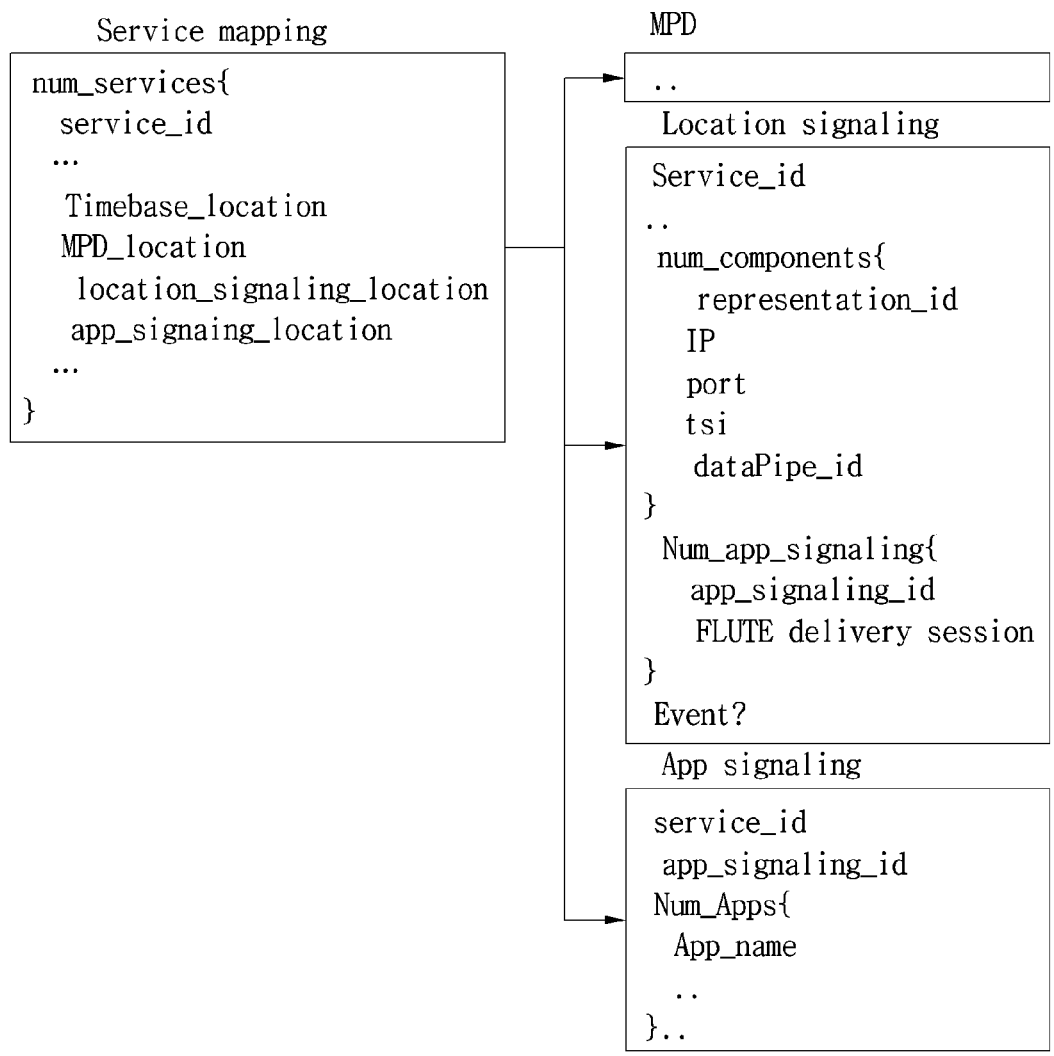

BROADCAST TRANSMISSION DEVICE, BROADCAST RECEPTION DEVICE, OPERATING METHOD OF BROADCAST TRANSMISSION DEVICE, AND OPERATING METHOD OF BROADCAST RECEPTION DEVICE

CROSS REFERENCE TO RELATED APPLICATINS

This application is the National Phase of PCT International Application No. PCT/KR2015/003583, filed of Apr. 9, 2015, which claims priority under 35 U.S.C. 119(e) to U.S. Provisional application No. 61/977,593, filed on Apr. 9, 2014, U.S. provisional Application No. 61/981,210, filed on Apr. 18, 2014, and U.S. Provisional Application No. 61/983,436, filed on Apr. 23, 2014, all of which are hereby expressly incorporated by reference into the present application.

TECHNICAL FIELD

The present invention relates to a broadcast transmission device, a broadcast reception device, an operating method of the broadcast transmission device, and an operating method of the broadcast reception device.

BACKGROUND ART

With the development of digital broadcast and communication environments, hybrid broadcasts using communication networks (e.g., broadband) in addition to an existing broadcast network have been in the spotlight. Additionally, such hybrid broadcasts provide applications or broadcast services interoperating with terminal devices such as smartphones or tablets. Also, the hybrid broadcasts have provided applications associated with broadcast services and a personalization function for providing content suitable for each user.

In order for the hybrid broadcasts, a broadcast reception device is required to freely access communication a network (e.g., broadband). Also, the broadcast reception device is required to present content received via the communication networks (e.g., broadband). To this end, the broadcast reception device and a broadcast transmission device necessarily support a content transport protocol that supports both the broadcast network and the communication network (e.g., broadband). Therefore, it is suggested that the broadcast transmission device and the broadcast reception device use the MPEG-Dynamic Adaptive Streaming over HTTP (DASH) that is a standard technology for adaptively transmitting media content according to a network environment and MEPG Media Transport (MMT) that is a transmission standard for efficiently transmitting media content via an IP network.

DISCLOSURE OF THE INVENTION

Technical Problem

Embodiments of the present invention provide a broadcast transmission device, a broadcast reception device, an operating method of the broadcast transmission device, and an operating method of the broadcast reception device, which provide transmission and presentation of media content via a communication network (e.g., broadband) and a broadcast network.

Technical Solution

In one embodiment, an operating method of a broadcast reception device includes receiving a broadcast signal; receiving media content presentation information including information necessary to present media content based on the broadcast signal; and presenting the media content based on the media content presentation information.

The operating method of the broadcast reception device may further include acquiring an attribute of a media component included in the media content from the media content presentation information, wherein the presenting of the media content based on the media content presentation information may include presenting the media component based on the attribute of the media component.

The acquiring of the attribute of the media component included in the media content from the media content presentation information may include acquiring an attribute of a composite component, which is a collection of a plurality of media components necessary to present one scene, from the media content presentation information, and the presenting of the media component based on the attribute of the media component may include presenting the composite component based on the attribute of the composite component.

The attribute of the composite component may include a child attribute for identifying the plurality of media components included in the composite component, and the presenting of the composite component based on the attribute of the composite component may include presenting the composite component based on the child attribute for identifying the plurality of media components include in the composite component.

The attribute of the composite component may include an attribute for indicating whether the composite component is a presentable media component, and the presenting of the composite component based on the attribute of the composite component may include presenting the composite component based on the attribute for indicating whether the composite component is a presentable media component.

The acquiring of the attribute of the media component included in the media content from the media content presentation information may include acquiring an attribute for identifying a media component associated with the media component from the media content presentation information, and the presenting of the media component based on the attribute of the media component may include presenting the media component based on the attribute for identifying the media component associated with the media component.

The presenting of the media component based on the attribute for identifying the media component associated with the media component may include presenting the media component associated with the media component.

The acquiring of the attribute of the media component included in the media content from the media content presentation information may include acquiring an attribute for indicating a device targeted by the media component from the media content presentation information, and the presenting of the media component based on the attribute of a media component may include presenting the media component based on the attribute for indicating a device targeted by the media component.

The attribute for indicating a device targeted by the media component may indicate at least one of a primary screen representing a screen of a device which directly receives the broadcast signal, a companion device connected to and interworking with the primary screen, and an insert screen as a part of the primary screen.

The operating method of the broadcast reception device may further include acquiring a reference time of a presentation start time of a segment from the media content presentation information; and acquiring the presentation start time of the segment based on the reference time of the presentation start time, wherein the presenting of the media content based on the media content presentation information may include presenting media content included in the segment, and the segment may be a transport unit for transmitting the media content.

The acquiring of the presentation start time of the segment based on the reference time of the presentation start time may include acquiring the presentation start time of the segment based on a start time of a period representing a continuous time interval of the media content, a relative presentation start time based on the start time of the period, and the reference time of the presentation start time.

The acquiring of the media content presentation information based on the broadcast signal may include acquiring a signaling message from the broadcast signal; and acquiring a first element for indicating a transmission method of the media content presentation information from the signaling message and a second element for signaling the media content presentation information according to the transmission method of the media content presentation information.

The first element may indicate that at least one of the media content presentation information and an identifier of an address at which it is possible to receive the media content presentation information is transmitted by a session-based transport protocol, and the second element may include an identifier of a session-based transport protocol session.

The first element may indicate that at least one of the media content presentation information and the identifier of the address at which it is possible to receive the media content presentation information is transmitted by the session-based transport protocol in a second broadcast stream different from a first broadcast stream for transmitting the signaling message, and the second element may include an identifier of a session-based transport protocol session and an identifier of a broadcast stream for identifying the second broadcast stream.

The identifier of the broadcast stream may indicate a logical data transport path included in a radio frequency channel.

The first element may indicate that at least one of the media content presentation information and an identifier of an address at which it is possible to receive the media content presentation information is transmitted by a packet-based transport protocol, and the second element may include an identifier of a packet-based transport protocol packet.

The first element may indicate that at least one of the media content presentation information and an identifier of an address at which it is possible to receive the media content presentation information is transmitted by the packet-based transport protocol in a second broadcast stream different from a first broadcast stream for transmitting the signaling message, and the second element may include an identifier of a packet-based transport protocol packet and an identifier of a broadcast stream for identifying the second broadcast stream.

The first element may indicate that the media content presentation information is transmitted in a state of being included in an Internet protocol (IP) datagram, and the second element may include a port number and an IP address for identifying the IP datagram.

In another embodiment, a broadcast reception device for receiving a broadcast signal, includes: a broadcast receiving unit configured to receive a broadcast signal; and a control unit configured to receive media content presentation information including information necessary to present media content based on the broadcast signal and presenting the media content based on the media content presentation information.

In another embodiment, a broadcast transmission device for transmitting a broadcast signal includes: a control unit configured to acquire media content presentation information including information necessary to present media content and generate the broadcast signal based on the media content presentation information; and a transmitting unit configured to transmit the broadcast signal.

Advantageous Effects

One embodiment of the present invention provides a broadcast transmission device, a broadcast reception device, an operating method of the broadcast transmission device, and an operating method of the broadcast reception device, which provide transmission and presentation of media content via a communication network (e.g., broadband) and a broadcast network.

BRIEF DESCRIPTION OF THE DRAWINGS

FIG. 1 illustrates a structure of an apparatus for transmitting broadcast signals for future broadcast services according to an embodiment of the present invention.

FIG. 2 illustrates an input formatting block according to one embodiment of the present invention.

FIG. 3 illustrates an input formatting block according to another embodiment of the present invention.

FIG. 4 illustrates a BICM block according to an embodiment of the present invention.

FIG. 5 illustrates a BICM block according to another embodiment of the present invention.

FIG. 6 illustrates a frame building block according to one embodiment of the present invention.

FIG. 7 illustrates an orthogonal frequency division multiplexing (OFMD) generation block according to an embodiment of the present invention.

FIG. 8 illustrates a structure of an apparatus for receiving broadcast signals for future broadcast services according to an embodiment of the present invention.

FIG. 9 illustrates a frame structure according to an embodiment of the present invention.

FIG. 10 illustrates a signaling hierarchy structure of the frame according to an embodiment of the present invention.

FIG. 11 illustrates preamble signaling data according to an embodiment of the present invention.

FIG. 12 illustrates PLS1 data according to an embodiment of the present invention.

FIG. 13 illustrates PLS2 data according to an embodiment of the present invention.

FIG. 14 illustrates PLS2 data according to another embodiment of the present invention.

FIG. 15 illustrates a logical structure of a frame according to an embodiment of the present invention.

FIG. 16 illustrates PLS mapping according to an embodiment of the present invention.

FIG. 17 illustrates EAC mapping according to an embodiment of the present invention.

FIG. 18 illustrates FIC mapping according to an embodiment of the present invention.

FIG. 19 illustrates a type of DP according to an embodiment of the present invention.

FIG. 20 illustrates a time interleaving according to an embodiment of the present invention.

FIG. 21 illustrates the basic operation of a twisted row-column block interleaver according to an embodiment of the present invention.

FIG. 22 illustrates an operation of a twisted row-column block interleaver according to another embodiment of the present invention.

FIG. 23 illustrates a diagonal-wise reading pattern of a twisted row-column block interleaver according to an embodiment of the present invention.

FIG. 24 illustrates interlaved XFECBLOCKs from each interleaving array according to an embodiment of the present invention.

FIG. 25 is a block diagram illustrating a media content transmitting/receiving system according to an embodiment of the present invention.

FIG. 26 is a diagram illustrating a system for transmitting/receiving media content via an IP network according to an embodiment of the present invention.

FIG. 27 illustrates a structure of a media presentation description (MPD) according to an embodiment of the present invention.

FIG. 28 illustrates an XML syntax of the MPD according to an embodiment of the present invention.

FIG. 29 illustrates an XML syntax of a period element of the MPD according to an embodiment of the present invention.

FIG. 30 is a flowchart illustrating an operation of receiving, by a broadcast reception device, media content via an IP network according to an embodiment of the present invention.

FIG. 31 illustrates a bitstream syntax for the case where the MPD is transmitted in a format of an MPD information table according to an embodiment of the present invention.

FIG. 32 is a flowchart illustrating an operation of extracting, by the broadcast reception device, the MPD based on an information table including the MPD according to an embodiment of the present invention.

FIG. 33 illustrates an MPD link table including an MPD link according to an embodiment of the present invention.

FIG. 34 is a flowchart illustrating an operation of receiving, by the broadcast reception device, the MPD based on a media content presentation information table including a media content presentation information link according to an embodiment of the present invention.

FIG. 35 illustrates that the MPD or the MPD information table is added to an IP datagram so as to be transmitted according to an embodiment of the present invention.

FIG. 36 illustrates a syntax of the IP datagram for the case where the MPD or the MPD information table is added to the IP datagram so as to be transmitted according to an embodiment of the present invention.

FIG. 37 illustrates a syntax of an MPD payload included in the IP datagram for the case where the MPD or the MPD information table is added to the IP datagram so as to be transmitted according to an embodiment of the present invention.

FIG. 38 is a flowchart illustrating an operation of extracting, by the broadcast reception device, the media content presentation information or the media content presentation information table based on the IP datagram including the media content presentation information or the media content presentation information table according to an embodiment of the present invention.

FIG. 39 illustrates a syntax of an MPD descriptor for transmitting the MPD according to an embodiment of the present invention.

FIG. 40 illustrates a syntax of MPD bootstrap_data in the case where the MPD descriptor directly includes the MPD.

FIG. 41 illustrates a syntax of MPD bootstrap_data in the case where the MPD descriptor includes a link to the MPD.

FIG. 42 illustrates the syntax of the MPD bootstrap_data in the case where the MPD descriptor includes an identifier of a data packet including the MPD.

FIG. 43 illustrates the syntax of the MPD bootstrap_data in the case where the MPD descriptor includes an identifier of an additional broadcast stream including the MPD.

FIG. 44 illustrates the syntax of the MPD bootstrap_data in the case where the MPD descriptor includes information on an IP datagram including the MPD.

FIG. 45 illustrates the syntax of the MPD bootstrap_data in the case where the MPD descriptor includes information on a session of a session-based transport protocol for transmitting the MPD.

FIG. 46 is a flowchart illustrating an operation of receiving, by the broadcast reception device, the media content presentation information in the case where a method of transmitting the media content presentation information is added to a broadcast information signaling information table so as to be transmitted.

FIG. 47 is a flowchart illustrating an operation of presenting, by the broadcast reception device, media content based on whether transmission of a broadcast stream is stable in the case where broadcast content is transmitted via not only a broadcasting network but also an IP network.

FIG. 48 illustrates a syntax of a signaling message for signaling a hybrid broadcast service according to an embodiment of the present invention.

FIG. 49 illustrates a syntax of a signaling message for signaling a hybrid broadcast service according to another embodiment of the present invention.

FIG. 50 illustrates an example in which MPDs are identified by using sequence numbers of signaling messages for signaling a hybrid broadcast service according to another embodiment of the present invention.

FIG. 51 illustrates a syntax of a signaling message when the signaling message includes an MPD in the form of data according to another embodiment of the present invention.

FIG. 52 illustrates a value of a data type when the signaling message includes an MPD in the form of data according to another embodiment of the present invention.

FIG. 53 illustrates a syntax of a signaling message including an MPD along with an identifier for identifying the MPD, when the signaling message includes the MPD in the form of data according to another embodiment of the present invention.

FIG. 54 illustrates a syntax of a signaling message when the signaling message signals an identifier for indicating an address at which it is possible to receive an MPD, according to another embodiment of the present invention.

FIG. 55 illustrates a syntax of a signaling message for signaling an identifier for identifying an MPD along with when the signaling message signals an identifier for indicating an address at which it is possible to receive the MPD, according to another embodiment of the present invention.

FIG. 56 illustrates an example in which a signaling message includes a type of a media content presentation information transmission method and signals transmission of media content presentation information according to the transmission method, according to another embodiment of the present invention.

FIG. 57 is a table showing values indicating types of a media content presentation transmission method when a signaling message signals a type of the media content presentation transmission method, according to another embodiment of the present invention.

FIG. 58 illustrates an example in which a signaling message signals transmission of media content presentation information when a media content presentation information transmission method of the signaling message is transmission via the same broadcast stream as a broadcast stream for transmitting the signaling message or via an IP packet stream of a cellular network, according to another embodiment of the present invention.

FIG. 59 illustrates an example in which a signaling message signals transmission of media content presentation information when a media content presentation information transmission method of the signaling message is transmission via an IP packet stream of a different broadcast stream from a broadcast stream for transmitting the signaling message, according to another embodiment of the present invention.

FIG. 60 illustrates an example in which a signaling message signals transmission of media content presentation information when a media content presentation information transmission method of the signaling message is transmission via a session-based transport protocol of the same broadcast stream as a broadcast stream for transmitting the signaling message, according to another embodiment of the present invention.

FIG. 61 illustrates an example in which a signaling message signals transmission of media content presentation information when a media content presentation information transmission method of the signaling message is transmission via a session-based transport protocol of a different broadcast stream from a broadcast stream for transmitting the signaling message, according to another embodiment of the present invention FIG. 62 illustrates an example in which a signaling message signals transmission of media content presentation information when a media content presentation information transmission method of the signaling message is transmission via a packet-based transport protocol of the same broadcast stream as a broadcast stream for transmitting the signaling message, according to another embodiment of the present invention.

FIG. 63 illustrates an example in which a signaling message signals transmission of media content presentation information when a media content presentation information transmission method of the signaling message is transmission via a packet-based transport protocol of a different broadcast stream from a broadcast stream for transmitting the signaling message, according to another embodiment of the present invention.

FIG. 64 illustrates signaling of transmission of an identifier of an address at which it is possible to receive a signaling message including media content presentation information or a media content presentation information address identifier, according to another embodiment of the present invention.

FIG. 65 is a flowchart of an operation of transmitting, by a broadcast transmission device, a broadcast signal including a media signaling message.

FIG. 66 illustrates a flowchart of an operation of acquiring, by a broadcast reception device, media content transmission information and presenting media content, based on a signaling message.

FIG. 67 illustrates a syntax of a broadcast stream packet including synchronization information of media content transmitted via a communication network according to an MPEG-DASH standard.

FIG. 68 illustrates a syntax of synchronization information added to the header of a packet including broadcast content such as a video or an audio according to an embodiment of the present invention.

FIG. 69 illustrates the syntax of synchronization information added to the header of a packet including broadcast content such as a video or an audio according to another embodiment of the present invention.

FIG. 70 is a flowchart of an operation of synchronizing, by a broadcast reception device, broadcast content with media content, according to an embodiment.

FIG. 71 illustrate a format of information for identifying broadcast content included in media content presentation information when broadcast content is transmitted according to the ATSC standard.

FIG. 72 illustrates an example of an MPD of MPEG-DASH including information for identifying broadcast content transmitted according to the ATSC standard.

FIG. 73 illustrates a flowchart of an operation of receiving, by a broadcast reception device, broadcast content based on media content presentation information.

FIG. 74 illustrates a block diagram for describing an example in which where the broadcast reception device receives an MPD of MPEG-DASH via a broadcast network for transmitting a broadcast stream according to the MPEG-2 TS standard.

FIG. 75 is a block diagram for describing an example in which a broadcast reception device synchronizes broadcast content of a broadcast stream transmitted according to the MPEG-2 TS standard with media content transmitted via a communication network.

FIG. 76 illustrates a configuration of a broadcast reception device according to an embodiment of the present invention.

FIG. 77 illustrates a configuration of a broadcast reception device according to another embodiment of the present invention.

FIG. 78 illustrates a configuration of a broadcast reception device according to another embodiment of the present invention.

FIG. 79 is a flowchart of an operation of scanning, by a broadcast reception device, broadcast services and generating a channel map.

FIG. 80 is a flowchart of an operation of receiving, by a broadcast reception device, a broadcast service.

FIG. 81 illustrates a flowchart of an operation of acquiring, by a broadcast reception device, a media component based on media content presentation information.

FIG. 82 illustrates a broadcast transport frame according to an embodiment of the present invention.

FIG. 83 illustrates a broadcast transport frame according to another embodiment of the present invention.

FIG. 84 illustrates an element indicating a reference time of a presentation start time of each segment of MPEG-DASH in an MPD.

FIG. 85 illustrates a relationship between an element indicating a reference time of a presentation start time of each segment of MPEG-DASH in an MPD and a presentation start time of each segment.

FIG. 86 is a flowchart of an operation of adding and transmitting, by a broadcast transmission device, an element indicating a reference time of a presentation start time of each segment of MPEG-DASH to media content presentation information FIG. 87 is a flowchart of an operation of acquiring, by a broadcast reception device, a presentation start time of each segment according to an element indicating a reference time of a presentation start time of each segment of MPEG-DASH in media content presentation information.

FIG. 88 illustrates attributes which a presentable component can have.

FIG. 89 illustrates an element for indicating a target screen of each adaptation and representation.

FIG. 90 illustrates a relationship between a value of a value element of an element for indicating a target screen and a target screen.

FIG. 91 illustrates a targeting property with the form of an XML element when an MPD includes the targeting property.

FIG. 92 illustrates a relationship between the targeting property and child properties which the targeting property includes.

FIG. 93 illustrates a relationship between a targeting property and child elements which the targeting property includes FIG. 94 illustrates a syntax of an MPD when the MPD includes an element indicating as a presentable component, an element indicating an associated media component, an element indicating a targeting property, and an element indicating a target screen as a common element.

FIG. 95 illustrates a syntax of an MPD with an XML format when the MPD includes an element indicating as a presentable component, an element indicating an associated media component, an element indicating a targeting property, and an element indicating a target screen as a common element.

FIG. 96 illustrates a relationship with another representation element when an MPD includes an element indicating as a presentable component, an element indicating an associated media component, an element indicating a targeting property, and an element indicating a target screen, as a representation element.

FIG. 97 illustrates a syntax of an MPD when the MPD includes an element indicating as a presentable component, an element indicating an associated media component, an element indicating a targeting property, and an element indicating a target screen, as an adaptation set or representation element.

FIG. 98 illustrates an MPD with an XML format when the MPD includes an element indicating as a presentable component, an element indicating an associated media component, an element indicating a targeting property, and an element indicating a target screen, as an adaptation set or representation element.

FIG. 99 illustrates an operation of a broadcast transmission device for transmitting media content presentation information including attributes of a media component.

FIG. 100 illustrates an operation of a broadcast reception device based on attributes of a media component included in media content presentation information.

FIG. 101 illustrates definition of a continuous component and a composite component for a hybrid broadcast service.

FIG. 102 illustrates an XML element form of an element capable of representing a composite component.

FIG. 103 illustrates relationship between attributes included in a composite component element and child elements.

FIG. 104 illustrates an XML format of a composite component element when the composite component element includes a child element.

FIG. 105 illustrates a relationship between a composite component element and child elements and attributes included in the child elements.

FIG. 106 illustrates an XML format when an MPD includes a composite element as a common element.

FIG. 107 illustrates an XML format when an MPD includes a composite element as an adaptation element or a representation element.

FIG. 108 is a flowchart of an operation of transmitting, by a broadcast transmission device, media content presentation information including a composite component element.

FIG. 109 is a flowchart of an operation of a broadcast reception device based on a composite component element included in media content presentation information.

FIG. 110 illustrates an operation of changing and transmitting, by a broadcast transmission device media content presentation information during transmission of a broadcast signal.

FIG. 111 illustrates an operation of changing and receiving, by a broadcast reception device, media content presentation information during reception of a broadcast signal.

FIG. 112 illustrates information included in information for signaling a broadcast service for a hybrid broadcast.

FIG. 113 illustrates a specific syntax of information for signaling a broadcast service for a hybrid broadcast.

MODE FOR CARRYING OUT THE INVENTION

Hereinafter, embodiments of the present invention will be described in more detail with reference to the accompanying drawings, in order to allow those skilled in the art to easily realize the present invention. The present invention may be realized in different forms, and is not limited to the embodiments described herein. Moreover, detailed descriptions related to well-known functions or configurations will be ruled out in order not to unnecessarily obscure subject matters of the present invention. Like reference numerals refer to like elements throughout.

In additional, when a part "includes" some components, this means that the part does not exclude other components unless stated specifically and further includes other components.

The present invention provides broadcast signal transmitting/receiving device and method. According to the embodiment of the present invention, the further broadcast services include a terrestrial broadcasting service, a mobile broadcasting server, and UHDTV service. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas. The present invention may defines three physical layer (PL) profiles (base, handheld and advanced profiles) each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | $\leq 2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | $\leq 2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | $\leq 2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8 bit field identifies uniquely a DP within the system identified by the SYSTEM_ID dummy cell: cell carrying a pseudorandom value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFTsize.

reserved for future use: not defined by the present document but may be defined in future superframe: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component (s)

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-

TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler. The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates a BICM block according to an embodiment of the present invention.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, $e_1$. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ ($e_{1,i}$ and $e_{2,i}$) are fed to the input of the MIMO Encoder. Paired MIMO Encoder output (g1,i and g2,i) is transmitted by the same carrier k and OFDM symbol 1 of their respective TX antennas.

The above-described blocks may be omitted or replaced by blocks having similar or identical functions.

FIG. 5 illustrates a BICM block according to another embodiment of the present invention.

The BICM block illustrated in FIG. 5 corresponds to an embodiment of the BICM block 1010 described with reference to FIG. 1.

FIG. 5 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 5, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permuted before LDPC encoding.

The LDPC encoding block can encode the output of the BCH encoding/zero insertion block using LDPC code. To generate a complete coded block, $C_{ldpc}$, parity bits, $P_{ldpc}$ are encoded systematically from each zero-inserted PLS information block, $I_{ldpc}$ and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math FIG. 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ (=$N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS2 data.

When shortening is applied to the PLS1 data protection, some LDPC parity bits are punctured after LDPC encoding. Also, for the PLS2 data protection, the LDPC parity bits of PLS2 are punctured after LDPC encoding.

These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

FIG. 6 illustrates a frame building block according to one embodiment of the present invention.

The frame building block illustrated in FIG. 6 corresponds to an embodiment of the frame building block 1020 described with reference to FIG. 1.

Referring to FIG. 6, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

FIG. 7 illustrates an OFMD generation block according to an embodiment of the present invention.

The OFMD generation block illustrated in FIG. 7 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 7, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9020 can convert the input signals into bit domain data and then deinterleave the same as necessary. The demapping & decoding module 9020 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 8300 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

FIG. 9 illustrates a frame structure according to an embodiment of the present invention.

FIG. 9 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 10 illustrates a signaling hierarchy structure of the frame according to an embodiment of the present invention.

FIG. 10 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2 -STAT data and PLS2-DYN data. The static and dynamic portion of PLS2 data is followed by padding, if necessary.

FIG. 11 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY Profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If this field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 12 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the $(i+1)^{th}$ (i is the loop index) frame of the associated FRU. This field uses the same signaling format as shown in the table 8.

FRU_FRAME_LENGTH: This 2-bit field indicates the length of the $(i+1)^{th}$ frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the $(i+1)^{th}$ frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |

TABLE 11-continued

| Value | PLS2_MODE |
| --- | --- |
| 011 | NUQ-64 |
| 100~111 | Reserved |

PLS2_SIZE_CELL: This 15-bit field indicates $C_{total\_partial\_block}$ the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates $C_{total\_partial\_block}$ the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates $C_{total\_full\_block}$, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 13 illustrates PLS2 data according to an embodiment of the present invention.

FIG. 13 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
| --- | --- |
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 0000 | FR-SM |
| 0001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates $P_I$, the number of the frames to which each TI group is mapped, and there is one TI-block per TI group ($N_{TI}$=1). The allowed $P_I$ values with 2-bit field are defined in the below table 18.

If the DP_TI_TYPE is set to the value '0', this field indicates the number of TI-blocks $N_{TI}$ per TI group, and there is one TI group per frame ($P_I$=1). The allowed $P_I$ values with 2-bit field are defined in the below table 18.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |

TABLE 19-continued

| Value | Payload Type |
|---|---|
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 14 illustrates PLS2 data according to another embodiment of the present invention.

FIG. 14 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version_number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 15 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

FIG. 16 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the $N_{FSS}$ FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

FIG. 17 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 17. Depending on the EAS message size, EAC cells may occupy a few symbols, as shown in FIG. 17.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 18 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

FIG. 19 illustrates an FEC structure according to an embodiment of the present invention.

FIG. 19 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$ bits), and then LDPC encoding is applied to BCH-encoded BBF ($K_{bch}$ bits=$N_{bch}$ bits) as illustrated in FIG. 22.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed $B_{ldpc}$ (FECBLOCK) are expressed as follow Math figure.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math FIG. 3]

The parameters for long FECBLOCK and short FECBLOCK are given in the above table 28 and 29, respectively.

The detailed procedure to calculate $N_{ldpc} - K_{ldpc}$ parity bits for long FECBLOCK, is as follows:

1) Initialize the parity bits, $$p_0 = p_1 = p_2 = \cdots = p_{N_{ldpc}-K_{ldpc}-1} =$$ [Math FIG. 4]

2) Accumulate the first information bit—$i_0$, at parity bit addresses specified in the first row of an addresses of parity check matrix. The details of addresses of parity check matrix will be described later. For example, for rate 13/15:

$$p_{983} = p_{983} \oplus i_0 \, p_{2815} = p_{2815} \oplus i_0$$

$$p_{4837} = p_{4837} \oplus i_0 \, p_{4989} = p_{4989} \oplus i_0$$

$$p_{6138} = p_{6138} \oplus i_0 \, p_{6458} = p_{6458} \oplus i_0$$

$$p_{6921} = p_{6921} \oplus i_0 \, p_{6974} = p_{6974} \oplus i_0$$

$$p_{7572} = p_{7572} \oplus i_0 \, p_{8260} = p_{8260} \oplus i_0$$

$$p_{8496} = p_{8496} \oplus i_0$$ [Math FIG. 5]

3) For the next 359 information bits, $i_s$, $s=1, 2, \ldots, 359$ accumulate $i_s$ at parity bit addresses using following Math figure.

$$\{x + (s \bmod 360) \times Q_{ldpc}\} \bmod (N_{ldpc} - K_{ldpc})$$ [Math FIG. 6]

where x denotes the address of the parity bit accumulator corresponding to the first bit $i_0$, and $Q_{ldpc}$ is a code rate dependent constant specified in the addresses of parity check matrix. Continuing with the example, $Q_{ldpc}=24$ for rate 13/15, so for information bit $i_1$, the following operations are performed:

$$p_{1007} = p_{1007} \oplus i_1 \, p_{2839} = p_{2839} \oplus i_1$$

$$p_{4861} = p_{4861} \oplus i_1 \, p_{5013} = p_{5013} \oplus i_1$$

$$p_{6162} = p_{6162} \oplus i_1 \, p_{6482} = p_{6482} \oplus i_1$$

$$p_{6495} = p_{6495} \oplus i_1 \, p_{6998} = p_{6998} \oplus i_1$$

$$p_{7596} = p_{7596} \oplus i_1 \, p_{8284} = p_{8284} \oplus i_1$$

$$p_{8520} = p_{8520} \oplus i_1$$ [Math FIG. 7]

4) For the 361st information bit $i_{360}$, the addresses of the parity bit accumulators are given in the second row of the addresses of parity check matrix. In a similar manner the addresses of the parity bit accumulators for the following 359 information bits $i_s$, $s=361, 362, \ldots, 719$ are obtained using the Math FIG. 6, where x denotes the address of the parity bit accumulator corresponding to the information bit $i_{360}$, i.e., the entries in the second row of the addresses of parity check matrix.

In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus P_{i-1}, i=1, 2, \ldots, N_{ldpc} - K_{ldpc} - 1$$ [Math FIG. 8]

where final content of $p_i$, $i=0, 1, \ldots, N_{ldpc} - K_{ldpc} - 1$ is equal to the parity bit $p_i$.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 20 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from the minimum value of 0 to the maximum value $N_{xBLOCK\_Group\_MAX}$ (corresponding to DP_NUM_BLOCK_MAX) of which the largest value is 1023.

Each TI group is either mapped directly onto one frame or spread over $P_I$ frames. Each TI group is also divided into more than one TI blocks ($N_{TI}$), where each TI block corresponds to one usage of time interleaver memory. The TI blocks within the TI group may contain slightly different numbers of XFECBLOCKs. If the TI group is divided into multiple TI blocks, it is directly mapped to only one frame.

There are three options for time interleaving (except the extra option of skipping the time interleaving) as shown in the below table 33.

TABLE 32

| Modes | Descriptions |
|---|---|
| Option-1 | Each TI group contains one TI block and is mapped directly to to oneframe as shown in (a). This option is signaled in the DPLS2-STAT by P_TI_TYPE = '0' and DP_TI_LENGTH = '1' (NTI = 1). |
| Option-2 | Each TI group contains one TI block and is mapped to more than one frame, (b) shows an example, where one TI group is mapped to two frames, i.e., DP_TI_LENGTH = '2' (PI = 2) and DP_FRAME_INTERVAL (IJUMP = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = NTI, while PI = 1. |

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r=N_{cells}$ while the number of columns $N_c$ is equal to the number $N_{xBLOCK\_TI}(n,s)$.

FIG. 21 illustrates the basic operation of a twisted row-column block interleaver according to an embodiment of the present invention.

shows a writing operation in the time interleaver and (b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, ..., $N_rN_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows expression.

$$\text{GENERATE}(R_{n,s,i}, C_{n,s,i}) = \qquad [\text{Math FIG. 9}]$$
$$\{$$
$$R_{n,s,i} = \mod(i, N_r),$$
$$T_{n,s,i} = \mod(S_{shift} \times S_{n,s,i}, S_c)$$
$$C_{n,s,i} = \mod\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows expression.

[Math FIG. 10]

$$\begin{cases} N'_{xBLOCK\_TI\_MAX} = N_{xBLOCK\_TI\_MAX} + 1, & \text{if } N_{xBLOCK\_TI\_MAX} \bmod 2 = 0 \\ N'_{xBLOCK\_TI\_MAX} = N_{xBLOCK\_TI\_MAX}, & \text{if } N_{xBLOCK\_TI\_MAX} \bmod 2 = 1 \end{cases}$$

$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

FIG. 27 illustrates an operation of a twisted row-column block interleaver according to another embodiment of the present invention.

More specifically, FIG. 22 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$ The variable number $N_{xBLOCK\_TI}(n,s)=N_r$ will be less than or equal to $N'_{xBLOCK\_TI\_MAX}$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow expression.

[Math FIG. 11]

```
p=0;
for i=0; i<N_cells N'_xBLOCK_TI_MAX; i=i+1
{GENERATE (R_n,s,i , C_n,s,i ) ;
V_i=N_r C_n,s,i +R_n,s,i
    if V_i<N_cells N_xBLOCK_TI(n, s)
    {
    Z_n,s,p=V_i ;p=p+1;
    }
}
```

The number of TI groups is set to 3. The option of time interleaver is signaled in the PLS2-STAT data by DP_TI_TYPE='0', DP_FRAME_INTERVAL='1', and DP_TI_LENGTH='1', i.e., $N_{TI}=1$, $I_{JUMP}=1$, and $P_I=1$. The number of XFECBLOCKs, each of which has $N_{cells}=30$ cells, per TI group is signaled in the PLS2-DYN data by $N_{xBLOCK\_TI}(0,0)=3$, $N_{xBLOCK\_TI}(1,0)=6$, and $N_{xBLOCK\_TI}(2,0)=5$, respectively. The maximum number of XFECBLOCK is signaled in the PLS2-STAT data by $N_{xBLOCK\_Group\_MAX}$, which leads to $\lfloor N_{xBLOCK\_Group\_MAX}/N_{TI} \rfloor = N_{xBLOCK\_TI\_MAX} = 6$.

FIG. 23 illustrates a diagonal-wise reading pattern of a twisted row-column block interleaver according to an embodiment of the present invention.

More specifically FIG. 23 shows a diagonal-wise reading pattern from each interleaving array with parameters of $N'_{xBLOCK\_TI\_MAX}=7$ and $S_{shift}=(7-1)/2=3$. Note that in the reading process shown as pseudocode above, if $V_i \geq N_{cells} N_{xBLOCK\_TI}(n,s)$, the value of $V_i$ is skipped and the next calculated value of $V_i$ is used.

Figure 24:
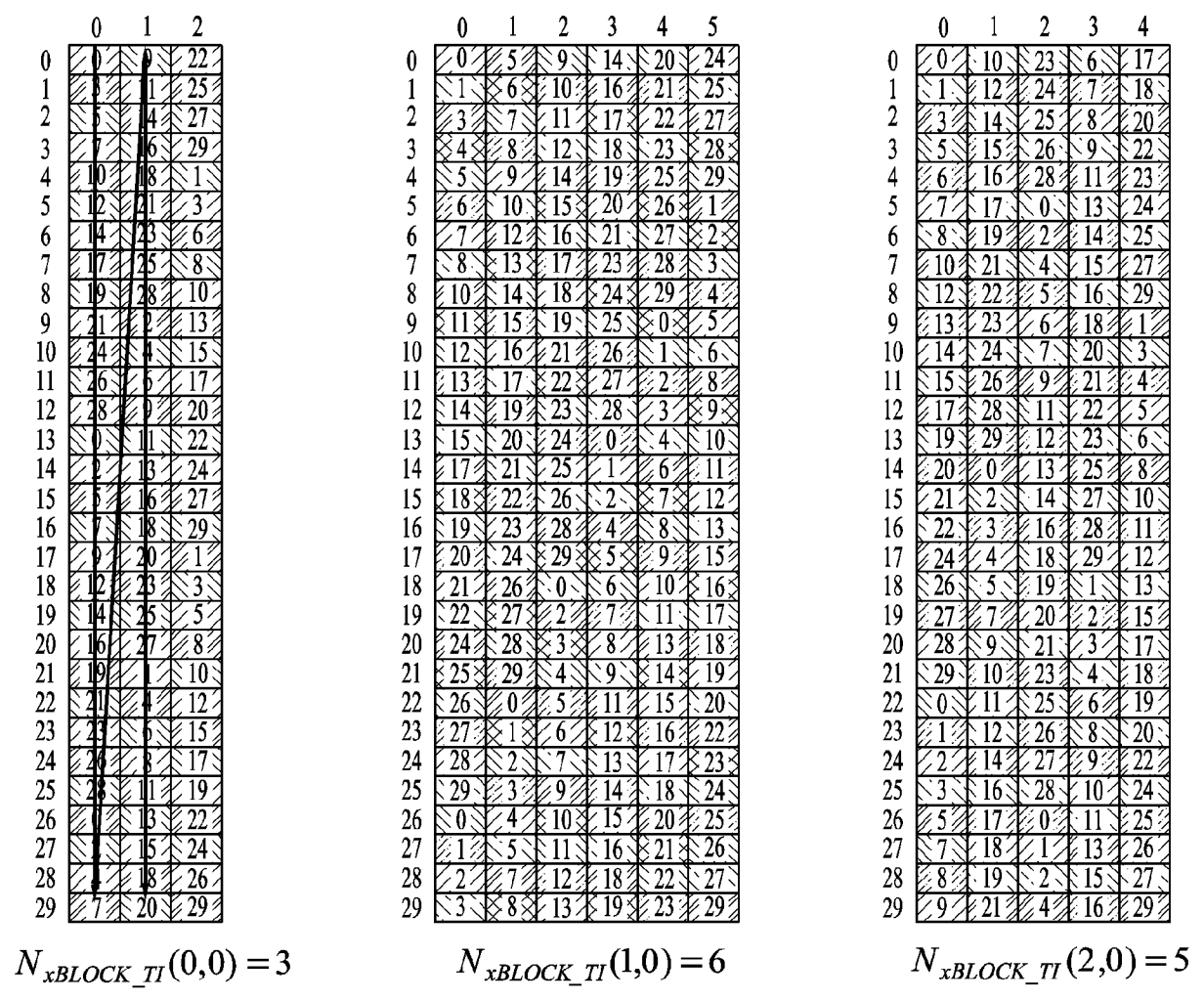

FIG. 24 illustrates interlaved XFECBLOCKs from each interleaving array according to an embodiment of the present invention.

FIG. 24 illustrates the interleaved XFECBLOCKs from each interleaving array with parameters of $N'_{xBLOCK\_TI\_MAX}=7$ and $S_{shift}=3$.

FIG. 25 is a block diagram illustrating a media content transmitting/receiving system according to an embodiment.

The media content transmitting/receiving system includes a broadcaster 10, a content provider 30, a content server 50, and a broadcast receiving device 100.

The content provider 30 provides media content to the broadcaster and the content server 50.

The broadcaster 10 transmits a broadcast stream including media content using at least one of a satellite, terrestrial or cable broadcasting network.

The content server 50 transmits media content on the basis of a request of the broadcast receiving device.

The broadcast receiving device 100 includes a control unit 110, an IP transmitting/receiving unit 130, a broadcast receiving unit 150, and a decoder 170. The broadcast receiving device 100 controls operation of the IP transmitting/receiving unit 130, the broadcast receiving unit 150, and the decoder 170 via the control unit 110. The broadcast receiving device 100 receives a broadcast stream including media content via the broadcast receiving unit 150. Here, the broadcast stream may be transmitted using at least one of a satellite, terrestrial or cable broadcasting network. Therefore, the broadcast receiving unit 150 may include at least one of a satellite tuner, a terrestrial tuner, or a cable tuner to receive the broadcast stream. The broadcast receiving device 100 requests media content from the content server 50 via the IP transmitting/receiving unit 130. The broadcast receiving device 100 receives the media content from the content server 50 via the IP transmitting/receiving unit 130. The broadcast receiving device 100 decodes the media content via the decoder 170.

Media content transmission/reception via a broadband according to an embodiment will be described with reference to FIGS. 26 to 30.

FIG. 26 is a diagram illustrating a system for transmitting/receiving media content via a broadband according to an embodiment.

The media content transmission/reception via an IP network according to an embodiment is divided into transmission/reception of a transmission packet including actual media content and transmission/reception of media content presentation information. The broadcast receiving device 100 receives the media content presentation information, and receives the transmission packet including media content. The media content presentation information represents information required for presenting the media content. The media content presentation information includes at least one of spatial information or temporal information required for presenting the media content. The broadcast receiving device 100 presents the media content on the basis of the media content presentation information.

In a specific embodiment, media content may be transmitted/received via an IP network according to an MPEG Media Transport (MMT) standard. The content server 50 transmits a presentation information (PI) document including the media content presentation information. Furthermore, the content server 50 transmits an MMT protocol (MMTP) packet including media content on the basis of a request of the broadcast receiving device 100. The broadcast receiving device 100 receives the PI document. The broadcast receiving device 100 receives a transmission packet including media content. The broadcast receiving device 100 extracts the media content from the transmission packet including the media content. The broadcast receiving device 100 presents the media content on the basis of the PI document.

In another specific embodiment, as illustrated in FIG. 26, media content may be transmitted/received via an IP network according to an MPEG-Dynamic Adaptive Streaming over HTTP (DASH) standard. In FIG. 26, the content server 50 transmits a media presentation description (MPD) including the media content presentation information. However, depending on a specific embodiment, the MPD may be transmitted by another external server instead of the content server 50. Furthermore, the content server 50 transmits a segment including media content on the basis of a request of the broadcast receiving device 100. The broadcast receiving device 100 receives the MPD. The broadcast receiving device 100 requests media content from the content server 50 on the basis of the MPD. The broadcast receiving device 100 receives a transmission packet including media content on the basis of a request. The broadcast receiving device 100 presents the media content on the basis of the MPD. To this end, the broadcast receiving device 100 may include a DASH client in the control unit 110. The DASH client may include an MPD parser for parsing the MPD, a segment parser for parsing the segment, an HTTP client for transmitting an HTTP request message and receiving an HTTP response message via the IP transmitting/receiving unit 130, and a media engine for presenting media. The MPD will be described in detail with reference to FIGS. 27 to 29.

FIG. 27 illustrates a structure of the MPD according to an embodiment. FIG. 28 illustrates a syntax of the MPD according to an embodiment. FIG. 29 illustrates an XML syntax of a period element of the MPD according to an embodiment.

The MPD may include a period element, an adaptation set element, and a representation element.

The period element includes information on a period. The MPD may include information on a plurality of periods. The period represents a continuous time interval of media content presentation.

The adaptation set element includes information on an adaptation set. The MPD may include information on a plurality of adaptation sets. The adaptation set is a set of media components including one or more interconvertible media content components. The adaptation set may include one or more representations. The adaptation sets may respectively include audios of different languages or subtitles of different languages.

The representation element includes information on a representation. The MPD may include information on a plurality of representations. The representation is a structured set of one or more media components. There may exist a plurality of representations differently encoded for the same media content component. In the case where bitstream switching is allowed, the broadcast receiving device 100 may switch a received representation to another representation on the basis of information updated during presentation of media content. In particular, the broadcast receiving device 100 may switch a received representation to another representation according to conditions of a bandwidth. The representation is divided into a plurality of segments.

The segment is a unit of media content data. The representation may be transmitted as the segment or a part of the segment according to a request of the media content receiver 30 using the HTTP GET or HTTP partial GET method defined in the HTTP 1.1 (RFC 2616) protocol.

Furthermore, the segment may include a plurality of sub-segments. The sub-segment may represent a smallest unit able to be indexed at a segment level. The segment may include an initialization segment, a media segment, an index segment, and a bitstream switching segment.

FIG. 30 is a flowchart illustrating an operation of receiving, by a broadcast receiving device, media content via an IP network according to an embodiment.

The broadcast receiving device 100 receives the media content presentation information via the IP transmitting/receiving unit 130 (S101). In a specific embodiment, the media content presentation information may be the MPD according to the MPEG-DASH standard. Here, the broadcast receiving device 100 may receive the MPD via the IP transmitting/receiving unit 130. In another specific embodiment, the media content presentation information may be the PI document according to the MMT standard. Here, the broadcast receiving device 100 may receive the PI document via the IP transmitting/receiving unit 130.

The broadcast receiving device 100 receives media content via the IP transmitting/receiving unit 130 on the basis of the media content presentation information (S103).

The broadcast receiving device 100 presents the media content via the control unit 110 (S105). In detail, the broadcast receiving device 100 may present the media content on the basis of the media content presentation information via the control unit 110.

As described above, the broadcast receiving device 100 that receives a broadcast stream via a satellite, cable or terrestrial broadcasting network is required to receive the media content presentation information in order to receive media content via an IP network. In particular, the media content presentation information is required to be transmitted or received via a broadcast stream in order to efficiently interwork with content transmitted via a broadcasting network. This is because a content provider or a broadcaster may integrally manage content information provided via a broadcasting network and information on media content transmitted via an IP network in the case where the media content presentation information is transmitted via a broadcast stream. Furthermore, this is because the broadcast receiving device 100 may quickly determine whether the media content presentation information is updated without an additional information request message in the case where the media content presentation information is transmitted via a broadcast stream since the broadcast receiving device 100 continually receives a broadcast stream.

Described below with reference to FIGS. 31 to 63 is a method of transmitting/receiving the media content presentation information using a broadcast stream transmitted via a broadcasting network instead of an IP network.

A content provider or a broadcaster may add the media content presentation information to a media content presentation information table to transmit the media content presentation information. This operation of adding the media content presentation information to the media content presentation information table to transmit the media content presentation information is described below with reference to FIGS. 31 and 32.

In the case where the media content presentation information is added to the media content presentation information table so as to be transmitted, the broadcast receiving device 100 may receive the media content presentation information on the basis of the media content presentation information table. In detail, the broadcast receiving device 100 may extract the media content presentation information from the media content presentation information table to receive the media content presentation information.

Here, the media content presentation information table may include an id element for identifying the media content presentation information table among various information tables.

Furthermore, the media content presentation information table may include an id_extension element. The id_extension element may indicate an identifier for identifying a media content presentation information table instance. Here, an id_extension field may include a protocol_version field indicating a protocol version of the media content presentation information table. The id_extension field may also include a sequence_number field for identifying each of a plurality of media content presentation information tables including different pieces of media content presentation information. The id_extension element may indicate a service_identifier for identifying a broadcasting service associated with the media content presentation information table. Here, the id_extension element may indicate any one of a program number, a service_id, and a source id.

Furthermore, the media content presentation information table may include a version element indicating a version of the media content presentation information table. Here, the broadcast receiving device 100 may determine whether the media content presentation information table is updated on the basis of the version element. In detail, the broadcast receiving device 100 may determine that the media content presentation information table has been updated, upon receiving the media content presentation information table having a version element value different from that of a previously received media content presentation information table. Here, the broadcast receiving device 100 may extract the media content presentation information from the media content presentation information table. Furthermore, the broadcast receiving device 100 may determine that the media content presentation information table has not been updated, upon receiving the media content presentation information table having the same version element value as that of a previously received media content presentation information table. In this case, the broadcast receiving device 100 does not extract the media content presentation information from the media content presentation information table. In a specific embodiment, the version element may have the same value as that of the version element included in the media content presentation information.

Furthermore, the media content presentation information table may include a media content presentation information id element indicating an identifier for identifying the media content presentation information.

Here, the media content presentation information table may include a media content presentation information id_length element indicating a length of the identifier for identifying the media content presentation information.

Furthermore, the media content presentation information table may include a coding element indicating an encoding method of the media content presentation information. Here, the coding element that indicates the encoding method may indicate that the media content presentation information table includes the media content presentation information without particularly compressing the media content presentation information. Furthermore, the coding element that indicates the encoding method may indicate that the media content presentation information table includes the media content presentation information compressed by a specific algorithm. Here, the specific algorithm may be a gzip algorithm.

Furthermore, the media content presentation information table may include a byte_length element indicating a length of the media content presentation information.

Furthermore, the media content presentation information table may include a byte( ) element that is the media content presentation information itself.

Here, the media content presentation information table may have an XML, HTML5 or bitstream format.

FIG. 31 illustrates a bitstream syntax for the case where the MPD is transmitted in a format of an MPD information table according to an embodiment.

FIG. 31 illustrates the case where the media content presentation information table has a bitstream format, and the media content presentation information is included in the MPD. Therefore, with respect to FIG. 31, the media content presentation information table is referred to as an MPD information table.

The MPD information table includes a table_id field, a section_syntax_indicator field, a private_indicator field, a private_section_length field, a table_id_extension field, an MPD_data_version field, a section_number field, a last_section_number field, an MPD_id_length field, an MPD_id_bytes field, an MPD_coding field, an MPD_byte_length field, and an MPD_byte field.

In the example of FIG. 31, the table_id field indicates an identifier of the MPD information table. Here, the table_id field may be 0xFA that is one of reserved id values defined in ATSC A/65.

The section_syntax_indicator field indicates whether the MPD information table is a long-type private section table of an MPEG-2 TS standard. Since the MPD information table is not a long-type table, the section_syntax_indicator field has a value of 0.

The private_indicator field indicates whether a current table corresponds to a private section. Since the MPD information table corresponds to the private section, the private_indicator field has a value of 1.

The private_section_length field indicates a length of a section following the private_section_length field.

The table_id_extension field indicates an identifier for identifying a broadcasting service associated with the MPD transmitted via the MPD information table. Here, the table_id_extension field may indicate any one of a program number, a service_id, and a source id. In another embodiment, the table_id_extension field may indicate an identifier for identifying the MPD. In detail, the table_id_extension field may include a protocol_version field indicating a protocol version of the MPD information table. Furthermore, the table_id_extension field may include a sequence_number field for identifying each of a plurality of MPD information tables including different MPDs.

The MPD_data_version field indicates a version of the MPD information table. Here, the broadcast receiving device 100 may determine whether the MPD information table is updated on the basis of the MPD_data_version field. The MPD_data_version field may have the same value as that of the version element included in the MPD.

The section_number field indicates a number of a current section.

The last_section_number field indicates a number of a last section. In the case where the MPD information table has a large size, the MPD information table may be divided into a plurality of sections so as to be transmitted. Here, the broadcast receiving device 100 determines whether all sections required for the MPD information table are received on the basis of the section_number field and the last_section_number field.

The MPD_id_bytes field indicates an identifier for identifying the MPD.

The MPD_id_length field indicates a length of the identifier for identifying the MPD.

The MPD_coding field indicates an encoding method for the MPD. Here, the MPD_coding field that indicates the encoding method may indicate that the MPD information table includes the media content presentation information without particularly compressing the media content presentation information. Furthermore, the MPD_coding field may indicate that the MPD information table includes the MPD compressed by a specific algorithm. Here, the specific algorithm may be a gzip algorithm. In a specific embodiment, a value of the MPD_coding field may be defined as shown in Table 33.

TABLE 33

| Value | Designation |
|---|---|
| 0x00 | Plain text |
| 0x01 | Compressed by gzip |
| 0x02-0x03 | Reserved for future use |

In the example of Table 33, in the case where the MPD_coding field has a value of 0x00, the MPD_coding field indicates that the MPD information table includes the media content presentation information without particularly compressing the media content presentation information. In the case where the MPD_coding field has a value of 0x01, the MPD_coding field indicates that the MPD information table includes the MPD compressed by a gzip algorithm.

The MPD_byte_length field indicates a length of the MPD.

The MPD_byte( ) field includes actual data of the MPD included in the MPD information table.

FIG. 32 is a flowchart illustrating an operation of extracting, by a broadcast receiving device, the MPD on the basis of an information table including the MPD according to an embodiment.

The broadcast receiving device 100 receives a broadcast stream via the broadcast receiving unit 150 (S301).

The broadcast receiving device 100 extracts the media content presentation information table from the broadcast stream via the control unit 110 (S303). In a specific embodiment, the broadcast receiving device 100 may extract the media content presentation information table from the broadcast stream on the basis of the id element via the control unit 110. In detail, the broadcast receiving device 100 may extract the media content presentation information table from the broadcast stream on the basis of information in which the id element is combined with the id_extension element via the control unit 110. For example, the broadcast receiving device 100 may identify the media content presentation information table using a value of the id element via the control unit 110 so as to extract the media content presentation information table from the broadcast stream. Here, the broadcast receiving device 100 may identify the media content presentation information table using a value obtained by combining the value of the id element and the value of the id_extension element via the control unit 110 so as to extract the media content presentation information table from the broadcast stream.

The broadcast receiving device 100 extracts the media content presentation information on the basis of the media content presentation information table via the control unit 110 (S305). Here, in the case where the media content presentation information is compressed, the broadcast receiving device 100 may decompress the media content presentation information via the control unit 110 so as to extract the media content presentation information.

The broadcast receiving device 100 receives media content via the IP transmitting/receiving unit 130 on the basis of the media content presentation information (S307).

The broadcast receiving device 100 presents the media content via the control unit 110 (S309). In detail, the broadcast receiving device 100 may present the media content on the basis of the media content presentation information via the control unit 110.

A content provider or a broadcaster may add the media content presentation information to an IP datagram to transmit the media content presentation information via a broadcasting network instead of an IP network. Here, the content provider or the broadcaster may add the media content presentation information table including the media content presentation information to the IP datagram to transmit the media content presentation information table. This operation of adding the media content presentation information to the IP datagram to transmit the media content presentation information is described below with reference to FIGS. 9 to 12.

In the case where the media content presentation information is added to the IP datagram so as to be transmitted, the broadcast receiving device 100 may receive the media content presentation information on the basis of a media IP datagram. In a specific embodiment, the broadcast receiving device 100 may extract the media content presentation information from the IP datagram to receive the media content presentation information. In another specific embodiment, the broadcast receiving device 100 may extract the media content presentation information table from the IP datagram to receive the media content presentation information.

Here, the media content presentation information may be added to a UDP payload. The UDP payload may include a payload_type field and a payload field. The payload_type field indicates a data type of the media content presentation information included in the payload field. Here, a value of the payload_type field may indicate that the media content presentation information included in the payload field is a file itself. In a specific embodiment, in the case where the media content presentation information is included in the MPD, the value of the payload_type field may indicate that the payload field includes the MPD as it is. In another specific embodiment, in the case where the media content presentation information is included in the PI document, the value of the payload_type field may indicate that the payload field includes the PI document as it is. Furthermore, the value of the payload_type field may indicate that the media content presentation information is included in a specific syntax format. Furthermore, the value of the payload_type field may indicate that the media content presentation information is included in the form of the above-mentioned media content presentation information table.

The payload field may include the media content presentation information.

The content provider or the broadcaster may add a media content presentation information link to the media content presentation information table to transmit the media content presentation information link. Here, the media content presentation information link may provide a link to the media content presentation information so that the media content presentation information is received. Here, the media content presentation information link may have a format of a uniform resource locator (URL). This operation of adding the media content presentation information link to the media content presentation information table to transmit the media content presentation information link is described below with reference to FIGS. 33 and 34.

In the case where the media content presentation information link is added to the media content presentation information table so as to be transmitted, the broadcast receiving device 100 may receive the media content presentation information on the basis of the media content presentation information table. In detail, the broadcast receiving device 100 may extract the media content presentation information link from the media content presentation information table. Here, the broadcast receiving device 100 may receive the media content presentation information from the media content presentation information link.

Here, the media content presentation information table may include an id element for identifying the media content presentation information table among various information tables.

Furthermore, the media content presentation information table may include an id_extension element. The id_extension element may indicate an identifier for identifying a media content presentation information table instance. Here, an id_extension field may include a protocol_version field indicating a protocol version of the media content presentation information table. The id_extension field may also include a sequence_number field for identifying each of a plurality of media content presentation information tables including different pieces of media content presentation information. The id_extension element may indicate a service identifier for identifying a broadcasting service associated with the media content presentation information table. Here, the id_extension element may indicate any one of a program number, a service id, and a source id.

Furthermore, the media content presentation information table may include a version element indicating a version of the media content presentation information table. Here, the broadcast receiving device 100 may determine whether the media content presentation information table is updated on the basis of the version element. In detail, the broadcast receiving device 100 may determine that the media content presentation information table has been updated, upon receiving the media content presentation information table having a version element value different from that of a previously received media content presentation information table. Here, the broadcast receiving device 100 may extract the media content presentation information from the media content presentation information table. Furthermore, the broadcast receiving device 100 may determine that the media content presentation information table has not been updated, upon receiving the media content presentation information table having the same version element value as that of a previously received media content presentation information table. In this case, the broadcast receiving device 100 does not extract the media content presentation information from the media content presentation information table. In a specific embodiment, the version element may have the same value as that of the version element included in the media content presentation information.

Furthermore, the media content presentation information table may include a media content presentation information id element indicating an identifier for identifying the media content presentation information.

Here, the media content presentation information table may include a media content presentation information id_length element indicating a length of the identifier for identifying the media content presentation information.

Furthermore, the media content presentation information table may include a byte_length element indicating a length of the media content presentation information link.

Furthermore, the media content presentation information table may include a byte( ) element that is the media content presentation information link itself. Here, the media content presentation information link may have a URL format.

Here, the media content presentation information table may have an XML, HTML5 or bitstream format.

FIG. 33 illustrates an MPD link table including an MPD link according to an embodiment.

FIG. 33 illustrates the case where the media content presentation information table has a bitstream format, and the media content presentation information is included in the MPD. Therefore, with respect to FIG. 33, the media content presentation information table is referred to as an MPD information table. The media content presentation information link has a URL format. Therefore, the media content presentation information link is referred to as an MPD_URL.

The MPD information table includes a table_id field, a section_syntax_indicator field, a private_indicator field, a private_section_length field, a table_id_extension field, an MPD_data_version field, a section_number field, a last_section_number field, an MPD_id_length field, an MPD_id_byte field, an MPD_URL_length field, and an MPD_URL_bytes field.

In the example of FIG. 33, the table_id field indicates an identifier of the MPD information table. Here, the table_id field may be 0xFA that is one of reserved id values defined in ATSC A/65.

The section_syntax_indicator field indicates whether the MPD information table is a long-type private section table of the MPEG-2 TS standard. Since the MPD information table is not a long-type table, the section_syntax_indicator field has a value of 0.

The private_indicator field indicates whether a current table corresponds to a private section. Since the MPD information table corresponds to the private section, the private_indicator field has a value of 1.

The private_section_length field indicates a length of a section following the private_section_length field.

The table_id_extension field indicates an identifier for identifying a broadcasting service associated with the MPD transmitted via the MPD information table. Here, the table_id_extension field may indicate any one of a program number, a service id, and a source id. In another embodiment, the table_id_extension field may indicate an identifier for identifying the MPD. In detail, the table_id_extension field may include a protocol_version field indicating a protocol version of the MPD information table. Furthermore, the table_id_extension field may include a sequence_number field for identifying each of a plurality of MPD information tables including different MPDs.

The MPD_data_version field indicates a version of the MPD information table. Here, the broadcast receiving device 100 may determine whether the MPD information table is updated on the basis of the MPD_data_version field. The MPD_data_version field may have the same value as that of the version element included in the MPD.

The section_number field indicates a number of a current section.

The last_section_number field indicates a number of a last section. In the case where the MPD information table has a large size, the MPD information table may be divided into a plurality of sections so as to be transmitted. Here, the broadcast receiving device 100 determines whether all sections required for the MPD information table are received on the basis of the section_number field and the last_section_number field.

The MPD_id_bytes field indicates an identifier for identifying the MPD.

The MPD_id_length field indicates a length of the identifier for identifying the MPD.

The MPD_URL_length field indicates a length of the MPD_URL.

The MPD_URL_bytes( ) field indicates the MPD_URL itself.

FIG. 34 is a flowchart illustrating an operation of receiving, by a broadcast receiving device, the MPD on the basis of the media content presentation information table including the media content presentation information link according to an embodiment.

The broadcast receiving device 100 receives a broadcast stream via the broadcast receiving unit 150 (S401).

The broadcast receiving device 100 extracts the media content presentation information table including the media content presentation information link from the broadcast stream via the control unit 110 (S403). In a specific embodiment, the broadcast receiving device 100 may extract the media content presentation information table from the broadcast stream on the basis of the id element via the control unit 110. In detail, the broadcast receiving device 100 may extract the media content presentation information table from the broadcast stream on the basis of information in which the id element is combined with the id_extension element via the control unit 110. For example, the broadcast receiving device 100 may identify the media content presentation information table using a value of the id element via the control unit 110 so as to extract the media content presentation information table from the broadcast stream. Here, the broadcast receiving device 100 may identify the media content presentation information table using a value obtained by combining the value of the id element and the value of the id_extension element via the control unit 110 so as to extract the media content presentation information table from the broadcast stream.

The broadcast receiving device 100 extracts the media content presentation information link on the basis of the media content presentation information table via the control unit 110 (S405). Here, the media content presentation information link may have a URL format.

The broadcast receiving device 100 receives the media content presentation information on the basis of the media content presentation information link via the IP transmitting/receiving unit 130 (S407).

The broadcast receiving device 100 receives media content via the IP transmitting/receiving unit 130 on the basis of the media content presentation information (S409).

The broadcast receiving device 100 presents the media content via the control unit 110 (S411). In detail, the broadcast receiving device 100 may present the media content on the basis of the media content presentation information via the control unit 110.

FIGS. 35 to 37 illustrate the case where the media content presentation information is included in the MPD. FIG. 35 illustrates that the MPD or the MPD information table is added to an IP datagram so as to be transmitted according to an embodiment.

As exemplified by the data structure of FIG. 11, the IP datagram includes a UDP datagram in an IP payload in the examples of FIGS. 11 to 13. The UDP datagram includes the MPD or the MPD information table in a UDP payload. A syntax of the IP datagram will be described in detail with reference to FIG. 36.

FIG. 36 illustrates the syntax of the IP datagram for the case where the MPD or the MPD information table is added to the IP datagram so as to be transmitted according to an embodiment.

The UDP payload includes an MPD_payload_type field and a payload field. The MPD_payload_type field indicates a data type of the MPD included in the MPD_payload field. A value of the MPD_payload_type field may indicate that the MPD_payload field includes the MPD itself. Furthermore, the value of the MPD_payload_type field may indicate that the MPD_payload field includes the MPD in a specific syntax format. In detail, the value of the MPD_payload_type field may be defined as shown in Table 34 below.

TABLE 34

| Value | Designation |
| --- | --- |
| 0x00 | Not Specified |
| 0x01 | Syntax |
| 0x02 | MPD file at it is |
| 0x03 | MPD section |
| 0x03 | Reserved for future use |

In the example of Table 34, in the case where the value of the MPD_payload_type field is 0x01, the MPD_payload_type field indicates that the MPD_payload field includes the MPD in a specific syntax format. In the case where the value of the MPD_payload_type field is 0x02, the MPD_payload_type field indicates that the MPD_payload field includes the MPD as it is. In the case where the value of the MPD_payload_type field is 0x03, the MPD_payload_type field indicates that the MPD_payload field includes the MPD in the form of the above-mentioned MPD information table.

The MPD_payload field includes the MPD.

FIG. 37 illustrates a syntax of an MPD payload included in the IP datagram for the case where the MPD or the MPD information table is added to the IP datagram so as to be transmitted according to an embodiment.

An MPD_coding field indicates an encoding method for the MPD or the MPD information table. Here, the MPD_coding field that indicates the encoding method may indicate that the MPD payload includes the MPD or the MPD information table without particularly compressing the MPD or the MPD information table. Furthermore, the MPD_coding field may indicate that the MPD payload includes the MPD or the MPD information table compressed by a specific algorithm. Here, the specific algorithm may be a gzip algorithm. In a specific embodiment, a value of the MPD_coding field may be defined as shown in Table 35.

TABLE 35

| Value | Designation |
| --- | --- |
| 0x00 | Plain text |
| 0x01 | Compressed by gzip |
| 0x02-0x03 | Reserved for future use |

In the example of Table 35, in the case where the MPD_coding field has a value of 0x00, the MPD_coding field indicates that the MPD payload includes the MPD or the MPD information table without particularly compressing the MPD or the MPD information table. In the case where the MPD_coding field has a value of 0x01, the MPD_coding field indicates that the MPD payload includes the MPD or the MPD information table compressed by a gzip algorithm.

An MPD_byte_length field indicates a length of the MPD or the MPD information table.

FIG. 38 is a flowchart illustrating an operation of extracting, by a broadcast receiving device, the media content presentation information or the media content presentation information table on the basis of the IP datagram including the media content presentation information or the media content presentation information table according to an embodiment.

The broadcast receiving device 100 receives a broadcast stream via the broadcast receiving unit 110 (S501).

The broadcast receiving device 100 extracts the IP datagram from the broadcast stream via the control unit 150 (S503).

The broadcast receiving device 100 extracts the UDP datagram from the IP datagram via the control unit 150 (S505). In detail, the broadcast receiving device 100 extracts the UDP datagram from a payload of the IP datagram.

The broadcast receiving device 100 extracts the media content presentation information on the basis of the UDP datagram via the control unit 150 (S507). In detail, the broadcast receiving device 100 extracts the media content presentation information or the media content presentation information table from the payload of the UDP datagram. In a specific embodiment, in the case where the media content presentation information or the media content presentation information table is compressed, the broadcast receiving device 100 may decompress the media content presentation information or the media content presentation information table via the control unit 150 so as to extract the media content presentation information or the media content presentation information table. Here, the broadcast receiving device 100 may decompress the media content presentation information or the media content presentation information table on the basis of a coding field included in the UDP datagram. Here, the broadcast receiving device 100 may extract the media content presentation information from the media content presentation information table via the control unit 150.

The broadcast receiving device 100 receives media content via the IP transmitting/receiving unit 130 on the basis of the media content presentation information (S507).

The broadcast receiving device 100 presents the media content via the control unit 110 (S509). In detail, the broadcast receiving device 100 may present the media content on the basis of the media content presentation information via the control unit 110.

A content provider or a broadcaster may add a method of transmitting the media content presentation information to a broadcast information signaling table to transmit the method of transmitting the media content presentation information. This operation of adding the method of transmitting the media content presentation information to the broadcast information signaling table to transmit the method of transmitting the media content presentation information is described below with reference to FIGS. 15 to 23. Here, the broadcast information signaling table may have an XML, HTML5 or bitstream format.

In a specific embodiment, the content provider or the broadcaster may add a descriptor including the method of transmitting the media content presentation information to the broadcast information signaling table to transmit the descriptor.

Here, the broadcast information signaling information table may be one of a program specific information (PSI) table defined in an ISO/IEC 13818-1 standard, a system information (SI) table defined in an ETSI EN 300 468 standard, and a program and system information protocol (PSIP) table defined in an ATSC standard. In particular, the signaling information table may be an information table for signaling information on broadcast content. Here, the information on broadcast content may be one of information on a broadcasting service, information on an elementary stream, and information on an event. In detail, the information table may be one of a terrestrial virtual channel table (TVCT) and an event information table (EIT) among tables defined in A/65 that is one of ATSC standards, a service map table (SMT) among tables defined in A/153, a service description table (SDT) and an EIT defined in an ETSI EN 300 468 standard, and a program map table (PMT) defined in an ISO/IEC 13818-1 standard.

The descriptor may include a tag element for identifying the descriptor.

Furthermore, the descriptor may include a length element indicating a length of the descriptor.

The descriptor may include a simulcast_flag indicating that broadcast content specified by the descriptor is simultaneously transmitted via not only a broadcasting network but also an IP network. Here, the broadcast content may be one of an elementary stream specified by the descriptor, a service specified by the descriptor, and an event specified by the descriptor. In the case where the simulcast_flag has a value of 1 and transmission of a broadcast stream via the broadcasting network is unstable, the broadcast receiving device 100 may receive the broadcast content specified by the descriptor via the IP network. In detail, in the case where the simulcast_flag has a value of 1 and a strength of a signal of the broadcast stream transmitted via the broadcasting network is lower than a certain reference level or presentation interruption of the broadcast content occurs, the broadcast receiving device 100 may receive the broadcast content specified by the descriptor via the IP network. Here, the broadcast receiving device 100 may notify a user that the broadcast content specified by the descriptor is able to be received. Furthermore, the broadcast receiving device 100 may receive the broadcast content specified by the descriptor on the basis of an input from the user. In detail, the broadcast receiving device 100 may receive the broadcast content specified by the descriptor via the IP network, upon receiving an input from the user.

Furthermore, the descriptor may include a version element indicating a version of the media content presentation information.

Moreover, the descriptor may include a transport_mode element indicating a specific method of transmitting the media content presentation information or the media content presentation information table. Here, a value of the transport_mode element may indicate that the descriptor directly includes the media content presentation information or the media content presentation information table. Furthermore, the value of the transport_mode element may indicate that the media content presentation information or the media content presentation information table may be downloaded via a link address included in the descriptor. The value of the transport_mode element may indicate that an information table included in a packet that is different from a packet that includes the descriptor includes the media content presentation information. The value of the transport_mode element may indicate that an additional broadcast stream includes the media content presentation information. The value of the transport_mode element may indicate that an IP datagram includes the media content presentation information or the media content presentation information table. The value of the transport_mode element may indicate that the media content presentation information or the media content presentation information table is transmitted using a session-based transport protocol. Here, the session-based transport protocol may be File Delivery over Unidirectional Transport (FLUTE). The session-based transport protocol may be Asynchronous Layered Coding (ALC)/Layered Coding Transport (LCT).

The descriptor may include a bootstrap_data element including specific transmission information corresponding to a method of transmitting the media content presentation information or the media content presentation information table. Here, in the case where the descriptor directly includes the media content presentation information, the bootstrap_data element may include the media content presentation information itself. In this case, the broadcast receiving device 100 may extract the media content presentation information from the descriptor.

In the case where the media content presentation information or the media content presentation information table is able to be received via a link included in the descriptor, the bootstrap_data element may include a link for downloading the media content presentation information or the media content presentation information table. In a specific embodiment, the broadcast receiving device 100 may access the link to download the media content presentation information or the media content presentation information table. Here, the link may be provided in plurality. Furthermore, there may be a priority order for the plurality of links. In this case, the broadcast receiving device 100 may attempt to download the media content presentation information or the media content presentation information table in descending order of priorities of the links. Here, the links may have a URL format.

In the case where an information table included in a packet that is different from a packet that includes the descriptor includes the media content presentation information or the media content presentation information link for providing a link to the media content presentation information, the bootstrap_data element may include an identifier of a packet that includes the media content presentation information or the media content presentation information link. Here, a table ID of the information table may be predetermined. However, in the case where the table ID of the information table is not predetermined, the bootstrap_data element may include the table ID of the information table. Here, the information table may be the above-mentioned media content presentation information table.

In the case where an additional broadcast stream includes the media content presentation information or the media content presentation information link, the bootstrap_data element may include an identifier of a packet and an identifier of the broadcast stream including the media content presentation information or the media content presentation information link. Here, in the case where the broadcast stream complies with the MPEG-2 TS standard, the identifier of the broadcast stream may be a TS ID and the packet identifier may be a PID. In detail, the information table included in the packet may include the media content presentation information or the media content presentation information link. Here, the table ID of the information table may be predetermined. However, in the case where the table ID of the information table is not predetermined, the bootstrap_data element may include the table ID of the information table. Here, the information table including the media content presentation information may be the above-mentioned media content presentation information table.

In the case where an IP datagram includes the media content presentation information or the media content presentation information table, the bootstrap_data element may include an identifier of a data transmission channel of a physical layer for downloading the IP datagram including the media content presentation information, an IP address, a port number, a flag indicating whether a source IP address is included, the source IP address, and a version of an IP address format.

In the case where the media content presentation information or the media content presentation information table is transmitted via a session-based transport protocol session, the bootstrap_data element may include an identifier of a data transmission channel of a physical layer for downloading the media content presentation information or the media content presentation information table, an identifier of a session, an IP address of the session, a port number of the session, a flag indicating whether a source IP address of the session is included, the source IP address of the session, and a version of an IP address format. As described above, the session-based transport protocol may be FLUTE. The session-based transport protocol may be ALC/LCT. In the case where the session-based transport protocol is FLUTE, the identifier of the session may be TSI that is a FLUTE session identifier.

In the examples of FIGS. 39 to 45, the MPD includes the media content presentation information. Therefore, with respect to the examples of FIGS. 39 to 45, a descriptor including a method of transmitting the media content presentation information or the media content presentation information table is referred to as an MPD descriptor. Here, the MPD descriptor is included in a bitstream-type broadcast information signaling information table.

FIG. 39 illustrates a syntax of the MPD descriptor for transmitting the MPD according to an embodiment.

The MPD descriptor includes a descriptor_tag field, a descriptor_length field, an MPD_version field, a simulcast_flag field, an MPD_transport mode field, and an MPD_bootstrap_data field.

The descriptor_tag field indicates an identifier of the MPD descriptor.

The descriptor_length field indicates a length of the MPD descriptor.

The MPD_version field indicates a version of the MPD.

The simulcast_flag field indicates that broadcast content specified by the MPD descriptor is simultaneously transmitted via not only a broadcasting network but also an IP network. Here, the broadcast content may be one of an elementary stream specified by the MPD descriptor, a service specified by the MPD descriptor, and an event specified by the MPD descriptor. In the case where the simulcast_flag has a value of 1 and transmission of a broadcast stream via the broadcasting network is unstable, the broadcast receiving device 100 may receive the broadcast content specified by the descriptor via the IP network. In detail, in the case where the simulcast_flag has a value of 1 and a strength of a signal of the broadcast stream transmitted via the broadcasting network is lower than a certain reference level or presentation interruption of the broadcast content occurs, the broadcast receiving device 100 may receive the broadcast content specified by the descriptor via the IP network. Here, the broadcast receiving device 100 may notify the user that the broadcast content specified by the MPD descriptor is able to be received. Furthermore, the broadcast receiving device 100 may receive the broadcast content specified by the MPD descriptor on the basis of an input from the user. In detail, the broadcast receiving device 100 may receive the broadcast content specified by the MPD descriptor via the IP network, upon receiving an input from the user.

The MPD_transport mode field indicates a specific method of transmitting the MPD, the MPD information table (MPD_Section) or the MPD link table (MPD_URL_Section). Here, a value of the MPD_transport mode field may indicate that the MPD descriptor directly includes the MPD. Furthermore, the value of the MPD_transport mode field may indicate that the MPD, the MPD information table, or the MPD link table is able to be downloaded via a link address included in the MPD descriptor. The value of the MPD_transport mode field may indicate that an information table included in a packet that is different from a packet that includes the MPD descriptor includes the MPD or the MPD_URL. Here, the MPD_URL indicates a URL for downloading the MPD. Here, the information table may be the above-mentioned MPD information table. The information table may be the above-mentioned MPD link information table. The value of the MPD_transport mode field may indicate that an additional broadcast stream includes the MPD or the MPD_URL. Here, the information table may be the above-mentioned MPD information table. The information table may be the above-mentioned MPD link information table. Furthermore, the value of the MPD_transport mode field may indicate that an IP datagram includes the MPD, the MPD information table, or the MPD link table. Furthermore, the value of the MPD_transport mode field may indicate that the MPD, the MPD information table, or the MPD link table is transmitted via a session-based transport protocol session such as FLUTE or ALC/LCT. In detail, the MPD_transport mode field may be assigned values as shown in Table 36 below.

TABLE 36

| Value | Designation |
| --- | --- |
| 0x00 | The MPD is delivered in MPD_data_bytes( ) |
| 0x01 | The location of MPD, MPD_Section or MPD_URL_Section is identified in the URL carried in the MPD_URL. |
| 0x02 | The MPD or MPD_URL is delivered by section as separate tables (e.g., MPEG-2 private section) in same broadcast network |
| 0x03 | The MPD or MPD_URL is delivered by section as separate tables (e.g., MPEG-2 private section) in different broadcast network |
| 0x04 | The MPD, MPD_Section or MPD_URL_Section is delivered in IP datagrams |
| 0x05 | The MPD. MPD_Section or MPD_URL is delivered in sessions(e,g FLUTE, ALC/LCT etc) |
| 0x06-0x07 | Reserved for future use |

In the example of Table 36, in the case where the value of the MPD_transport mode field is 0x00, the MPD_transport mode field indicates that the MPD descriptor directly includes the MPD. In the case where the value of the MPD_transport mode field is 0x01, the MPD_transport mode field indicates that the MPD, the MPD information table, or the MPD link table is able to be downloaded via a link address included in the MPD descriptor. In the case where the value of the MPD_transport mode field is 0x02, the MPD_transport mode field indicates that an information table included in a packet that is different from a packet that includes the MPD descriptor includes the MPD or the MPD_URL. In the case where the value of the MPD_transport mode field is 0x03, the MPD_transport mode field indicates that an additional broadcast stream includes the MPD. In the case where the value of the MPD_transport mode field is 0x04, the MPD_transport mode field indicates that an IP datagram includes the MPD, the MPD information table or the MPD link table. In the case where the value of the MPD_transport mode field is 0x05, the MPD transport mode field indicates that the MPD, the MPD information table or the MPD link table is transmitted via a transport protocol session. Here, the transport protocol may be FLUTE. Alternatively, the transport protocol may be ALC/LCT.

The MPD_bootstrap_data field includes specific transmission information according to a method of transmitting the MPD or the MPD information table. This configuration will be described in detail with reference to FIGS. 38 to 43.

FIG. 40 illustrates a syntax of MPD bootstrap_data in the case where the MPD descriptor directly includes the MPD.

In the case where the MPD descriptor directly includes the media content presentation information, the bootstrap_data includes an MPD_data_length field and an MPD_data_byte field. The MPD_data_length field indicates a size of MPD data. The MPD_data_byte field indicates actual data of the MPD. In this case, the broadcast receiving device 100 may extract the MPD from the MPD descriptor.

FIG. 41 illustrates the syntax of the MPD bootstrap_data in the case where the MPD descriptor includes a link address indicating a storage place of the MPD, the MPD information table or the MPD link table.

In the case where the MPD is downloadable via the link address included in the MPD descriptor, the bootstrap_data includes an MPD_URL_length field and an MPD_URL field. The MPD_URL_length field indicates a length of a URL. The MPD_URL field indicates a URL for downloading the MPD, the MPD information table or the MPD link table.

FIG. 42 illustrates the syntax of the MPD bootstrap_data in the case where the MPD descriptor includes an identifier of a data packet including the MPD.

In the case where an information table included in a packet that is different from a packet that includes the MPD descriptor includes the MPD and the MPD_URL, the bootstrap_data includes an MPD_pid field. Here, the information table may be the MPD information table as described above. Alternatively, the information table may be the MPD link information table as described above. The MPD_pid field indicates an identifier of a packet including the MPD. Here, in the case where a broadcast stream complies with the MPEG-2 TS standard, the packet identifier may be a PID. The broadcast receiving device 100 may extract the MPD on the basis of the MPD_pid field. The broadcast receiving device 100 may identify a packet including the MPD or the MPD_URL using a value of the MPD_pid field, and may extract the MPD or the MPD_URL from the packet including the MPD or the MPD_URL. Here, the table ID of the information table may be predetermined. However, in the case where the table ID of the information table is not predetermined, the bootstrap_data may include a table_id field indicating the table ID of the information table.

FIG. 43 illustrates the syntax of the MPD bootstrap_data in the case where the MPD descriptor includes an identifier of an additional broadcast stream including the MPD.

In the case where the additional broadcast stream includes the MPD or the MPD_URL, the bootstrap_data includes a transport_stream_id field and an MPD_pid field. The transport_stream_id field indicates an identifier of a broadcast stream including the MPD. The MPD_pid field indicates an identifier of a packet including the MPD or the MPD_URL. Here, in the case where the broadcast stream complies with the MPEG-2 TS standard, the identifier of the broadcast stream may be a TS ID and the packet identifier may be a PID. The broadcast receiving device 100 may extract the MPD or the MPD_URL on the basis of the transport_stream_id field and the MPD_pid field. The broadcast receiving device 100 may identify the broadcast stream including the MPD or the MPD_URL using the transport_stream_id field, and may identify the packet including the MPD using the MPD_pid field. Thereafter, the broadcast receiving device 100 may extract the MPD or the MPD_URL from the packet including the MPD or the MPD_URL. In a specific embodiment, the packet including the MPD may include the MPD information table. In another specific embodiment, the packet including the MPD_URL may include the MPD link information table. Here, the table ID of the information table may be predetermined. However, in the case where the table ID of the information table is not predetermined, the bootstrap_data may include a table_id field indicating the table ID of the information table.

FIG. 44 illustrates the syntax of the MPD bootstrap_data in the case where the MPD descriptor includes information on an IP datagram including the MPD, the MPD information table or the MPD link information table.

In the case where the MPD descriptor includes information on an IP datagram including the MPD, the MPD information table or the MPD link information table, the bootstrap_data includes an IP_version_flag field, a source_IP_address_flag field, a source_IP_address field, a destination_IP_address field, a destination_port_number field, and a dataPipe_id field. The dataPipe_id field indicates an identifier of a data transmission channel of a physical layer. In detail, the broadcast receiving device 100 may obtain a specific IP datagram via a corresponding transmission channel. The IP_version_flag field indicates a version of an IP address format. The source_IP_addressflag field indicates whether a source IP address of the IP datagram including the MPD, the MPD information table or the MPD link information table is included. The destination_IP_address field indicates an IP address for downloading the IP datagram including the MPD, the MPD information table or the MPD link information table. The destination_port_number field indicates a port number for downloading the IP datagram including the MPD, the MPD information table or the MPD link information table. The broadcast receiving device 100 may extract the MPD, the MPD information table or the MPD link information table on the basis of the dataPipe_id field, the destination_IP_address field, and the destination_port_number field. The broadcast receiving device 100 may identify the data channel of the physical layer that transmits the IP datagram on the basis of the dataPipe_id field, and may extract the IP datagram including the MPD, the MPD information table or the MPD link information table on the basis of the destination_IP_address field and the destination_port_number field. Thereafter, the broadcast receiving device 100 may extract the MPD, the MPD information table or the MPD link information table from the IP datagram including the MPD, the MPD information table or the MPD link information table.

FIG. 45 illustrates the syntax of the MPD bootstrap_data in the case where the MPD descriptor includes information on a session-based transport protocol session such as FLUTE or ALC/LCT for transmitting the MPD.

In the case where the media content presentation information is transmitted via a session-based transport protocol session such as FLUTE or ACL/LCT, the bootstrap_data includes an IP_version_flag field, a source_IP_address_flag field, a source_IP_address field, a destination_IP_address field, a destination_port_number field, a dataPipe_id field, and a flute_tsi field. The IP_version_flag field indicates a version of an IP address format. The source_IP_address_flag field indicates whether a source_IP_address of a FLUTE session for transmitting the MPD is included. The destination_IP_address field indicates an IP address of the FLUTE session for transmitting the MPD. The destination_port_number field indicates a port number of the FLUTE session for transmitting the MPD. The dataPipe_id field indicates an identifier of a data transmission channel of a physical layer. The flute_tsi field indicates an identifier of the FLUTE session for transmitting the MPD. The broadcast receiving device 100 may extract the MPD, the MPD information table or the MPD link information table using the dataPipe_id field, the destination_IP_address field, and the destination_port_number field, and the flute_tsi field. In detail, the broadcast receiving device 100 may identify the data transmission channel of the physical channel according to a value of the dataPipe_id field, and may extract the MPD, the MPD information table or the MPD link information table using the flute_tsi field, the destination_IP_address field, and the destination_port_number field.

FIG. 46 is a flowchart illustrating an operation of receiving, by a broadcast receiving device, the media content presentation information in the case where a method of transmitting the media content presentation information is added to the broadcast information signaling information table so as to be transmitted.

The broadcast receiving device 100 receives a broadcast stream via the broadcast receiving unit 110 (S701).

The broadcast receiving device 100 extracts, via the control unit, an information table including a descriptor including the method of transmitting the media content presentation information (S703). As described above, the information table may be one of a program specific information (PSI) table defined in the ISO/IEC 13818-1 standard, a system information (SI) table defined in the ETSI EN 300 468 standard, and a program and system information protocol (PSIP) table defined in the ATSC standard. In particular, the information table may be an information table for signaling information on broadcast content. The information on broadcast content may be information on a broadcasting service, information on an elementary stream, or information on an event. In detail, the information table may be one of a terrestrial virtual channel table (TVCT) and an event information table (EIT) among tables defined in A/65 that is one of ATSC standards, a service map table (SMT) among tables defined in A/153, a service description table (SDT) and an EIT defined in the ETSI EN 300 468 standard, and a program map table (PMT) defined in the ISO/IEC 13818-1 standard.

The broadcast receiving device 100 extracts, via the control unit 150, the descriptor including the method of transmitting the media content presentation information from the information table (S705).

The broadcast receiving device 100 extracts, via the control unit 150, the method of transmitting the media content presentation information from the information table (S707). The descriptor may include a transport_mode element indicating a specific method of transmitting the media content presentation information or the media content presentation information table. The descriptor may include a bootstrap_data element including specific transmission information according to the method of transmitting the media content presentation information or the media content presentation information table. Here, the broadcast receiving device 100 may identify the method of transmitting the media content presentation information or the media content presentation information table on the basis of the transport_mode element, and may extract transmission information of the media content presentation information or the media content presentation information table on the basis of the bootstrap_data element. Here, as described above, the method of transmitting the media content presentation information may correspond to one of the case where the descriptor directly includes the media content presentation information, the case where the descriptor directly includes the media content presentation information table, the case where the media content presentation information or the media content presentation information table is downloadable via a link included in the descriptor, the case where a packet that is different from a packet that includes the descriptor includes the media content presentation information or the media content presentation information link, the case where an additional broadcast stream includes the media content presentation information or the media content presentation information link, the case where the bootstrap_data element includes an identifier of a broadcast stream including the media content presentation information and a packet identifier, the case where an IP datagram includes the media content presentation information or the media content presentation information table, and the case where the media content presentation information is transmitted via a session-based transport protocol.

The broadcast receiving device 100 obtains, via the control unit 150, the media content presentation information on the basis of the method of transmitting the media content presentation information or the media content presentation information table (S709). Here, the broadcast receiving device 100 may obtain the media content presentation information table via the control unit 150. The broadcast receiving device 100 may extract the media content presentation information from the media content presentation information table via the control unit 150.

The broadcast receiving device 100 receives media content via the IP transmitting/receiving unit 130 on the basis of the media content presentation information (S711).

The broadcast receiving device 100 presents the media content via the control unit 150 (S713). In detail, the broadcast receiving device 100 may present the media content on the basis of the media content presentation information via the control unit 150. Here, in the case where broadcast content is transmitted via not only a broadcasting network but also an IP network, the media content may be presented on the basis of whether transmission of a broadcast stream is stable. This configuration will be described with reference to FIG. 47.

FIG. 47 is a flowchart illustrating an operation of presenting, by a broadcast receiving device, media content on the basis of whether transmission of a broadcast stream is stable in the case where broadcast content is transmitted via not only a broadcasting network but also an IP network.

The broadcast receiving device 100 determines, via the control unit 150, whether broadcast content specified by a descriptor is transmitted via not only a broadcasting network but also an IP network (S901). In detail, the broadcast receiving device 100 may determine, via the control unit 150, whether a value of the simulcast_flag element included in the descriptor is 1.

In the case where the broadcast content specified by the descriptor is transmitted via the IP network, the broadcast receiving device 100 determines, via the control unit 150, whether transmission of a broadcast stream is stable (S903). In detail, the broadcast receiving device 100 may determine, via the control unit 150, whether a strength of a signal of the broadcast stream transmitted via the broadcasting network is lower than a certain reference level. In another specific embodiment, the broadcast receiving device 100 may determine, via the control unit 150, whether presentation interruption of the broadcast content occurs.

If the transmission of the broadcast stream is unstable, the broadcast receiving device 100 receives the media content via the IP transmitting/receiving unit 130 on the basis of the media content presentation information (S905).

The broadcast receiving device 100 presents the media content via the control unit 150 (S907). In detail, the broadcast receiving device 100 may present the media content on the basis of the media content presentation information via the control unit 150.

The method of transmitting media content presentation information via a broadcast network has been described above with reference to FIGS. 31 to 47. It is noted that the above description has been given referring to the signaling table and section format of the existing moving picture expert group (MPEG)-2 transport stream (TS) with reference to FIGS. 31 to 47. A signaling information format for a hybrid broadcast is described with reference to FIG. 48, and signaling of media content presentation information transmission through the signaling information format for a hybrid broadcast is described with reference to FIGS. 49 to 63.

FIG. 48 illustrates a syntax of a signaling message for signaling a hybrid broadcast service according to an embodiment of the present invention.

As in the embodiment of FIG. 48 (a), the signaling message may be divided into a header indicating information of the signaling message itself and a payload portion including signaling information which is transmitted by the signaling message. Specifically, the header of the signaling message may include at least one of an identifier for identifying the signaling message, information indicating a length of the signaling message, extension information for extending the identifier for identifying the signaling message, version information indicating a version of the signaling message, information indicating whether the signaling message is currently usable, information indicating a fragment number of a current signaling message when the signaling message is divided into a plurality of fragments, and the number of the last fragment. In particular, the extension information for extending the identifier for identifying the signaling message may include the information indicating a protocol version of the signaling message.

In a specific embodiment, the header of the signaling message may include, as an element, at least one of signaling_id, signaling_length, signaling_id_extension, version_number, current_next_indicator, fragment_number and last_fragment_number, as in the embodiment of FIG. 48 (b).

The signaling_id indicates an identifier for identifying a signaling message. The broadcast reception device 100 may determine what signaling information is signaled by the signaling message, based on the value indicated by the signaling_id. In a specific embodiment, the signaling_id may be an 8-bit element.

The signaling_length indicates a length of the signaling message. The broadcast reception device 100 may determine a length of signaling information which is signaled by the signaling message based on the signaling_length. In a specific embodiment, the signaling_length may be a 12-bit element.

The signaling_id_extension indicates the extension information of the signaling_id. In a specific embodiment, the signaling_id_extension may include a protocol_version element indicating a protocol version of the signaling message. In a specific embodiment, the signaling_version element may be an 8-bit element.

The version_number indicates a version of the signaling message. The broadcast reception device 100 may determine whether there is a change in the signaling information which is signaled by the signaling message based on the version_number. In a specific embodiment, the broadcast reception device 100 may determine that there is a change in the signaling information which is signaled by the signaling message when a value of the version_number of a previously-received signaling message is different from a value of the version_number of a currently-received signaling message. Thus, the broadcast reception device 100 may acquire signaling information which is signaled by a changed signaling message. Also, the broadcast reception device 100 may update a channel map based on the signaling information which is signaled by the changed signaling message. In a specific embodiment, the version_number may be a 5-bit element.

The current_next_indicator indicates whether the signaling message is currently usable. Specifically, when the current_next_indicator has a value of 1, the current_next_indicator may indicate that the signaling information which is signaled by the signaling message is currently usable. Also, when the current_next_indicator has a value of 0, the current_next_indicator may indicate that the signaling information which is signaled by the signaling message is not currently usable and the signaling information which is signaled by a signaling message including the same signaling_id, signaling_id_extension, or fragment_number is usable. In a specific embodiment, the current_next_indicator may be a 1-bit element.

The fragment_number indicates a number of a fragment including a current signaling message when the signaling message is divided into a plurality of fragments. When the signaling information signaled by the signaling message has a large size, the broadcast reception device 100 may divide the signaling information into a plurality of fragments and then transmit the fragments for transmission efficiency. In this case, the broadcast reception device 100 may receive a signaling message based on the fragment_number. Also, the broadcast reception device 100 may arrange the signaling message based on the fragment_number. Specifically, the broadcast reception device 100 may determine whether a fragment includes previously-received signaling information based on the fragment_number although the signaling message has the same identifier. In a specific embodiment, the fragment_number may be an 8-bit element.

The last_fragment_number indicates the number of the last fragment. The broadcast reception device 100 may determine whether all fragments including the signaling message are received based on the last_fragment_number. Specifically, the broadcast reception device 100 may determine that entire information signaled by the signaling message is received when the signaling messages of fragment numbers ranged to the last_frag_number are all received. The last_fragment_number may be an 8-bit element.

FIG. 49 illustrates a syntax of a signaling message for signaling a hybrid broadcast service according to another embodiment of the present invention.

The signaling message may include media content presentation information itself. Also, the signaling message may include media content presentation information signaling information for signaling the media content presentation information.

The header of the signaling message described with reference to FIG. 48 may include information for identifying content of the signaling message. In a specific embodiment, extension information included in the header of the signaling message may include information for identifying content of the signaling message. For example, extension information for an identifier for identifying the signaling message may include a sequence number. In this case, the broadcast reception device 100 may identify the content of the signaling message based on the sequence number. Specifically, when signaling messages have different sequence numbers although the signaling messages include the same signaling message identifier, the broadcast reception device 100 may determine that the signaling messages include different signaling message content.

In a specific embodiment, as in the embodiment of FIG. 49, in the header of the signaling message, a signaling_id_extension element may include a sequence_number element. The sequence_number element may identify content of the signaling message as described above. A specific embodiment thereof will be described with reference to FIG. 50.

FIG. 50 illustrates an example in which an MPD is identified by using a sequence number of a signaling message for signaling a hybrid broadcast service according to another embodiment of the present invention.

The header of the signaling message in FIG. 50 (*a*) and the header of the signaling message in FIG. 5 (*b*) have the same identifier. It is noted that the signaling message in FIG. 50 (*a*) and the signaling message in FIG. 5(*b*) have different content. Specifically, the signaling message in FIG. 50 (*a*) and the signaling message in FIG. 5 (*b*) signal MPDs having different identifiers. In this case, the header of the signaling message in FIG. 50 (*a*) and the header of the signaling message in FIG. 5(*b*) have different sequence numbers. Thus, the broadcast reception device 100 may know that the two signaling messages include different content, based on the sequence numbers. Specifically, the broadcast reception device 100 may know that the two signaling messages signal different MPDs, based on the sequence numbers.

A method of signaling media content presentation information by using the signaling message described with reference to FIGS. 48 to 50 will be described with reference to FIGS. 51 to 56.

FIG. 51 illustrates a syntax of a signaling message when the signaling message includes an MPD in the form of data according to another embodiment of the present invention.

The signaling message may include media content presentation information in the form of data. In this case, the signaling message may include information indicating a length of data in which the media content presentation information is included. Also, the signaling message may include information indicating an encoding method of the data in which the media content presentation information is included. The information indicating an encoding method of the data in which the media content presentation information is included may indicate that the signaling message includes the data in which the media content presentation information is included, without particularly compressing the data. Also, the information indicating an encoding method of the data in which the media content presentation information is included may represent that the signaling message includes the data in which the media content presentation information is included, in the compressed form by using a gzip algorithm. The broadcast reception device 100 may extract the media content presentation information based on the information indicating the encoding method of the data in which the media content presentation information is included.

In a specific embodiment, when the signaling message signals an MPD, the signaling message is referred to as an MPD signaling message. The MPD signaling message of FIG. 51 may include an MPD_coding element, an MPD_byte_length element, and an MPD_bytes( ) element.

The MPD_coding indicates an encoding method of data including an MPD included in the MPD signaling message. Specifically, the MPD_coding may indicate that the MPD signaling message includes data including the MPD without any compression or includes the data including the MPD in the compressed form by using a gzip algorithm. When the MPD_coding has a value of 0 as in the embodiment of FIG. 52, the MPD_coding may indicate that the MPD signaling message includes the data including the MPD without any compression. When the MPD_coding has a value of 1, the MPD_coding may indicate that the MPD signaling message includes the data including the MPD in the compressed form by using a gzip algorithm. The broadcast reception device 100 may determine a type of the data including the MPD based on a value of the MPD_coding. In a specific embodiment, the MPD_coding may be a 2-bit element.

The MPD_byte_length may indicate a length of the data including the MPD. In a specific embodiment, the MPD_byte_length may be a 12-bit element.

The MPD_bytes( ) indicates data actually including the MPD.

FIG. 53 illustrates a syntax of a signaling message including an MPD along with an identifier for identifying the MPD, when the signaling message includes the MPD in the form of data according to another embodiment of the present invention.

The signaling message may include an identifier for identifying media content presentation information. Thus, the broadcast reception device 100 may determine whether to extract the media content presentation information whom the signaling message signals, based on the identifier for identifying the media content presentation information. Specifically, when a media content presentation information identifier included in the signaling message corresponds to an identifier of media content presentation information which the broadcast reception device 100 intends to receive, the broadcast reception device 100 may extract the media content presentation information. For example, when the signaling message includes an identifier of the media content presentation information, which is different from the identifier of previously-received media content presentation information, the broadcast reception device 100 may extract the media content presentation information. In this way, the broadcast reception device 100 may avoid unnecessary data processing. Also, as described above, it may be determined whether to extract media content presentation information from a signaling message based on information indicating a version of the signaling message. Furthermore, the signaling message may also include information indicating a length of an identifier for identifying media content presentation information.

In a specific embodiment, the MPD signaling message may include at least one of MPD_id_length and MPD_id_byte( ), like the embodiment of FIG. 53.

The MPD_id_byte( ) indicates an MPD identifier for identifying an MPD.

The MPD_id_length indicates a length of the MPD_id_byte( ). In a specific embodiment, the MPD_id_length may be a 12-bit element.

As described above, the broadcast reception device 100 may determine whether to extract an MPD from the MPD signaling message based on at least one of the signaling_id, the signaling_id_extension, the version_number, the fragment_number and the MPD_id_byte. For example, the broadcast reception device 100 may compare the MPD identifier of the MPD, which is previously extracted, with a value of the MPD_id_byte, and when the MPD identifier of the MPD is not identical to the value of the MPD_id_byte, extract an MPD from the signaling message.

FIG. 54 illustrates a syntax of a signaling message when the signaling message signals an identifier for indicating an address at which it is possible to receive an MPD, according to another embodiment of the present invention.

As described above, when the signaling message directly transmits the media content presentation information, the size of the signaling message increases, and there is a burden for a broadcast transmission device 10 to receive the signaling message. In order to decrease the burden of the broadcast transmission device 10, the signaling message may transmit an address identifier that is an identifier of an address at which it is possible to receive media content presentation information or media content presentation information signaling information for signaling the media content presentation information. Specifically, the address identifier may be a uniform resource locator (URL). In this case, the broadcast reception device 100 may extract the address identifier from the signaling message. Also, the broadcast reception device 100 may receive the media content presentation information or the media content presentation information signaling information based on the address identifier. For example, the broadcast reception device 100 may extract an address of a server that transmits the media content presentation information or the media content presentation information signaling information and receive the media content presentation information or the media content presentation information signaling information from the server based on the extracted address.

In a specific embodiment, a signaling message including an identifier of an address at which it is possible to receive an MPD or an address at which it is possible to receive MPD signaling information for signaling the MPD may be referred to as an MPDURL signaling message. In a specific embodiment, the MPDURL signaling message may include an MPD_URL_length element, and an MPD_URLbyte( ) element, like the embodiment of FIG. 54.

The MPD_URLbyte( ) indicates an identifier of an address at which it is possible to receive the MPD or an address at which it is possible to receive the MPD signaling information for signaling the MPD. In a specific embodiment, the broadcast reception device 100 may receive the MPD based on a value of the MPD_URLbyte. For example, the broadcast reception device 100 may extract an address of a content server 50, which transmits the MPD or the MPD signaling information for signaling the MPD, from the MPD URL signaling message. Also, the broadcast reception device 100 may receive the MPD or the MPD signaling information for signaling the MPD from the content server 50 based on the extracted address.

The MPD_URL_length indicates a length of the MPD_URLbyte( ). In a specific embodiment, the MPD_URL_length may be a 12-bit element.

FIG. 55 illustrates a syntax of a signaling message for signaling an identifier for identifying an MPD in a case where the signaling message signals an identifier indicating an address at which it is possible to receive an MPD or an address at which it is possible to receive MPD signaling information for signaling the MPD, according to another embodiment of the present invention.

As described above, an identifier of media content presentation information signaled by the signaling message is included, thus making it possible to repeatedly extract the media content presentation information. Therefore, even when the signaling message includes a media content presentation information address identifier, the signaling message may include an identifier for identifying the media content information along therewith. Accordingly, the broadcast reception device 100 may determine whether to extract the address identifier which the signaling message signals, based on the identifier for identifying the media content presentation information. Specifically, when the media content presentation information identifier included in the signaling message corresponds to an identifier of media content presentation information which the broadcast reception device 100 intends to receive, the broadcast reception device 100 may extract the media content presentation information address identifier. For example, when the signaling message includes an identifier of the media content presentation information, which is different from an identifier of previously-received media content presentation information, the broadcast reception device 100 may extract the media content presentation information address identifier.

In a specific embodiment, the MPD URL signaling message may include MPD_URLbyte( ), an element. Also, the MPD URL signaling message may include MPD_id_length as an element.

The MPD_id_byte( ) indicates an MPD identifier for identifying an MPD.

The MPD_id_length indicates a length of the MPD_id_byte( ) In a specific embodiment, the MPD_id_length may be a 12-bit element.

The broadcast reception device 100 may determine whether to extract an URL at which it is possible to receive an MPD from the MPD signaling message based on at least one of the signaling_id, the signaling_id_extension, the version_number, the fragment_number, and the MPD_id_byte. For example, the broadcast reception device 100 may compare an MPD identifier of the MPD, which is previously extracted, with a value of the MPD_id_byte, and when the MPD identifier of the MPD is not identical to the value of the MPD_id_byte, extract the URL at which it is possible to receive the MPD from the signaling message.

FIG. 56 illustrates an example in which a signaling message includes a type of an MPD transmission method and signals transmission of media content presentation information according to the transmission method, according to another embodiment of the present invention When the signaling message signals a type of a method of transmitting media content presentation information and specific transmission information according to the method of transmitting media content presentation information, the broadcast reception device 100 may receive the media content presentation information using various methods. Therefore, the media content presentation information can be transmitted and received in compliance with broadcast environments and characteristics of a zone where the broadcast reception device 100 is used. Specifically, the method of transmitting the media content presentation information may be transmission via the same broadcast stream as a broadcast stream carrying a signaling message or transmission via an IP packet stream of a cellular network. Also, the method of transmitting the media content presentation information may be transmission via an IP packet stream of a different broadcast stream from a broadcast stream for transmitting a signaling message. Also, the method of transmitting the media content presentation information may be transmission via a session-based transport protocol of the same broadcast stream as a broadcast stream for transmitting a signaling message. Also, the method of transmitting the media content presentation information may be transmission via a session-based transport protocol of a different broadcast stream from a broadcast stream for transmitting a signaling message. Also, the method of transmitting the media content presentation information may be transmission via a packet-based transport protocol of the same broadcast stream as a broadcast stream for transmitting a signaling message. Also, the method of transmitting the media content presentation information may be transmission via a packet-based transport protocol of a different broadcast stream from a broadcast stream for transmitting a signaling message. Also, the method of transmitting the media content presentation information may include signaling transmission of an identifier of an address at which it is possible to receive a signaling message including the media content presentation information or a media content presentation information address identifier.

Also, it is possible to signal transmission of the media content presentation information for various broadcast services while signaling broadcast services. Specifically, broadcast service signaling information for signaling a broadcast service may also signal transmission of media content presentation information for presentation of the broadcast service. Also, the broadcast service signaling information for signaling a broadcast service may signal transmission of media content presentation information for presentation of media content associated with the broadcast service.

In the embodiment of FIG. 56, a service signaling message for signaling a service may include, as an element, at least one of num_service, service_id, service_type, short_service_name_length, short_service_name, channel_number, signaling_delivery_mode, signaling_location, num_service_level_descriptor, and service_level_descriptor( ).

The num_service indicates the number of broadcast services which are signaled by the service signaling message. In a specific embodiment, the num_service may be an 8-bit field.

The service_id indicates an identifier for identifying a corresponding broadcast service. In a specific embodiment, the service_id may be a 16-bit element.

The service_type indicates a type of a corresponding broadcast service. The service_type may indicate a scheduled audio service representing an audio service which is broadcast at a predetermined time. Also, the service_type may indicate an audio service or a scheduled audio/video service including both an audio and a video, which is broadcast at a predetermined time. In addition, the service_type may indicate a user request service provided in response to a user request. Also, the service_type may indicate a right issue service or an application-based service, which is provided based on an application. Also, the service_type may indicate a service guide service for providing information about broadcast services. In a specific embodiment, when the service_type has a value of 0x00, the service_type may indicate a scheduled audio service, when the service_type has a value of 0x01, the service_type may indicate a scheduled audio/video service, when the service_type has a value of 0x02, the service_type may indicate a user request service, when the service_type has a value of 0x03, the service_type may indicate an application-based service, when the service_type has a value of 0x04, the service_type may indicate a right issue service, and when the service_type has a value of 0x05, the service_type may indicate a service guide service. In a specific embodiment, the service_type may be an 8-bit element.

The short_service_name indicates a name representing a broadcast service.

The short_service_name_length indicates a length of the short_service_name. In a specific embodiment, the short_service_name_length may be a 3-bit element.

The channel_number indicates a channel_number representing a broadcast service. In a specific embodiment, the channel_number may be a 16-bit element.

The signaling_delivery_mode indicates a transmission type of the media content presentation information. In a specific embodiment, the signaling_delivery_mode may indicate transmission via the same broadcast stream as a broadcast stream for transmitting a signaling message or via an IP packet stream of a cellular network. Also, the signaling_delivery_mode may indicate transmission via an IP packet stream of a different broadcast stream from a broadcast stream for transmitting a signaling message. Also, the signaling_delivery_mode may indicate transmission via a session-based transport protocol of the same broadcast stream as a broadcast stream for transmitting a signaling message. Also, the signaling_delivery_mode may indicate transmission via a session-based transport protocol of a different broadcast stream from a broadcast stream for transmitting a signaling message. Also, the signaling_delivery_mode may indicate transmission via a packet-based transport protocol of the same broadcast stream as a broadcast stream for transmitting a signaling message. Also, the signaling_delivery_mode may indicate transmission via a packet-based transport protocol of a different broadcast stream from a broadcast stream for transmitting a signaling message. Also, the signaling_delivery_mode may indicate signaling of transmission of an identifier of an address at which it is possible to receive a signaling message including media content presentation information or a media content presentation information address identifier.

In a specific embodiment as in FIG. 57, when the signaling_delivery_mode has a value of 0x00, the signaling_delivery_mode indicates transmission via the same broadcast stream as a broadcast stream for transmitting a signaling message or via an IP packet stream of a cellular network, when the signaling_delivery_mode has a value of 0x01, the signaling_delivery_mode may indicate transmission via an IP packet stream of a different broadcast stream from a broadcast stream for transmitting a signaling message, when the signaling_delivery_mode has a value of 0x02, the signaling_delivery_mode may indicate transmission via a session-based transport protocol of the same broadcast stream as a broadcast stream for transmitting a signaling message, when the signaling_delivery_mode has a value of 0x03, the signaling_delivery_mode may indicate transmission via a session-based transport protocol of a different broadcast stream from a broadcast stream for transmitting a signaling message, when the signaling_delivery_mode has a value of 0x04, the signaling_delivery_mode may indicate transmission via a packet-based transport protocol of the same broadcast stream as a broadcast stream for transmitting a signaling message, when the signaling_delivery_mode has a value of 0x05, the signaling_delivery_mode may indicate transmission via a packet-based transport protocol of a different broadcast stream from a broadcast stream for transmitting a signaling message, and when the signaling_delivery_mode has a value of 0x06, the signaling_delivery_mode may indicate signaling of transmission of an identifier of an address at which it is possible to receive a signaling message including media content presentation information or a media content presentation information address identifier. In a specific embodiment, the signaling_delivery_mode is an 8-bit element.

The signaling_location signals transmission of the media content presentation information according to a transmission type of the media content presentation information. Details will be described below with reference to FIGS. 58 to 68.

The service_level_descriptor( ) delivers specific information about a corresponding broadcast service.

The num_service_level_descriptor indicates the number of the num_service_level_descriptors. In a specific embodiment, the num_service_level_descriptor is an 8-bit element.

FIG. 58 illustrates an example in which a signaling message signals transmission of media content presentation information when a media content presentation information transmission method of the signaling message is transmission via the same broadcast stream as a broadcast stream for transmitting a signaling message or via an IP packet stream of a cellular network, according to another embodiment of the present invention.

When the broadcast reception device 100 signals media content presentation information or a media content presentation information address identifier via the same broadcast stream as a broadcast stream for transmitting a signaling message or via an IP packet stream of a cellular network, the broadcast reception device 100 is required to identify an IP datagram for transmitting the media content presentation information. Therefore, the signaling message may include information for identifying the IP datagram for transmitting the media content presentation information or the media content presentation information address identifier. Specifically, the signaling message may include at least one of information indicating a version of an IP address, information indicating a source address of the IP datagram, information indicating a destination address of the IP datagram, and information indicating a destination_UDP_port_number of the IP datagram. The broadcast reception device 100 may extract, from the signaling message, the information for identifying the IP datagram for transmitting the media content presentation information or the media content presentation information address identifier and extract the media content presentation information based on the information for identifying the IP datagram. Specifically, the broadcast reception device may extract the media content presentation information based on at least one of the information indicating a version of an IP address, the information indicating a source address of the IP datagram, the information indicating a destination address of the IP datagram, and the information indicating a destination UDP port number of the IP datagram.

In a specific embodiment as in FIG. 58, the signaling_location may include, as an element, at least one of IP_version_flag, source_IP_address_flag, source_IP_address, destination_IP_address_flag, destination_IP_address, port_num_count, and destination_UDP_port_number.

The IP_version_flag indicates a version of an IP address format. In a specific embodiment, the IP_version_flag may be a 1-bit element.

The source_IP_address_flag indicates whether a source IP address of an IP datagram including the media content presentation information or the media content presentation information address identifier is included. The source_IP_address_flag may be a 1-bit element.

The source_IP_address indicates a source_IP_address at which it is possible to download the IP datagram including the media content presentation information or the media content presentation information address identifier. The source_IP_address may be a 32-bit or 128-bit element.

The destination_IP_address_flag indicates whether a destination IP address of an IP datagram including the media content presentation information or the media content presentation information address identifier is included. The destination_IP_address_flag may be a 1-bit element.

The destination_IP_address indicates a destination IP address at which it is possible to download the IP datagram including the media content presentation information or the media content presentation information address identifier. The destination_IP_address may be a 32-bit or 128-bit element.

The destination_UDP_port_number indicates a UDP port number at which it is possible to download the IP datagram including the media content presentation information or the media content presentation information address identifier. The destination_UDP_port_number may be a 16-bit element.

The port_num_count indicates the number of the destination_UDP_port_numbers.

FIG. 59 illustrates an example in which a signaling message signals transmission of media content presentation information when a media content presentation information transmission method of the signaling message is transmission via an IP packet stream of a different broadcast stream from a broadcast stream for transmitting the signaling message, according to another embodiment of the present invention.

When the broadcast transmission device 10 transmits the media content presentation information or the media content presentation information address identifier via an IP packet stream of a different broadcast stream from a broadcast stream for transmitting a signaling message, the broadcast reception device 100 is required to identify an IP datagram and a broadcast stream for transmitting the media content presentation information or the media content presentation information address identifier. Therefore, in this case, the signaling message may include an identifier for identifying the broadcast stream for transmitting the media content presentation information or the media content presentation information address identifier. In this case, the identifier for identifying the broadcast stream may be a unique identifier of a broadcaster that transmits the signaling message through a corresponding frequency or a transport frame transmitted. Specifically, the identifier for identifying the broadcast stream may be an identifier of a broadcast service transport stream. Also, as described with reference to FIG. 58, the signaling message may include information for identifying the IP datagram for transmitting the media content presentation information or the media content presentation information address identifier. The broadcast reception device 100 may extract information for identifying the IP datagram and the broadcast stream for transmitting the media content presentation information or the media content presentation information address identifier, from the signaling message and extract the media content presentation information based on the information for identifying the IP datagram and the broadcast stream. Specifically, the broadcast reception device 100 may extract the media content presentation information based on at least one of an identifier for identifying the broadcast stream, information indicating a version of an IP address, information indicating a source address of the IP datagram, information indicating a destination address of the IP datagram, and information indicating a destination UDP port number of the IP datagram.

In a specific embodiment as in FIG. 59, the signaling_location may include, as an element, at least one of broadcast_id, IP_version_flag, source_IP_address_flag, source_IP_address, destination_IP_address_flag, destination_IP_address, port_num_count, and destination_UDP_port_number.

The broadcast_id indicates an identifier for identifying the broadcast stream for transmitting the IP datagram which transmits the media content presentation information or the media content presentation information address identifier. The identifier for identifying the broadcast stream may be a unique identifier of a broadcaster which transmits the signaling message through a corresponding frequency or a transport frame transmitted. Specifically, the identifier for identifying the broadcast stream may be an identifier of a broadcast service transport stream. In a specific embodiment, the broadcast_id may be a 16-bit element.

Descriptions for the other elements may be the same as described with reference to FIG. 58.

FIG. 60 illustrates an example in which a signaling message signals transmission of the media content presentation information when a media content presentation information transmission method of the signaling message is transmission via a session-based transport protocol of the same broadcast stream as a broadcast stream for transmitting the signaling message, according to another embodiment of the present invention.

When the broadcast transmission device 10 transmits the media content presentation information or the media content presentation information address identifier via the session-based transport protocol, the broadcast reception device 100 is required to identify a session for transmitting the media content presentation information or the media content presentation information address identifier. Therefore, in this case, the signaling message may include an identifier for identifying the session for transmitting the media content presentation information or the media content presentation information address identifier. The session-based transport protocol may correspond to one of a file delivery over unidirectional transport (FLUTE) protocol and an asynchronous layered coding (ALC)/layered coding transport (LCT) protocol. Specifically, the identifier for identifying a session may be a transport session identifier (TSI). The broadcast reception device 100 may extract an address at which it is possible to receive media content presentation information or media content based on the identifier for identifying the session for transmitting an address at which it is possible to receive the media content presentation information and the media content. Also, when the session-based transport protocol is based on IP streams, the signaling message may include information for identifying an IP datagram for transmitting the session. Specifically, as described in the embodiments of FIGS. 59 and 60, the signaling message may include at least one of information indicating a version of an IP address, information indicating a source address of the IP datagram, information indicating a destination address of the IP datagram, and information indicating a destination UDP port number of the IP datagram. Also, the broadcast reception device 100 may identify the IP datagram for transmitting the session based on at least one of the information indicating a version of an IP address, the information indicating a source address of the IP datagram, the information indicating a destination address of the IP datagram, and a destination UDP port number of the IP datagram.

In a specific embodiment, as described with reference to FIG. 60, the signaling_location may include, as an element, at least one of IP_version_flag, source_IP_address_flag, source_IP_address, destination_IP_address_flag, destination_IP_address, port_num_count, destination_UDP_port_number, and a TSI.

The IP_version_flag indicates a version of an IP address format. In a specific embodiment, the IP_version_flag may be a 1-bit element.

The source_IP_address_flag indicates whether a source IP address of the IP datagram including the session for transmitting the media content presentation information or the media content presentation information address identifier is included. The source_IP_address_flag may be a 1-bit element.

The source_IP_address indicates the source IP address at which it is possible to download the IP datagram including the session for transmitting the media content presentation information or the media content presentation information address identifier. The source_IP_address may be a 32-bit or 128-bit element.

The destination_IP_address_flag indicates whether a destination IP address of the IP datagram including the session for transmitting the media content presentation information or the media content presentation information address identifier is included. The destination_IP_address_flag may be a 1-bit element.

The destination_IP_address indicates the destination IP address at which it is possible to download the IP datagram including the session for transmitting the media content presentation information or the media content presentation information address identifier. The destination_IP_address may be a 32-bit or 128-bit element.

The destination_UDP_port_number indicates a UDP port number at which it is possible to download the IP datagram including the session for transmitting the media content presentation information or the media content presentation information address identifier. The destination_UDP_port_number may be a 16-bit element.

The port_num_count indicates the number of the destination_UDP_port_numbers.

The TSI indicates an identifier of the session for transmitting the media content presentation information or the media content presentation information address identifier. In a specific embodiment, the TSI may be an identifier for identifying an FLUTE session. In another specific embodiment, the TSI may be an identifier for identifying an ALC/LCT session. In a specific embodiment, the TSI may be a 16-bit element.

FIG. 61 illustrates an example in which a signaling message signals transmission of media content presentation information when a media content presentation information transmission method of the signaling message is transmission via a session-based transport protocol of a different broadcast stream from a broadcast stream for transmitting the signaling message, according to another embodiment of the present invention.

When the broadcast transmission device 10 transmits the media content presentation information or the media content presentation information address identifier via a session-based transport protocol of a different broadcast stream from a broadcast stream for transmitting the signaling message, the broadcast reception device 100 is required to identify the session and the broadcast stream for transmitting the media content presentation information or the media content presentation information address identifier. Therefore, in this case, the signaling message may include an identifier for identifying a broadcast stream for transmitting the media content presentation information or the media content presentation information address identifier. In this case, the identifier for identifying the broadcast stream may be a unique identifier of a broadcaster which transmits the signaling message through a corresponding frequency or a transport frame transmitted. Specifically, the identifier for identifying the broadcast stream may be an identifier of a broadcast service transport stream. Also, as described with reference to FIG. 58, the signaling message may include an identifier for identifying the session for transmitting the media content presentation information or the media content presentation information address identifier. The broadcast reception device 100 may extract an address at which it is possible to receive media content presentation information and media content based on the identifier for identifying the session and the identifier for identifying the broadcast stream for transmitting an address at which it is possible to receive the media content presentation information and the media content. Also, as described with reference to FIG. 60, when the session-based transport protocol is based on IP streams, the signaling message may include information for identifying an IP datagram for transmitting the session. Also, the broadcast reception device 100 may identify the IP datagram for transmitting the session based on at least one of information indicating a version of an IP address, information indicating a source address of the IP datagram, information indicating a destination address of the IP datagram, and a destination UDP port number of the IP datagram.

In a specific embodiment, as described with reference to FIG. 60, the signaling_location may include, as an element, at least one of broadcast_id, IP_version_flag, source_IP_address_flag, source_IP_address, destination_IP_address_flag, destination_IP_address, port_num_count, destination_UDP_port_number, and a TSI.

The broadcast_id indicates an identifier for identifying a broadcast stream for transmitting a session for transmitting the media content presentation information or the media content presentation information address identifier. The identifier for identifying the broadcast stream may be a unique identifier of a broadcaster which transmits the signaling message through a corresponding frequency or a transport frame transmitted. Specifically, the identifier for identifying the broadcast stream may be an identifier of a broadcast service transport stream. In a specific embodiment, the broadcast_id may be a 16-bit element.

Descriptions for the other elements may be the same as described with reference to FIG. 60.

FIG. 62 illustrates an example in which a signaling message signals transmission of the media content presentation information when a media content presentation information transmission method of the signaling message is transmission via a packet-based transport protocol of the same broadcast stream as a broadcast stream for transmitting the signaling message, according to another embodiment of the present invention.

When the broadcast transmission device 10 transmits media content presentation formation or a media content presentation information address identifier via the packet-based transport protocol, the broadcast reception device 100 is required to identify a packet for transmitting the media content presentation information or the media content presentation information address identifier. Therefore, in this case, the signaling message may include an identifier for identifying the packet for transmitting the media content presentation information or the media content presentation information address identifier. The packet-based transport protocol may correspond to one of a MPEG-2 TS protocol and an MPEG media transport (MMT) protocol. The broadcast reception device 100 may extract an address at which it is possible to receive media content presentation information and media content, based on the identifier for identifying a packet for transmitting an address at which it is possible to receive the media content presentation information and the media content. Also, when the packet-based transport protocol is based on IP streams, the signaling message may include information for identifying an IP datagram for transmitting the packet. Specifically, as described in the embodiments of FIGS. 59 and 60, the signaling message may include at least one of information indicating a version of an IP address, information indicating a source address of the IP datagram, information indicating a destination address of the IP datagram, and information indicating a destination UDP port number of the IP datagram. Also, the broadcast reception device 100 may identify the IP datagram for transmitting the packet based on at least one of the information indicating a version of an IP address, the information indicating a source address of the IP datagram, the information indicating a destination address of the IP datagram, and the destination_UDP_port_number of the IP datagram.

In a specific embodiment, as in FIG. 62, the signaling_location may include, as an element, at least one of IP_version_flag, source_IP_address_flag, source_IP_address, destination_IP_address_flag, destination_IP_address, port_num_count, destination_UDP_port_number, and packet_id.

The IP_version_flag indicates a version of an IP address format. In a specific embodiment, the IP_version_flag may be a 1-bit element.

The source_IP_address_flag indicates whether a source IP address of the IP datagram including the packet for transmitting the media content presentation information or the media content presentation information address identifier. The source_IP_address_flag may be a 1-bit element.

The source_IP_address indicates the source IP address at which it is possible to download the IP datagram including the packet for transmitting the media content presentation information or the media content presentation information address identifier. The source_IP_address may be a 32-bit or 128-bit element.

The destination_IP_address_flag indicates whether a destination IP address of the IP datagram including the packet for transmitting the media content presentation information or the media content presentation information address identifier is included. The destination_IP_address_flag may be a 1-bit element.

The destination_IP_address indicates the destination IP address at which it is possible to download the IP datagram including the packet for transmitting the media content presentation information or the media content presentation information address identifier. The destination_IP_address may be a 32-bit or 128-bit element.

The destination_UDP_port_number indicates a UDP port number at which it is possible to download the IP datagram including the packet for transmitting the media content presentation information or the media content presentation information address identifier. The destination_UDP_port_number may be a 16-bit element.

The port_num_count indicates the number of the destination_UDP_port_numbers.

The packet_id indicates an identifier of the packet for transmitting the media content presentation information or the media content presentation information address identifier. In a specific embodiment, the TSI may be an identifier for identifying an MMT packet. In another specific embodiment, the TSI may be an identifier for identifying an MPEG-2 TS packet. In a specific embodiment, the TSI may be a 16-bit element.

FIG. 63 illustrates an example in which a signaling message signals transmission of media content presentation information when a media content presentation information transmission method of the signaling message is transmission via a packet-based transport protocol of a different broadcast stream from a broadcast stream for transmitting the signaling message, according to another embodiment of the present invention.

When the broadcast transmission device 10 transmits media content presentation information or a media content presentation information address identifier via the packet-based transport protocol of a different broadcast stream from a broadcast stream for transmitting the signaling message, the broadcast reception device 100 is required to identify a packet and a broadcast stream for transmitting the media content presentation information or the media content presentation information address identifier. Therefore, in this case, the signaling message may include an identifier for identifying the broadcast stream for transmitting the media content presentation information or the media content presentation information address identifier. In this case, the identifier for identifying the broadcast stream may be a unique identifier of a broadcaster which transmits the signaling message via a corresponding frequency or a transport frame transmitted. Specifically, the identifier for identifying the broadcast stream may be an identifier of a broadcast service transport stream. Also, as described with reference to FIG. 62, the signaling message may include an identifier for identifying the packet for transmitting the media content presentation information or the media content presentation information address identifier. The broadcast reception device 100 may extract an address at which it is possible to receive media content presentation information and media content based on the identifier for identifying the packet and the identifier for identifying the broadcast stream for transmitting an address at which it is possible to receive the media content presentation information and the media content. Also, as described with reference to FIG. 62, when the packet-based transport protocol is based on IP streams, the signaling message may include information for identifying an IP datagram for transmitting the packet. Also, the broadcast reception device 100 may identify the IP datagram for transmitting the packet based on at least one of information indicating a version of an IP address, information indicating a source address of the IP datagram, information indicating a destination address of the IP datagram, and a destination_UDP_port_number of the IP datagram.

In a specific embodiment, as in FIG. 63, the signaling_location may include, as an element, at least one of broadcast_id, IP_version_flag, source_IP_address_flag, source_IP_address, destination_IP_address_flag, destination_IP_address, port_num_count, destination_UDP_port_number, and packet_id.

The broadcast_id indicates an identifier for identifying the broadcast stream for transmitting the packet for transmitting the media content presentation information or the media content presentation information address identifier. The identifier for identifying the broadcast stream may be a unique identifier of a broadcaster which transmits the signaling message through a corresponding frequency or a transport frame transmitted. Specifically, the identifier for identifying the broadcast stream may be an identifier of a broadcast service transport stream. In a specific embodiment, the broadcast_id may be a 16-bit element.

Descriptions for the other elements may be the same as described with reference to FIG. 62.

FIG. 64 illustrates signaling of transmission of an identifier of an address at which it is possible to receive a signaling message including media content presentation information or a media content presentation information address identifier, according to another embodiment of the present invention. The signaling message may include an identifier of an address at which it is possible to receive a signaling message including the media content presentation information or the media content presentation information address identifier. The broadcast reception device 100 may receive the media content presentation information based on the identifier of the address at which it is possible to receive the signaling message including the media content presentation information or the media content presentation information address identifier. In a specific embodiment, the identifier of the address at which it is possible to receive the signaling message may be a uniform resource locator (URL).

In a specific embodiment as in FIG. 64, signaling_location may include, as an element, at least one of URL_length and URL_char.

The URL_char indicates an identifier of the address at which it is possible to receive the signaling message including the media content presentation information or the media content presentation information address identifier. In a specific embodiment, the identifier of the address at which it is possible to receive the signaling message may be an URL. In a specific embodiment, the URL_char is an 8-bit element.

The URL_length may indicate a length of the URL_char. In a specific embodiment, the URL_length may be an 8-bit element.

A specific operation of the broadcast transmission device 10 for transmission of the media content presentation information and a specific operation of the broadcast reception device 100 for transmission of the media content presentation information will be described below with reference to FIGS. 65 to 66.

FIG. 65 is a flowchart of an operation of transmitting, by a broadcast transmission device, a broadcast signal including a media signaling message.

The broadcast transmission device 10 generates and transmits a broadcast signal based on media content presentation information. A specific operation of the broadcast transmission device 10 is described below.

A control unit of the broadcast transmission device 10 acquires media content presentation information. The control unit of the broadcast transmission device 10 acquires media content presentation information.

A configuration of the broadcast transmission device is described before the operation of the broadcast transmission device 10 is described. Specifically, the broadcast transmission device 10 includes a control unit and a transmitting unit. The control unit controls an operation of the broadcast transmission device 10. The transmitting unit transmits a broadcast signal. The operation of the broadcast transmission device 10 is described based on the configuration of the broadcast transmission device 10.

The broadcast transmission device 10 determines a media content presentation information transmission method (S751). Specifically, the broadcast transmission device 10 may determine a media content presentation information transmission method through the control unit. The broadcast transmission device 10 may determine to transmit the media content presentation information itself. In another specific embodiment, the broadcast transmission device 10 may determine to transmit an identifier for identifying an address at which it is possible to receive the media content presentation information. Also, in a specific embodiment, the broadcast transmission device 10 may determine to transmit an identifier for identifying the media content presentation information along with the media content presentation information itself. In another specific embodiment, the broadcast transmission device 10 may determine to transmit an identifier for identifying the media content presentation information along with the identifier for identifying an address at which it is possible to receive the media content presentation information. In this way, the broadcast reception device 100 may selectively receive media content presentation information which is intended to be received, from among a plurality of pieces of media content presentation information. Also, the broadcast reception device 100 may not repeatedly receive the media content presentation information.

In another specific embodiment, the broadcast transmission device 10 may determine to transmit media content presentation information or a media content presentation information address identifier. Specifically, the broadcast transmission device 10 may transmit the media content presentation information or the media content presentation information address identifier, via the same broadcast stream as a broadcast stream for transmitting a signaling message or via an IP packet stream of a cellular network. Also, the broadcast transmission device 10 may transmit the media content presentation information or the media content presentation information address identifier, via an IP packet stream of a different broadcast stream from a broadcast stream for transmitting a signaling message. Also, the broadcast transmission device 10 may transmit the media content presentation information or the media content presentation information address identifier, via a session-based transport protocol of the same broadcast stream as a broadcast stream for transmitting a signaling message. Also, the broadcast transmission device 10 may transmit the media content presentation information or the media content presentation information address identifier, via a session-based transport protocol of a different broadcast stream from a broadcast stream for transmitting a signaling message. Furthermore, the broadcast transmission device 10 may transmit the media content presentation information or the media content presentation information address identifier, via a packet-based transport protocol of the same broadcast stream as a broadcast stream for transmitting a signaling message. In addition, the broadcast transmission device 10 may transmit the media content presentation information or the media content presentation information address identifier, via a packet-based transport protocol of a different broadcast stream from a broadcast stream for transmitting a signaling message. Also, the broadcast transmission device 10 may signal transmission of an identifier of an address at which it is possible to receive a signaling message including the media content presentation information or the media content presentation information address identifier.

The broadcast transmission device 10 generates media content presentation information signaling information according to the media content presentation information transmission method (S753). Specifically, the broadcast transmission device 10 may generate the media content presentation information signaling information according to the media content presentation information transmission method, through the control unit. The media content presentation information signaling information includes information necessary to receive media content information or an identifier for identifying an address at which it is possible to receive the media content information. Specifically, the signaling_location which is described with reference to FIGS. 56 to 64 may correspond to the media content presentation information signaling information. When the broadcast transmission device 10 transmits the media content presentation information or the media content presentation information address identifier via the same broadcast stream as a broadcast stream for transmitting a signaling message or an IP packet stream of a cellular network, the media content presentation information signaling information may include information for identifying an IP datagram for transmitting the media content presentation information or the media content presentation information address identifier. Also, when the broadcast transmission device 10 transmits the media content presentation information or the media content presentation information address identifier via an IP packet stream of a different broadcast stream from a broadcast stream for transmitting a signaling message, the media content presentation information signaling information may include information for identifying an IP datagram and a broadcast stream for transmitting the media content presentation information and the media content presentation information address identifier. When the broadcast transmission device 10 transmits the media content presentation information or the media content presentation information address identifier via a session-based transport protocol of the same broadcast stream as a broadcast stream for transmitting a signaling message, the media content presentation information signaling information may include information for identifying a session for transmitting the media content presentation information or the media content presentation information address identifier. When the broadcast transmission device 10 transmits the media content presentation information or the media content presentation information address identifier via a session-based transport protocol of a different broadcast stream from a broadcast stream for transmitting a signaling message, the media content presentation information signaling information may include information for identifying a session and a broadcast stream for transmitting the media content presentation information or the media content presentation information address identifier. When the broadcast transmission device 10 transmits the media content presentation information or the media content presentation information address identifier via a packet-based transport protocol of the same broadcast stream as a broadcast stream for transmitting a signaling message, the media content presentation information signaling information may include information for identifying a packet for transmitting the media content presentation information or the media content presentation information address identifier. When the broadcast transmission device 10 transmits the media content presentation information or the media content presentation information address identifier via a packet-based transport protocol of a different broadcast stream from a broadcast stream for transmitting a signaling message, the media content presentation information signaling information may include information for identifying a packet and a broadcast stream for transmitting the media content presentation information or the media content presentation information address identifier. Also, when the broadcast transmission device 10 transmits an identifier of an address at which it is possible to receive a signaling message including the media content presentation information or the media content presentation information address identifier, the media content presentation information signaling information may include an identifier of an address at which it is possible to receive a signaling message including a media content presentation information address identifier.

The broadcast transmission device 10 generates a signaling message based on the media content presentation information signaling information (S757). Specifically, the broadcast transmission device 10 may generate a signaling message based on the media content presentation information signaling information through the control unit. The broadcast transmission device 10 may generate a signaling message including the media content presentation information signaling information. Also, in a specific embodiment, a media signaling message may be a signaling message for signaling information of a broadcast service. For example, the broadcast reception device 100 may insert information about a broadcast service and media content presentation information signaling information for media content presentation information associated with the broadcast service. In this case, the media content presentation information associated with the broadcast service may include information about presentation of the broadcast service. Also, the media content presentation information associated with the broadcast service may include information about presentation of media content associated with the broadcast service.

The broadcast transmission device 10 transmits a broadcast signal including the signaling message (S759). The broadcast transmission device 10 may transmit a broadcast signal including the signaling message through the transmitting unit. In a specific embodiment, the broadcast transmission device 10 may transmit media content presentation information and a media content presentation information address identifier together. In this case, the broadcast transmission device 10 may make a transmission period of the media content presentation information different from a transmission period of the media content presentation information address identifier. Specifically, the broadcast transmission device 10 may make the transmission period of the media content presentation information longer than the transmission period of the media content presentation information address identifier and perform transmission. For example, the broadcast transmission device 10 may transmit the media content presentation information every 10 seconds, and transmit the media content presentation information address identifier every 0.5 seconds. In this way, the broadcast reception device 100 may reduce the number of transmissions of the media content presentation information having a relatively large amount of data and replace it with transmission of the media content presentation information address identifier having a relatively small amount of data. Therefore, the broadcast transmission device 10 may reduce a burden on a broadcast service bandwidth. Also, it is possible to reduce a data processing burden of the broadcast reception device 100. As the data processing burden required for broadcast reception is reduced in the broadcast reception device 100, a broadcast service change speed may be also improved in the broadcast reception device 100.

FIG. 66 illustrates a flowchart of an operation of acquiring, by a broadcast reception device, media content transmission information and presenting media content, based on a signaling message.

The broadcast reception device 100 receives a broadcast signal (S771). Specifically, the broadcast reception device 100 receives a broadcast signal through the broadcast receiving unit 110.

The broadcast reception device 100 receives the signaling message based on the broadcast signal (S773). Specifically, the broadcast reception device 100 may receive the signaling message based on the broadcast signal through the control unit 150. In a specific embodiment, the broadcast reception device 100 may extract the signaling message from the broadcast signal. As described above, the signaling message may signal information of a broadcast service.

The broadcast reception device 100 acquires a media content presentation information transmission method based on the signaling message (S775). Specifically, the broadcast reception device 100 may acquire a media content presentation information transmission method based on the signaling message through the control unit 150. As described above, the media content presentation information transmission method may be transmission via the same broadcast stream as a broadcast stream for transmitting the signaling message or via an IP packet stream of a cellular network. Also, the media content presentation information transmission method may be transmission via an IP packet stream of a different broadcast stream from a broadcast stream for transmitting the signaling message. Also, the media content presentation information transmission method may be transmission via a session-based transport protocol of the same broadcast stream as a broadcast stream for transmitting the signaling message. Also, the media content presentation information transmission method may be transmission via a session-based transport protocol of a different broadcast stream from a broadcast stream for transmitting the signaling message. Also, the media content presentation information transmission method may be transmission via a packet-based transport protocol of the same broadcast stream as a broadcast stream for transmitting the signaling message. Also, the media content presentation information transmission method may be transmission via a packet-based transport protocol of a different broadcast stream from a broadcast stream for transmitting the signaling message. Also, the media content presentation information transmission method may signal transmission of an identifier of an address at which it is possible to receive a signaling message including media content presentation information or a media content presentation information address identifier.

The broadcast reception device 100 acquires media content presentation information signaling information based on the media content presentation information transmission method (S777). The broadcast reception device 100 may acquire media content presentation information signaling information based on the media content presentation information transmission method, through the control unit. As described above, the media content presentation information signaling information includes information necessary to receive media content information or an identifier for identifying an address at which it is possible to receive the media content information. Specifically, the signaling_location which is described with reference to FIGS. 56 to 64 may correspond to the media content presentation information signaling information. When the media content presentation information transmission method is transmission via the same broadcast stream as a broadcast stream for transmitting the signaling message or via an IP packet stream of a cellular network, the broadcast reception device 100 may extract information for identifying an IP datagram for transmitting the media content presentation information or the media content presentation information address identifier, from the media content presentation information signaling information. When the media content presentation information transmission method is transmission via an IP packet stream of a different broadcast stream from a broadcast stream for transmitting the signaling message, the broadcast reception device 100 extract information for identifying an IP datagram and a broadcast stream for transmitting the media content presentation information or the media content presentation information address identifier, from the media content presentation information signaling information. When the media content presentation information transmission method is transmission via a session-based transport protocol of the same broadcast stream as a broadcast stream for transmitting the signaling message, the broadcast reception device 100 extract information for identifying a session for transmitting the media content presentation information or the media content presentation information address identifier, from the media content presentation information signaling information. When the media content presentation information transmission method is transmission via a session-based transport protocol of a different broadcast stream from a broadcast stream for transmitting a signaling message, the broadcast reception device 100 extract information for identifying a session and a broadcast stream for transmitting the media content presentation information or the media content presentation information address identifier, from the media content presentation information signaling information. When the media content presentation information transmission method is transmission via a packet-based transport protocol of the same broadcast stream as a broadcast stream for transmitting the signaling message, the broadcast reception device 100 extract information for identifying a packet for transmitting the media content presentation information or the media content presentation information address identifier, from the media content presentation information signaling information. When the media content presentation information transmission method is transmission via a packet-based transport protocol of a different broadcast stream from a broadcast stream for transmitting the signaling message, the broadcast reception device 100 extract information for identifying a packet and a broadcast stream for transmitting the media content presentation information or the media content presentation information address identifier, from the media content presentation information signaling information. Also, when the media content presentation information transmission method is transmission of an identifier of an address at which it is possible to receive a signaling message including the media content presentation information or the media content presentation information address identifier, the broadcast reception device 100 extract an identifier of an address at which it is possible to receive a signaling message including the media content presentation information address identifier, from the media content presentation information signaling information.

The broadcast reception device 100 acquires media content presentation information based on the media content presentation information signaling information (S779).

Specifically, the broadcast reception device 100 may acquire media content presentation information based on the media content presentation information signaling information, through the control unit. Specifically, the broadcast reception device 100 may acquire a media content presentation information address identifier based on the media content presentation information signaling information. Also, the broadcast reception device 100 may receive media content presentation information from an external server based on the media content presentation information address identifier.

As described above, the broadcast transmission device 10 may transmit media content presentation information and a media content presentation information address identifier together. In this case, a transmission period of the media content presentation information may be different from a transmission period of the media content presentation information address identifier. In this case, the transmission period of the media content presentation information may be longer than the transmission period of the media content presentation information address identifier. For example, the broadcast transmission device 10 may transmit the media content presentation information every 10 seconds, and transmit the media content presentation information address identifier every 0.5 seconds. In this way, the broadcast reception device 100 may reduce the number of transmissions of the media content presentation information having a relatively large amount of data. Therefore, the broadcast transmission device 10 may reduce a burden on a broadcast service bandwidth. In this way, the broadcast reception device 100 may reduce the number of transmissions of the media content presentation information having a relatively large amount of data and replace it with transmission of the media content presentation information address identifier having a relatively small amount of data. Thus, it is possible to reduce a data processing burden of the broadcast reception device 100. As the data processing burden required for broadcast reception is reduced in the broadcast reception device 100, a broadcast service change speed may be improved in the broadcast reception device 100.

The broadcast reception device 100 receives media content based on the media content presentation information (S781). Specifically, the broadcast reception device 100 may receive the media content from a broadcast signal through the broadcast receiving unit 110. In another specific embodiment, the broadcast reception device 100 may receive the media content from an external server through an IP transmitting/receiving unit 130. In this case, the external server may be the content server 50 as described above.

The broadcast reception device 100 presents the media content (S783). The broadcast reception device 100 may present the media content through the control unit 150.

In general, a screen presentation time of broadcast content is determined according to a program clock reference, such as 90 KHz. On the other hand, a screen presentation time of media content transmitted via an IP network is determined according to a timescale allocated at the time of content generation. Therefore, the broadcast reception device 100 capable of presenting both broadcast content and media content is required to synchronize the screen presentation time of the broadcast content with the screen presentation time of the media content transmitted via the IP network. In particular, in the case of presenting media content identical to broadcast content transmitted via the IP network subsequently to broadcast content transmitted through a broadcast network, the broadcast reception device 100 is required to synchronize the presentation times. Also, in order to synchronize a plurality of additional services received through the broadcast stream with the media content and provide the additional services, the broadcast reception device 100 is required to synchronize the presentation times. A method of synchronizing the screen presentation times of broadcast content and media content transmitted via the IP network will be described with reference FIGS. 67 to 70.

A content provider or broadcaster may include information for synchronization of the media content in a separate synchronization information packet of a broadcast stream and perform transmission. Referring to FIG. 67, there is described a case where the information for synchronization of the media content is included in the separate synchronization information packet of the broadcast stream and is then transmitted.

The synchronization information packet may include a force_update element indicating whether it is necessary to update media content presentation information before presentation time synchronization.

Also, the synchronization information packet may include switch_timer indicating a remaining time from a broadcast stream reference time of the synchronization information packet to a start time of the presentation interval of the media content to be synchronized. In this case, the broadcast stream reference time is a time set to synchronize a plurality of elementary streams included in the broadcast stream with a single timeline. The synchronization information packet may include the broadcast stream reference time of the synchronization information packet. In the case where the broadcast stream complies with the MPEG-2 TS standard, the broadcast stream reference time of the synchronization information packet may be a PTS. When the switch_timer element has a value of 0, the switch_timer element may indicate that the presentation interval of the media content to be synchronized is in an active state, and it is necessary to synchronize the media content immediately. When the switch_timer element does not have a value of 0, the switch_timer element may indicate that the presentation interval of the media content to be synchronized is not in an active state.

Also, the synchronization information packet may include a presentation_time element indicating a presentation time of the media content itself which is to be synchronized with the broadcast content. By using a value of the presentation_time element, it is possible to acquire a synchronized presentation time of broadcast content received before a new synchronization information packet is received. This acquisition is performed using the following equation.

$$MPT=(PT-PTO)/RC+(\text{presentation\_time}-\text{TimeOffset})/\text{timescale}$$

In this equation, MPT denotes a synchronized presentation time of broadcast content received before a new synchronization information packet is received, PTO denotes a broadcast stream reference time of a synchronization information packet, PT denotes a broadcast stream reference time of broadcast content received before a new synchronization information packet is received, RC denotes a reference clock of a broadcast stream, presention_time denotes a presentation time of the media content itself which is a value of the presentation_time element, the TimeOffset denotes a media content presentation start time of a presentation interval of media content which is a subject for synchronization of a synchronization information packet, and timescale denotes a time scale of the presentation time of media content itself.

Also, a packet including information for synchronization of the media content may include a period_id element indicating an identifier of the media content presentation interval to be synchronized. In a specific embodiment, when the media content is transmitted according to the MPEG-DASH standard, the period_id may include an id of a period element of an MPD and a URL of the MPD.

When the broadcast stream is transmitted according to the MPEG-2 TS standard, the synchronization information packet may be transmitted as a packet elementary stream (PES) packet. In this case, the synchronization information packet may be a private stream of which the stream id has a value of 0xBD. Also, a synchronization information packet of which the data_alignment_indicator field has a value of 1 may be identical to a start of a payload of the PES packet.

FIG. 67 illustrates a syntax of a broadcast stream packet including synchronization information of media content transmitted via a communication network according to an MPEG-DASH standard.

In the embodiment of FIG. 67, the media content may be transmitted according to the MPEG-DASH standard.

Therefore, the synchronization information packet may be referred to as a DASHTime packet.

The DASHTime packet includes a DASHTimePacket_identifier field, an mpd_force_update field, a period_switch_timer field, a presentation_time field, and a period_id field.

The DASHTimePacket_identifier field indicates an identifier for identifying the DASHTime packet.

The mpd_force_update field indicates that the MPD is required to be updated prior to presentation time synchronization.

The period_switch_timer field indicates a remaining time from the broadcast stream reference time of the DASHTime packet to a start time of the period element of the MPD to be synchronized. In the case where a value of the switch_timer field is 0, the switch_timer field may indicate that a period identified by the period_id field is currently active and media content is required to be synchronized immediately. In the case where the value of the switch_timer field is not 0, the switch_timer field may indicate that the period identified by the period_id field is not in an active state currently.

The presentation_time field indicates an own presentation time of media content transmitted via an IP network which is to be synchronized with broadcast content. Here, by sing a value of the presentation_time field, it is possible to acquire a synchronized presentation time of broadcast content received before a new DASHTime packet is received. This acquisition is performed using the following equation.

$$MPT=(PT-PTO)/RC+(presentation\_time-TimeOffset)/SegmentBase.timescale$$

In the equation, MPT denotes the synchronized presentation time of broadcast content received before a new DASHTime packet is received, PTO denotes the broadcast stream reference time of the synchronization information packet, PT denotes the broadcast stream reference time of the broadcast content received before the new DASHTime packet is received, RC denotes the reference clock of a broadcast stream, presentation_time denotes the own presentation time of media content which is a value of the presentation_time field, TimeOffset denotes a media content presentation start time of a presentation interval of the media content to be synchronized by the DASHTime packet, and SegmentBase.timescale denotes a value of the timescale element of the MPD.

The period_id field enables identification of the period element of the MPD, and includes an ID of the period element of the MPD and a URL of the MPD. The broadcast reception device 100 may identify media content to be synchronized and the Period element that is a presentation interval of the media content, through the period_id.

In the case where synchronization information is transmitted via an additional synchronization information packet as in the embodiment of FIG. 67, the broadcast reception device 100 is required to receive an additional packet to synchronize media content with broadcast content. In general, to overcome this limitation, a header of a packet including broadcast content such as a video or an audio includes a broadcast content reference time for synchronization between elementary streams. For example, the header of a packet of a broadcast stream according to the MPEG-2 TS standard includes a PTS. Therefore, if the synchronization information is added to the header of a packet including broadcast content such as video or audio so as to be transmitted, the broadcast reception device 100 may efficiently synchronize media content with broadcast content. Details will be described below with reference to FIGS. 68 and 69.

The header of a packet including broadcast content such as a video or an audio may include a presentation_time element indicating an own presentation time of media content to be synchronized with the broadcast content. Furthermore, the header may include a period_id element indicating an identifier of a presentation interval of media content to be synchronized. The header may also include an id element indicating that information for synchronization between media content and broadcast content is included.

FIG. 68 illustrates a syntax of synchronization information added to the header of a packet including broadcast content such as a video or an audio according to an embodiment of the present invention.

FIG. 69 illustrates the syntax of synchronization information added to the header of a packet including broadcast content such as a video or an audio according to another embodiment of the present invention.

In the examples of FIGS. 68 and 69, the header of a packet including broadcast content, such as video or audio, includes information for synchronization with media content transmitted according to the MPEG-DASH standard. In this case, the information for synchronization is referred to as DASHTime_private_data. The DASHTime_private_data includes a presentation_time field and a period_id field. The presentation_time field represents a presentation time of media content itself, which is synchronized with broadcast content. The period_id field enables identification of the Period element of MPD and includes an id of the Period element of the MPD and a URL of the MPD. In the embodiment of FIG. 67, the DASHTime_private_data further includes an id element indicating that the DASHTime_private_data includes information for synchronization between media content and broadcast content.

FIG. 70 is a flowchart of an operation of synchronizing, by a broadcast reception device, broadcast content with media content according to an embodiment.

The broadcast reception device 100 receives a broadcast steam through the broadcast receiving unit 110 (S1101).

The broadcast reception device 100 extracts synchronization information for synchronization between broadcast content and media content transmitted through an IP network through the control unit 150 (S1103). In a specific embodiment, the broadcast reception device 100 may extract the synchronization information from a synchronization information packet through the control unit 150. In another specific embodiment, the broadcast reception device 100 may extract the synchronization information from the header of a packet including broadcast content, such as video or audio, through the control unit 150.

The broadcast reception device 100 receives media content through the IP transmitting/receiving unit 130 (S1105).

The broadcast reception device 100 synchronizes the broadcast content and the media content through the control unit (S1107).

When the broadcast reception device 100 receives the media content through an IP network as well as the broadcast content, it is necessary for the broadcast reception device 100 to access the broadcast content based on the media content presentation information in order to enhance efficiency of interworking between broadcast content and media content.

A method of including information about broadcast content in the media content presentation information and transmitting the media content presentation information will be described with reference to FIGS. 71 to 73.

The media content presentation information may include information for identifying broadcast content such that the broadcast reception device 100 accesses broadcast content based on the media content presentation information. Specifically, an identifier for identifying a broadcast stream including broadcast content may be included therein. For example, when the broadcast content is transmitted according to the MPEG-2 TS standard, the media content presentation information may include a TSID. Also, an identifier for identifying a broadcast service including broadcast content may be included therein. For example, when the broadcast content is transmitted according to the MPEG-2 TS standard, the media content presentation information may include a program number. Also, when the broadcast content is transmitted according to the ATSC standard, a source id and a channel_number of a virtual channel may be included therein. Also, when the broadcast content is transmitted according to the DVB standard, a serviceid may be included therein. Also, an identifier for identifying a packet including broadcast content may be included therein. For example, when the broadcast content is transmitted according to the MPEG-2 TS standard, the media content presentation information may include a packet ID (PID).

In a specific embodiment, the media content presentation information may include an identifier generated by combining an identifier for identifying a broadcast stream including broadcast content, an identifier for identifying a broadcast service including broadcast content, and an identifier for identifying a packet including broadcast content.

FIG. 71 illustrate a format of information for identifying broadcast content included in media content presentation information when broadcast content is transmitted according to the ATSC standard.

FIG. 72 illustrates an example of an MPD of MPEG-DASH including information for identifying broadcast content transmitted according to the ATSC standard.

In the embodiments of FIGS. 71 and 72, the information for identifying broadcast content may be a combination of a TSID for identifying a transport stream, an SSID for identifying a source of an elementary stream, and a PID for identifying a packet.

Also, the information for identifying broadcast content may be a combination of a TSID for identifying a transport stream, a PNUM for identifying a program stream, and a PID for identifying a packet.

Also, the information for identifying broadcast content may be a combination of a TSID for identifying a transport stream, a CHNUM for identifying a virtual channel, and a PID for identifying a packet. In this case, the CHUM for identifying a virtual channel may have a format i which a major channelnumber and a minor channelnumber are connected through symbol "-".

FIG. 73 illustrates a flowchart of an operation of, by a broadcast reception device, receiving broadcast content based on media content presentation information.

The broadcast reception device 100 receives media content presentation information through the IP transmitting/receiving unit 130 (S1303).

The broadcast reception device 100 extracts information for identifying broadcast content through the control unit 150 (S1303).

The broadcast reception device 100 receives broadcast content based on the information for identifying broadcast content through the broadcast receiving unit 110 and the control unit 150 (S1305). Specifically, the broadcast reception device 100 receives a broadcast stream through the broadcast receiving unit 110. In this case, the broadcast reception device 100 may receive a broadcast stream based on an identifier of a broadcast stream included in the information for identifying the broadcast content. The broadcast reception device 100 extracts the broadcast content based on the information for identifying broadcast content from the broadcast stream. In this case, the broadcast reception device 100 may extract broadcast content based on an identifier of a broadcast service included in the information for identifying the broadcast content from the broadcast stream.

A method of receiving media content presentation information through a broadcast network by which the broadcast reception device according to the above-described embodiments will be described with reference to FIGS. 74 to 76. Also, a case where the broadcast reception device synchronizes broadcast content with media content will be described in detail.

FIG. 74 illustrates a block diagram for describing an example in which a broadcast reception device receives an MPD of MPEG-DASH via a broadcast network for transmitting a broadcast stream according to the MPEG-2 TS standard.

According to the embodiment of FIG. 74, the control unit 150 of the broadcast reception device 100 includes a PSI parser, a IS filter, a TS/PES depacketizer, and a decoder.

The IS filer extracts a packet having a specific PID from a broadcast stream.

The PSI parser extracts signaling information by parsing a PSI table, such as a program association table (PAT) or a program MAP table (PMT). In a specific embodiment, the PSI parser may extract an MPD_descriptor included in the PMT.

The TS/PES depacketizer extracts payload data from a TS/PES packet. In a specific embodiment, when the MPD is transmitted as a separate information table in the broadcast stream, the TS/PES depacketizer may extract the MPD from the separate information table based on the MPD_descriptor. Specifically, the TS/PES depacketizer may extract the MPD from an information table included in a packet corresponding to a PID included in the MPD_descriptor. Also, the TS/PES depacketizer extracts a video elementary stream and an audio elementary stream from the TS/PES packet.

The decoder decodes video and audio.

FIG. 75 is a block diagram for describing an example in which a broadcast reception device synchronizes broadcast content of a broadcast stream transmitted according to the MPEG-2 TS standard with media content transmitted via a communication network.

According to the embodiment of FIG. 75, the control unit 150 of the broadcast reception device 100 includes a TS/PES depacketizer and a decoder.

The TS/PES depacketizer extracts payload data from a TS/PES packet. In a specific embodiment, when the MPD is transmitted as a separate information table in the broadcast stream, the TS/PES depacketizer may extract the MPD from the separate information table based on the MPD_descriptor. Specifically, the TS/PES depacketizer may extract the MPD from an information table included in a packet corresponding to a PID included in the MPD_descriptor. Also, the TS/PES depacketizer extracts synchronization information for synchronization between media content and broadcast content from the TS/PES packet. In this case, the synchronization information may include a presentation time of the media content, an identifier form identifying, and a period element of the MPD, and an MPD URL. Also, the TS/PES depacketizer extracts a video elementary stream and an audio elementary stream from the TS/PES packet.

The IP transmitting/receiving unit 130 receives the media content from a media CDN server based on the MPD.

The decoder performs synchronization of the received media content based on the synchronization information and decodes the media content.

FIG. 76 illustrates a configuration of a broadcast reception device according to an embodiment.

According to the embodiment of FIG. 76, the broadcast reception device 100 includes a broadcast receiving unit 110, an Internet protocol (IP) transmitting/receiving unit 130, and a control unit 150.

The broadcast receiving unit 110 includes a channel synchronizer 111, a channel equalizer 113, and a channel decoder 115.

The channel synchronizer 111 synchronizes a symbol frequency and timing such that decoding is possible in a baseband in which it is possible to receive a broadcast signal.

The channel equalizer 113 compensates for a distortion in the synchronized broadcast signal. Specifically, the channel equalizer 113 compensates for a distortion in the synchronized broadcast signal due to multipath, the Doppler effect, or the like.

The channel decoder 115 decodes the distortion-compensated broadcast signal. Specifically, the channel decoder 115 extracts a transport frame from the distortion-compensated broadcast signal. In this case, the channel decoder 115 may perform forward error correction (FEC).

The IP transmitting/receiving unit 130 receives and transmits data through the Internet network.

The control unit 150 includes a signaling decoder 151, a transport packet interface 153, a broadband packet interface 155, a baseband operation controller 157, a common protocol stack 159, a service map database 161, a service signaling channel processing buffer and parser 163, an A/V processor 165, a broadcast service guide processor 167, an application processor 169, and a service guide database 171.

The signaling decoder 151 decodes signaling information of a broadcast signal.

The transport packet interface 153 extracts a transport packet from the broadcast signal. In this case, the transport packet interface 153 may extract signaling information and data, such as IP datagram, from the extracted transport packet.

The broadband packet interface 155 extracts an IP packet from data received from the Internet network. In this case, the broadband packet interface 155 may extract signaling data or IP datagram from the IP packet.

The baseband operation controller 157 controls an operation associated with reception of broadcast information reception information from a baseband.

The common protocol stack 159 extracts audio or video from the transport packet.

The A/V processor 547 processes audio or video.

The service signaling channel processing buffer and parser 163 parses and buffers the signaling information for signaling a broadcast service. Specifically, the service signaling channel processing buffer and parser 163 may parse and buffer the signaling information for signaling a broadcast service from the IP datagram.

The service MAP database 165 stores a broadcast service list including information about broadcast services.

The service guide processor 167 processes terrestrial broadcast service guide data for guiding programs of a terrestrial broadcast service.

The application processor 169 extracts and processes application-related information from the broadcast signal.

The service guide database 171 stores program information of the broadcast service.

The schematic configuration and operation of the broadcast reception device 100 have been described above. It is noted that the above description is focused on the operation of the conventional broadcast reception device 100 and the transport protocol. Also, it is noted that the broadcast reception device 100 is required to process data of various transport protocols in order to receive a hybrid broadcast service. A detailed configuration and operation of the broadcast reception device 100 for receiving a hybrid broadcast will be described with reference to FIGS. 77 to 82

FIG. 77 illustrates a configuration of a broadcast reception device according to another embodiment of the present invention.

According to the embodiment of FIG. 77, the broadcast reception device 100 includes a broadcast receiving unit 110, an Internet protocol (IP) transmitting/receiving unit 130, and a control unit 150.

The broadcast receiving unit 110 may include a processor or processors which respectively perform a plurality of functions to be performed by the broadcast receiving unit 110, a circuit or circuits, and a hardware modules or hardware modules. Specifically, the broadcast receiving unit 110 may be a system on chip (SOC) into which several semiconductor parts are integrated. In this case, the SOC may be a semiconductor into which various multimedia components, such as graphics, audio, video, and modem, a processor, and a semiconductor, such as DRAM, are integrated. The broadcast receiving unit 110 may include a physical layer module 119 and a physical layer IP frame module 117. The physical layer module 119 receives and processes a broadcast-related signal through a broadcast channel of a broadcast network. The physical layer IP frame module 117 may convert a data packet, such as IP datagram acquired from the physical layer module 119, into a specific frame. For example, the physical layer module 119 may convert the IP datagram or the like into a RS frame, a GSE, or the like.

The IP transmitting/receiving unit 130 may include a processor or processors which respectively perform a plurality of functions to be performed by the IP transmitting/receiving unit 130, a circuit or circuits, and a hardware module or hardware modules. Specifically, the IP transmitting/receiving unit 130 may be a system on chip (SOC) into which several semiconductor parts are integrated. In this case, the SOC may be a semiconductor into which various multimedia components, such as graphics, audio, video, and modem, a processor, and a semiconductor, such as DRAM, are integrated. The IP transmitting/receiving unit 130 may include an Internet access control module 131. The Internet access control module 131 controls an operation of the broadcast reception device 100 for acquiring at least one of a service, content, and signaling data, through a communication network (broadband).

The control unit 150 may include a processor or processors which respectively perform a plurality of functions to be performed by the control unit 150, a circuit or circuits, and a hardware module or hardware modules. Specifically, the control unit 150 may be a system on chip (SOC) into which several semiconductor parts are integrated. In this case, the SOC may be a semiconductor into which various multimedia components, such as graphics, audio, video, and modem, a processor, and a semiconductor, such as DRAM, are integrated. The control unit 150 may include at least one of a signaling decoder, a service map database 161, a service signaling channel parser 163, an application signaling parser 166, an alert signaling parser 168, a targeting signaling parser 170, a targeting processor 173, an A/V processor 165, an alerting processor 162, an application processor 169, a scheduled streaming decoder 181, a file decoder 182, a user request streaming decoder 183, a file database 184, a component synchronizer 185, a service/content acquisition controller 187, a redistribution module 189, a device manager 193, a data sharing unit 191.

The service/content acquisition controller 187 controls an operation of a receiver for acquiring the service, the content, or the signaling data associated with the content, which is acquired through a broadcast network or a communication network.

The signaling decoder 151 decodes signaling information.

The service signaling parser 163 parses service signaling information.

The application signaling parser 166 extracts and parses service-related signaling information. In this case, the service-related signaling information may be signaling information related to service scan. Also, the service-related signaling information may be signaling information related to content provided through the service.

The alert signaling parser 168 extracts and parses alerting-related signaling information.

The targeting signaling parser 170 extracts and parses information for personalization of a service and content or information for signaling targeting information.

The targeting processor 173 processes information for personalization of a service and content.

The alert signaling parser 168 processes alerting-related signaling information.

The application processor 169 controls application-related information and execution of an application. Specifically, the application processor 169 processes a state of a downloaded application and a display parameter.

The A/V processor 165 processes an audio/video rendering-related operation based on decoded audio or video, or application data.

The scheduled streaming decoder 181 decodes scheduled streaming which is content to be streamed according to a schedule determined by a content provider, such as a broadcaster.

The file decoder 182 decodes the downloaded file. In particular, the file decoder 182 decodes a file downloaded through a communication network.

The user request streaming decoder 183 decodes content provided according to a user request (on demand content).

The file database 184 stores a file. Specifically, the file database 184 may store a file downloaded through a communication network.

The component synchronizer 185 synchronizes the content or the service. Specifically, the component synchronizer 185 synchronizes content which is decoded by at least one of the scheduled streaming decoder 181, the file decoder 182, and the user request streaming decoder 183.

The service/content acquisition controller 187 controls an operation of a receiver for acquiring at least one of the service, the content, or the signaling data associated with the service or the content.

When a service or content is not received through the broadcast network, the redistribution module 189 performs an operation of supporting acquisition of at least one of the service, the content, service-related information and content-related information. Specifically, it is possible to request at least one of the content, the service-related information and the content-related information from an external management device 300. In this case, the external management device 300 may be a content server 50.

The device manager 193 manages an external device which operates in connection therewith. Specifically, the device manager 193 may perform at least one of addition, deletion and update of an external device. Also, the external device may be connected to and perform data exchange with the broadcast reception device 100.

The data sharing unit 191 performs an operation of transmitting data between the broadcast reception device 100 and an external device, and processes exchange-related information. Specifically, the data sharing unit 191 may transmit A/V data or the signaling information to the external device. Also, the data sharing unit 191 may receive A/V data or the signaling information from the external device.

FIG. 78 illustrates a configuration of a broadcast reception device according to another embodiment of the present invention.

According to the embodiment of FIG. 78, the broadcast reception device 100 includes a broadcast receiving unit 110, an Internet protocol (IP) transmitting/receiving unit 130, and a control unit 150.

The broadcast receiving unit 110 may include at least one of a tuner 111 and a physical frame parser 113.

The tuner 111 receives a broadcast signal transmitted through a broadcast network. Also, the tuner 111 may convert a received broadcast signal into a physical frame form.

The physical frame parser 113 extracts a linklayer frame from a physical frame of the received broadcast signal.

The IP transmitting/receiving unit 130 receives and transmits IP data.

The control unit 150 may include at least one of a physical layer controller 251, a link layer frame parser 252, an IP/UDP datagram filter 253, a Route (AL/LCT) client 255, a timing control 257, a system clock 259, a DTV control engine 261, a user input receiver 263, a signaling parser 265, a channel map database 267, an HTTP access client 269, an HTTP access cache 271, a DASH client 273, an ISO BMFF parser 275, a media decoder 277, and a file database 279.

The physical layer controller 251 controls an operation of the broadcast receiving unit 110. Specifically, the physical layer controller 251 may selectively receive a broadcast signal by controlling transport parameters of a broadcast signal received by the broadcast receiving unit 110. For example, the physical layer controller 251 may control a frequency of a broadcast signal received by the tuner 111. Also, the physical layer controller 251 may extract a link layer frame from a broadcast signal by controlling the physical frame parser 113.

The link layer frame parser 252 extracts data corresponding to the payload of a link layer frame from the link layer frame of the broadcast signal. Specifically, the link layer frame parser 252 may extract a link layer signaling from the link layer frame. The link layer signaling signals a broadcast service through a link layer. Due to this, the broadcast reception device 100 may acquire information about a broadcast service without extracting an application layer. Therefore, the broadcast reception device 100 may rapidly scan broadcast services and change the broadcast services. Also, the link layer frame parser 252 may extract IP/UDP datagram from the link layer frame.

The IP/UDP datagram filter 253 extracts a specific IP/UDP datagram from the IP/UDP datagram. Since data transmission through a broadcast network or multicast through a communication network is a unidirectional communication, the broadcast reception device 100 receives data other than data required by the broadcast reception device 100 itself. Therefore, the broadcast reception device 100 is required to extract the data required by the broadcast reception device 100 itself from a data stream. The IP/UDP datagram filter 253 extracts IP/UDP datagram required by the broadcast reception device 100 from an IP/UDP datagram stream. Specifically, the IP/UDP datagram filter 253 extracts IP/UDP datagram corresponding to a designated IP address and UDP port number. In this case, the IP address may include one of a source address and a destination address.

The ROUTE (AL/LCT) client 255 processes an ALC/LCT packet based on Real-time Objective delivery over Unidirectional Transport (ROUTE). The ROUTE protocol is a protocol for transmitting data in real time by using the ALC/LCT packet as an application layer protocol. The broadcast reception device 100 may extract at least one of broadcast service signaling information, NRT data, and media content, from the ALC/LCT packet. In this case, the media content may be of the MPEG-DASH format. Specifically, the media content may be encapsulated with an ISO base media file format (IOS BMFF), and may be transmitted through the MPEG-DASH protocol. The broadcast reception device 100 may extract the MPEG-DASH segment from the ROUTE packet. Also, the broadcast reception device 100 may extract the ISO BMFF file from the MPEG-DASH segment.

The timing control 257 processes a packet including system time information which is a reference of the presentation of media content. Also, the timing control 257 may control a system clock based on the system time information.

The system clock 259 provides a reference clock that is a reference of the operation of the broadcast reception device 100.

The DTV control engine 261 functions as an interface between the components. Specifically, the DTV control engine 261 may transfer a parameter for controlling an operation of each component.

The user input receiver 263 receives a user input. Specifically, the user input receiver 263 may receive at least one of a remote control input, and a key input of a user.

The signaling parser 265 extracts information about a broadcast service by transferring the information about the broadcast service and parsing broadcast service singling information for signaling a broadcast service. Specifically, the signaling parser 265 may extract the information about the broadcast service by parsing the broadcast service singling information extracted from the application layer. In another embodiment, the signaling parser 265 may extract the information about the broadcast service by parsing the broadcast service singling information extracted from a link layer.

The channel map database 267 stores information about a channel map of the broadcast service. Specifically, the signaling parser 265 may extract the information about the broadcast service and store the information about the channel map in the channel map database 267. Also, the DTV control engine 261 may acquire the information about the channel map of the broadcast service from the channel map database. In this case, the information about the channel map may include at least one of a channel number representing the broadcast service and a name of the broadcast service representing the broadcast service.

The HTTP access client 269 processes HTTP data. Specifically, the HTTP access client 269 may transmit a request to the content server 50 using HTTP and receive a response to the request from the content server 50.

The HTTP access cache 271 caches the HTTP data to improve a processing speed of the HTTP data.

The DASH client 273 processes the MPEG-DASH segment. Specifically, the DASH client 273 may process the MPEG-DASH segment received through a communication network. Also, the DASH client 273 may process an MPEG-DASH segment extracted from an application layer of a broadcast signal received through a broadcast network.

The ISO BMFF parser 275 processes an ISO BMFF packet. Specifically, the ISO BMFF parser 275 may extract media content from the ISO BMFF packet.

The media decoder 277 decodes media content. Specifically, the media decoder 277 may present the media content by decoding the media content.

The file database 279 stores a file necessary for the broadcast service. Specifically, the file database 279 may store a file extracted from the application layer of the broadcast signal.

A specific operation of the broadcast reception device 100 will be described with reference to FIGS. 79 to 81.

FIG. 79 is a flowchart of an operation of scanning a broadcast service and generating a channel map in the broadcast reception device 100.

The control unit 150 sets a broadcast signal reception parameter. Specifically, the control unit 150 may set at least one of a frequency, a bandwidth, a symbol rate, and a physical layer pipe (PLP) identifier for broadcast signal reception. In this case, the physical layer pipe is a logical data transport channel for identifying a single radio frequency (RF) channel. The single RF channel may include a physical layer pipe or physical layer pipes. The physical layer pipe may be referred to as a data pipe (DP). In a specific embodiment, the control unit 150 may set the broadcast reception parameter based on a frequency table storing a plurality of broadcast signal reception parameters. For example, the broadcast reception device 100 sequentially sets the broadcast signal reception parameters stored in the frequency table and sequentially receives broadcast signals corresponding to the broadcast signal reception parameters. In this case, the frequency table may be set according to regional standards or regional broadcast environments The broadcast receiving unit 110 receives a broadcast signal based on the broadcast signal reception parameter (S2103). Specifically, the broadcast receiving unit 110 receive a broadcast signal corresponding to the broadcast signal reception parameter. The broadcast receiving unit 110 may extract a physical frame of the broadcast signal by demodulating the broadcast signal.

The control unit 150 extracts broadcast service signaling information from the broadcast signal (S2105). Specifically, the control unit 150 may extract the broadcast service signaling information for signaling information about the broadcast signal from the broadcast signal. The information about the broadcast signal may include information for identifying the broadcast service. The information for identifying the broadcast service may include a channel number representing the broadcast service. Also, the information about the broadcast signal may include a broadcast service identifier for identifying the broadcast service. The information for identifying the broadcast service may include a channel number representing the broadcast service. The information for identifying the broadcast service may include a broadcast service name representing the broadcast service. The information about the broadcast service may include information for reception of the broadcast service. The information for reception of the broadcast service may include a broadcast signal reception parameter necessary for settings of the broadcast receiving unit in order to receive the broadcast service. The information for reception of the broadcast service may include a broadcast stream identifier for identifying a broadcast stream through which the broadcast service is transmitted. The information for reception of the broadcast service may include a UDP port number and an IP address for identifying IP/UDP datagram through which the broadcast service is transmitted. The information for reception of the broadcast service may include a session identifier for identifying a session of a session-based transport protocol. The information for reception of the broadcast service may include a packet identifier for identifying a packet of a packet-based transport protocol. Specifically, the control unit 150 may extract the broadcast service signaling information of the link layer signaling extracted from the link layer. In another embodiment, the control unit 150 may extract the broadcast service signaling information from the application layer. As described above, when the control unit 150 receives the broadcast service signaling information from the link layer, it is possible to reduce a time taken to scan broadcast services.

The control unit 150 generates a channel map storing information about broadcast services based on the broadcast service signaling information (S2107). Specifically, the control unit 150 generates a channel map according to information about a broadcast service provided by the broadcast service signaling information. The channel map may include at least one of information for identifying each broadcast service as described above, and information for receiving each broadcast service. Also, the control unit 150 may store the generated channel map in a channel map database 267. The broadcast reception device 100 may receive a broadcast service based on the channel map. Details will be described below with reference to FIG. 80.

FIG. 80 is a flowchart of an operation of receiving, by the broadcast reception device 100, a broadcast service.

The control unit 150 receives a user input for selection of a broadcast service (S2151). The control unit 150 may receive user input for selection of a broadcast service through the user input receiver 263. Specifically, the control unit 150 may receive an input made by a user to select any one broadcast service from a broadcast service list showing broadcast services. Also, the control unit 150 may receive a user input for a channel number, which is made by the user, through a remote control.

The control unit 150 acquires a broadcast signal reception parameter corresponding to a broadcast service selected by the user (S2153). Specifically, the control unit 150 may acquire a broadcast signal reception parameter corresponding to a broadcast service selected by the user, from the channel map. As described above, a broadcast signal reception parameter may include any one of a frequency, a bandwidth, a symbol rate, and a physical layer pipe identifier for broadcast signal reception.

The control unit 150 sets broadcast signal reception based on the broadcast signal reception parameter (S2103). Specifically, the control unit 150 may set the broadcast receiving unit 110 according to broadcast signal reception parameter. For example, the control unit 150 may set at least one of the broadcast signal reception frequency, bandwidth, symbol rate, and physical layer pipe identifier of the broadcast receiving unit 110. When the broadcast signal reception parameter of a broadcast signal which is being received currently is identical to an acquired broadcast signal reception parameter, the above operation may be omitted.

The broadcast receiving unit 110 receives a broadcast signal based on broadcast signal reception settings (S2157). Specifically, the broadcast receiving unit 110 receives and demodulates the broadcast signal.

The control unit 150 acquires signaling information for the broadcast service selected by the user based on the broadcast signal (S2159). As described above, when the control unit 150 may acquire the broadcast service signaling information from the link layer. Also, the control unit 150 may acquire the broadcast service signaling information from the link layer. The reason why the broadcast service signaling information is again acquired although the channel map includes information about broadcast services which is extracted from the broadcast service signaling information is that information about broadcast services may be changed after the generation of the channel map. Also, the reason for this is that there may be a case where basic information for generation of the channel map is acquired and information about a component included in the broadcast service or information for presentation of the broadcast service is not acquired.

The control unit 150 updates the channel map based on the broadcast service signaling information. Specifically, the control unit 150 may update the channel map when the broadcast service signaling information is changed. In a specific embodiment, the control unit 150 may update the channel map when previously-acquired broadcast service signaling information is different from the broadcast service signaling information. In a specific embodiment, the control unit 150 may compare version information previously-acquired broadcast service signaling information with version information of the broadcast service signaling information and, when the broadcast service signaling information is changed, update the channel map.

The control unit 150 receives a media component whom the broadcast service includes, based on the channel map (S2163). The channel map may include information about media component reception. Specifically, the channel map may include information for receiving a media component. The control unit 150 may acquire information for receiving a media component from the channel map, and receive the media component. For example, the control unit 150 may acquire information for identifying IP/UDP datagram for transmitting the media component from the channel map and information for identifying a session-based transport protocol packet for transmitting the media component and receive the media component. The information for identifying the IP/UDP datagram may include at least one of an IP address and a UDP port number. In this case, the IP address may include at least one of a source address and a destination address. The information for identifying the session-based transport protocol packet may include a session identifier for identifying a session. Specifically, the session identifier may be a TSI of an ALC/LCT session. In another specific embodiment, the control unit 150 may acquire information for identifying IP/UDP datagram for transmitting the media component from the channel map and information for identifying a packet-based transport protocol packet for transmitting the media component and receive the media component. The broadcast reception device 100 may receive a media component based on the media content presentation information. Details will be described below with reference to FIG. 81.

FIG. 81 illustrates a flowchart of an operation of acquiring, by a broadcast reception device, a media component based on media content presentation information.

The broadcast reception device 100 acquires media content presentation information (S2201). As described above, the broadcast reception device 100 may acquire media content presentation information through a signaling message of a broadcast signal.

The broadcast reception device 100 acquires information about the media component based on the media content presentation information (S2203). The information about the media component may include the information for media component reception described above. Also, the media content presentation information related to a broadcast service may include information about presentation of media content associated with the broadcast service.

The broadcast reception device 100 may receive the media component based on the information about the media component (S2205). The broadcast reception device 100 may receive the media component through a broadcast network. Also, the broadcast reception device 100 may receive the media component through a communication network. Also, the broadcast reception device 100 may receive any one of a plurality of media components through the broadcast network and receive another of the plurality of media components through the communication network. For example, the broadcast reception device 100 may receive a video component through the broadcast network and receive an audio component through the communication network.

Again, the operation of the broadcast reception device 100 is described with reference to FIG. 80.

The control unit 150 presents a broadcast service based on the media component (S2165).

A transport frame used in a hybrid broadcast will be described with reference to FIGS. 82 and 83.

FIG. 82 illustrates a broadcast transport frame according to an embodiment of the present invention.

In the embodiment of FIG. 82, the broadcast transport frame includes a P1 part, an L1 part, a common PLP part, a scheduled and interleaved PLP part, and an auxiliary data part.

In the embodiment of FIG. 82, the broadcast transmission device transmits information for transport signal detection through the P1 part of the broadcast transport frame. Also, the broadcast transmission device may transmit tuning information for broadcast signal tuning through the P1 part.

In the embodiment of FIG. 82, the broadcast transmission device transmits a configuration of the broadcast transport frame and characteristics of each PLP through the L1 part. In this case, the broadcast reception device 100 may acquire the configuration of the broadcast transport frame and the characteristics of each PLP by decoding the L1 part based on the P1.

In the embodiment of FIG. 82, the broadcast transmission device may transmit information to be applied commonly to PLPs through the common PLP part. In the specific embodiment, the broadcast transport frame may not include the common PLP part.

In the embodiment of FIG. 82, the broadcast transmission device may transmit a plurality of components included in the broadcast service through the scheduled and interleaved PLP part. In this case, the scheduled and interleaved PLP part includes a plurality of PLPs.

In the embodiment of FIG. 82, the broadcast transmission device may signal to which PLP each component constituting the broadcast service is transmitted, through the L1 part or the common PLP part. It is noted that the broadcast reception device 100 is required to decode all of the plurality of PLPs of the scheduled and interleaved PLP part in order to acquire specific broadcast service information for scanning of broadcast services.

Unlike the embodiment of FIG. 82, the broadcast transmission device may transmit a broadcast transport frame including a separate part including information about a broadcast service transmitted through the broadcast transport frame and a component included in the broadcast service. In this case, the broadcast reception device 100 may rapidly receive information about the broadcast service and components included in the broadcast service, through the separate part. Details will be described below with reference to FIG. 83.

FIG. 83 illustrates a broadcast transport frame according to another embodiment of the present invention.

In the embodiment of FIG. 83, the broadcast transport frame includes a P1 part, an L1 part, a fast information channel (FIC) part, a common PLP part, a scheduled & interleaved PLP part, and an auxiliary data part.

The parts other than the FIC part are the same as the embodiment of FIG. 82.

The broadcast transmission device transmits fast information through the FIC part. The fast information may include configuration information of a broadcast stream transmitted through the transport frame, simple broadcast service information, and component information. The broadcast reception device 100 may scan a broadcast service based on the FIC part. Specifically, the broadcast reception device 100 may extract information about a broadcast service from the FIC part. The fast information may be referred to as link layer signaling. The broadcast reception device 100 may acquire broadcast service information and component information by parsing only the link layer, without parsing an application layer.

It has been described that the media content presentation information is capable of signaling a media component included in a broadcast service and a media component associated with the broadcast service. In order for the media content presentation information to signal information about a hybrid broadcast service, it is necessary to change the format of an existing media content presentation information. In particular, it is necessary to expand the content presentation information of MPEG-DASH. Details will be described below with reference to the following figures.

Facilitating presentation synchronization of each segment by adding a new element to an MPD will be described with reference to FIGS. 84 to 87. FIG. 84 illustrates an element indicating a reference time of a presentation start time of each segment of MPEG-DASH in an MPD.

The MPD may include an element indicating a reference time of a presentation start time of each segment. Also, when the form of the media content is a dynamic form, the MPD may include an element indicating a reference time of a presentation start time of each segment. In a specific embodiment, an element indicating a presentation start time of each segment is referred to as presentationStartTime. In this case, the value of the presentationStartTime may be represented as a wall clock time. Also, the value of the presentationStartTime may be represented as a UTC time.

FIG. 85 illustrates a relationship between an element indicating a reference time of a presentation start time of each segment of MPEG-DASH in an MPD and a presentation start time of each segment.

The presentation start time of a segment which is signaled by the MPD may be acquired based on at least one of MPD@presentationStartTime, a start time of a period, and the sum of presentation lengths of previous segments.

When the MPD includes MPD@suggestedPresentationDelay and SgementBase@presentationTimeOffset, the presentation start time of a segment which is signaled by the MPD may be acquired based on at least one of MPD@presentationStartTime, MPD@suggestedPresentationDelay, a start time of a period, SgementBase@presentationTimeOffset, and the presentation lengths of previous segments. In this case, the MPD@suggestedPresentationDelay represents a fixed offset value used to acquire the presentation start times of access units of media content. Also, the SgementBase@presentationTimeOffset represents an offset time between presentation start times of segments based on a start time of a period. Specifically, the SgementBase@presentationTimeOffset represents an offset time which is to be subtracted from a start time of a period in order to acquire a presentation start time.

Specifically, the relative presentation start time based on a reference time of a presentation start time of a segment may be equal to a value calculated by adding the presentation length of previous segments prior to the segment to the value of MPD@presentationStartTime. A presentation length of previous segments may be acquired based on the SegmentTimeline@d and SegmentTimeline@timescale.

Specifically, the relative presentation start time based on a reference time of the presentation start time of an i-th segment of the period may be calculated by the following equation.

$$\text{relative start time of segment}[i] = \sum_{k=0}^{i-1} \text{duration of segment}[k]$$

Here, segment[i] denotes an i-th segment in a corresponding period.

The presentation start time of each a segment which is signaled by the MPD may be a value calculated by adding the MPD@presentationStartTime, a start time of a corresponding period, and a relative presentation start time of a segment. The start time of the corresponding period may be acquired based on the Period@start of the MPD.

When the MPD includes the MPD@suggestedPresentationDelay and the SgementBase@presentationTimeOffset, the presentation start time of each segment signaled by the MPD may be a time calculated by adding the MPD@suggestedPresentationDelay to the sum of the MPD@presentationStartTime, a start time of a period, and a relative presentation start time of a segment, and subtracting the value of (SegmentBase@presentationTimeOffset* SegmentBase@timeScale). The presentation start time of a segment may be acquired by using the following equation.

presentation time of segment[i]=relative start time of
segment[i]+start time of Period+
MPD@suggestedPresentationDelay−
(SegmentBase@presentationTimeOffset*
SegmentBase@timeScale)

FIG. 85 illustrates a presentation start time of a second segment which is calculated by using the above equation. It is noted that the embodiment of FIG. 85 corresponds to a case where the MPD does not include SegmentBase@presentationTimeOffset.

FIG. 86 is a flowchart of an operation of adding and transmitting, by a broadcast transmission device, an element indicating a reference time of a presentation start time of each segment of MPEG-DASH to media content presentation information.

The broadcast transmission device 10 acquires a reference time for presentation start of a segment (S2251). The broadcast transmission device 10 acquires the reference time for presentation start of a segment through the control unit. Specifically, the broadcast transmission device 19 may acquire the reference time for presentation start of a segment by using the equation as described with reference to FIG. 86.

The broadcast transmission device 10 inserts a media content presentation information transmission method (S2253). The broadcast transmission device 10 inserts a reference time for presentation start of a segment to the MPD. The broadcast transmission device 10 inserts a reference time for presentation start of a segment to the MPD through the control unit.

The broadcast transmission device 10 transmits media content presentation information (S2255). The broadcast transmission device 10 may transmit the MPD. The broadcast transmission device 10 may transmit the MPD through the transmitting unit. In this case, the broadcast transmission device 10 may transmit the MPD through the various methods described above.

FIG. 87 is a flowchart of an operation of acquiring, by a broadcast reception device, a presentation start time of each segment according to an element indicating a reference time of a presentation start time of each segment of MPEG-DASH in an MPD.

The broadcast reception device 100 receives media content presentation information (S2301). The broadcast reception device 100 may receive the MPD. The broadcast reception device 100 receives the MPD through the IP transmitting/receiving unit 130. Specifically, the MPD may be received through the various operating methods described above.

The broadcast reception device 100 acquires a reference time of a segment presentation start time based on the media content presentation information (S2303). The broadcast reception device 100 may acquire a reference time of a segment presentation start time based on the MPD. Specifically, the broadcast reception device 100 may acquire a reference time of a segment presentation start time based on the MPD through the control unit 150. Specifically, the broadcast reception device 100 acquires a value of MPD@presentationStartTime.

The broadcast reception device 100 acquires a relative presentation start time of a segment (S2305). The broadcast reception device 100 may acquire the relative presentation start time of a segment through the control unit 150. In this case, the relative presentation start time of a segment may be determined based on a reference time of a presentation start time of a segment, which is indicated by the MPD@presentationStartTime. The relative presentation start time of a segment may be acquired through the equation described above.

The broadcast reception device 100 may acquire a start time of a period (S2307). The broadcast reception device 100 may acquire a start time of a period through the control unit 150.

The broadcast reception device 100 acquires a presentation start time of a segment based on the sum of the reference time of a presentation start time, the relative presentation start time of a segment and the start time of a period (S2309). The broadcast reception device 100 may acquire a presentation start time of a segment based on the sum of the reference time of a presentation start time, the relative presentation start time of a segment and the start time of a period through the control unit 150. In a specific embodiment, when there is the MPD@suggestedPresentationDelay, the broadcast reception device 100 may acquire a presentation start time of a segment by adding the MPD@suggestedPresentationDelay and the sum of the reference time of a presentation start time, the relative presentation start time of a segment, and the start time of a period. Also, when there is the SegmentBase@presentationTimeOffset, the broadcast reception device 100 may acquire a presentation start time of a segment by subtracting a value of the SegmentBase@presentationTimeOffset from the sum of the reference time of a presentation start time, the relative presentation start time of a segment, and the start time of a period. In a specific embodiment, the broadcast reception device 100 may acquire a presentation start time of a segment through the equation which is described with reference to FIG. 85.

The broadcast reception device 100 presents media content included in the segment based on the presentation start time of the segment (S2311). Specifically, the broadcast reception device 100 may present media content included in the segment based on the presentation start time of the segment through the control unit 150.

The hybrid broadcast service may interwork with a portable phone or a tablet PC capable of interworking with the broadcast reception device 100, in addition to the broadcast reception device 100. Such a portable phone or tablet PC may be referred to as a second screen device or companion device. In order for the media content presentation information to signal a broadcast service supporting interworking with the second screen device, the media content presentation information Also, the media components of an existing broadcast service are processed and signaled in the same manner, regardless of the pieces of content thereof. It is noted that, in the case of the hybrid broadcast service, an adaptive streaming service for transmitting media components of different qualities depending on a communication environment. Therefore, the user may select and watch one of media components of various qualities including the same content depending on a communication environment. Also, there is provided a multi view service in which a plurality of media components are simultaneously displayed on one screen. This enables the user to watch a plurality of pictures or data broadcasts through one screen. For example, the user can watch a baseball game while watching another baseball game in another baseball ground through a picture in picture (PIP) screen. As described above, as various broadcast services each including a plurality of media components has increased, the broadcast transmission device 10 and the broadcast reception device 100 are required to specialize and process the types of components and the broadcast transmission device 10 is required to signal relationships between the media components systematically. Details will be described below with reference to FIGS. 88 to 90.

FIG. 88 illustrates attributes which a presentable component can have.

First, terms defining types of media components will be described. A continuous component is a component which is presented on continuous streams. The presentable component represents a continuous component which is actually presented in the broadcast reception device 100. An audio component, a video component, and a subtitle component may be a presentable component.

The presentable component may include at least one of targeting/personalization properties, content advisory rating, content/service protection properties, target devices and associated components as attributes.

The targeting/personalization properties may represent characteristics of a viewer targeted by a corresponding presentable component. Details will be described below with reference to FIGS. 91 to 93.

The content advisory rating may represent a recommended age of a viewer who can watch the presentable component.

The content/service protection properties may represent whether a corresponding media component is protected.

The target device may represent the type of a device which is targeted by a corresponding media component. In this case, the target device may represent at least one of all devices, a primary screen, a companion screen connected to and interworking with the primary screen, and an insert screen as a part of the primary screen. In this case, the primary screen may be a screen of a device which directly receives and presets a broadcast signal. Also, the target device attribute may be referred to as a target screen attribute. Details will be described below with reference to FIGS. 89 to 90.

An associated component may represent a media component associated with the corresponding media component. Specifically, the associated component may represent a media component which can be presented along therewith. For example, the corresponding media component is a video presentable component, the associated media component may present a subtitle presentable component corresponding to an image included in a corresponding video component. Also, the associated component may present a component which can be replaced with the corresponding component. For example, when the corresponding component is an audio presentable component including an English speech, the associated component may be an audio presentable component including a Chinese speech having the same content as the corresponding audio presentable component.

FIG. 89 illustrates an element for indicating a target screen of each adaptation and representation.

The element for indicating the target screen may include, as attributes, an identifier for identifying a schema that is a data type for indicating an element. Also, the element for representing the target screen may include, as attributes, a value indicating the type of a corresponding target screen. In this case, the value indicating the type of the corresponding target device may represent at least one of all devices, a primary screen, a companion screen connected to and interworking with the primary screen, and an insert screen as a part of the primary screen. Also, the element for representing the target screen may, as attributes, an identifier for identifying an associated target screen. Specifically, the associated target screen may be a device which is targeted by the corresponding media component.

The element for representing the target screen may be referred to as TargetScreen as in the specific embodiment of FIG. 89. Also, the identifier for identifying a schema that is a data type for indicating an element, may be referred to as schemeIdUri. Also, the value for indicating the type of the corresponding target screen may be referred to as value. Also the identifier for representing the associated target screen may be referred to as Id.

In a specific embodiment as in the embodiment of FIG. 90, the value for representing the type of the corresponding target screen is 0x00, it is indicated that the corresponding target screen is one of all devices. Also, the value for representing the type of the corresponding target screen is 0x01, it is indicated that the corresponding target screen is the primary screen. Also, the value for representing the type of the corresponding target screen is 0x02, it is indicated that the corresponding target screen is the companion screen. Also, the value for representing the type of the corresponding target screen is 0x03, it is indicated that the corresponding target screen is the insert screen as a part of the primary screen.

A targeting property will be described with reference to FIGS. 91 to 93.

FIG. 91 illustrates a targeting property with the form of an XML element when an MPD includes the targeting property. FIG. 92 illustrates a relationship between the targeting property and child properties which the targeting property includes.

The element for representing the targeting property may include, as attributes, an identifier for identifying a schema that is a data type for indicating an element. Also, the element for representing the targeting property may include a value indicating the type of a corresponding targeting property. Also, the element for representing the targeting property may include an identifier indicating an associated targeting criterion. In this case, the associated targeting criterion may provide a criterion for identifying a viewer targeted by the targeting property.

In a specific embodiment as in FIG. 92, the identifier for identifying a schema that is a data type for indicating an element, may be referred to as schemeIdUri. Also, a value indicating the type of a corresponding targeting property may be referred to as value. Also, an identifier for representing an associated targeting criterion may be referred to as Id.

FIG. 93 illustrates a relationship between a targeting property and child elements which the targeting property includes.

The targeting property may include an element indicating a targeting criterion as a child element. As described above, the targeting criterion may provide a criterion for identifying a viewer targeted by the targeting property. Also, the element for representing the targeting criterion may include, as attributes, an identifier for identifying the targeting criterion. Also, the element for representing the targeting criterion may include an attribute for representing the type of the targeting criterion. In this case, the attribute for representing the type of the targeting criterion may specifically indicate the data type of a value indicating a viewer targeted according to the targeting criterion. Specifically, the attribute for representing the type of the targeting criterion may indicate that the data type of a value indicating a viewer targeted according to the targeting criterion corresponds to one of an integer, a binary, a form selecting one of a plurality of selection items, and a character string. Also, the element for indicating the targeting criterion may include, as an attribute, a value indicating a viewer targeted according to the targeting criterion.

In a specific embodiment as in FIG. 93, an attribute indicating an identifier for identifying a targeting criterion may be referred to as id. Also, an attribute indicating the type of the targeting criterion may be referred to as CriterionType. Also, a value indicating a viewer targeted according to the targeting criterion may be referred to as CriterionValue.

The MPD may include the above-described attributes as common attributes. Also, the MPD may include the above-described attributes as attributes of an adaptation set. Also, the MPD may include the above-described attributes as attributes of a representation. Details will be described below with reference to FIGS. 94 to 98.

FIG. 94 illustrates a syntax of an MPD when the MPD includes an element indicating as a presentable component, an element indicating an associated media component, an element indicating a targeting property, and an element indicating a target screen as a common element. FIG. 95 illustrates a syntax of an MPD with an XML format when the MPD includes an element indicating as a presentable component, an element indicating an associated media component, an element indicating a targeting property, and an element indicating a target screen as a common element.

The MPD may include at least one of the element indicating as a presentable component, the element indicating an associated media component, the element indicating a targeting property, and the element indicating a target screen, as a common element.

The broadcast reception device 100 may present a media component based on the element indicating as a presentable component. Specifically, the broadcast reception device 100 may determine whether a corresponding media component is a presentable media component. When the corresponding media component is a presentable media component, the broadcast reception device 100 may present the corresponding media component.

Also, the broadcast reception device 100 may present the media component based on the element indicating an associated media component. Specifically, the broadcast reception device 100 may identify a media component associated with the corresponding media component based on the element indicating an associated media component. Also, the broadcast reception device 100 may present the media component associated with the corresponding media component together.

The broadcast reception device 100 may present the media component based on the element indicating a targeting property. Specifically, the broadcast reception device 100 may determine a viewer targeted by the corresponding media component based on the element indicating a targeting property. Also, the broadcast reception device 100 may determine whether to present the corresponding media component based on a result of the determination. For example, the broadcast reception device 100 may compare information indicated by the element indicating a targeting property with user information and when the information indicated by the element indicating a targeting property is identical to the user information, may present the corresponding media component. Also, the broadcast reception device 100 may compare the information indicated by the element indicating a targeting property with the user information and when the information indicated by the element indicating a targeting property is not identical to the user information, may not present the corresponding media component. Specifically, when a position of the broadcast reception device 100 or an address of a user is included in a region indicated by the targeting property, the broadcast reception device 100 may present the corresponding media component.

Also, the broadcast reception device 100 may present the media component based on the element indicating a target screen. Specifically, the broadcast reception device 100 may determine a device targeted by the corresponding media component based on the element indicating a target screen. Also, the broadcast reception device 100 may determine whether to present the corresponding media component based on a result of the determination. For example, the broadcast reception device 100 may compare information indicated by the element indicating a target screen with information of the broadcast reception device 100 and when the information indicated by the element indicating a target screen is identical to the information of the broadcast reception device 100, may present the corresponding media component. Also, the broadcast reception device 100 may compare information indicated by the element indicating a target screen with information of the broadcast reception device 100 and when the information indicated by the element indicating a target screen is not identical to the information of the broadcast reception device 100, may not present the corresponding media component. Specifically, when the broadcast reception device 100 is a companion device and the element indicating the target screen represents a companion device, the broadcast reception device 100 may present the corresponding media component.

FIG. 96 illustrates a relationship with another representation element when an MPD includes an element indicating as a presentable component, an element indicating an associated media component, an element indicating a targeting property, and an element indicating a target screen, as a representation element. FIG. 97 illustrates a syntax of an MPD when the MPD includes an element indicating as a presentable component, an element indicating an associated media component, an element indicating a targeting property, and an element indicating a target screen, as an adaptation set or representation element. FIG. 98 illustrates an MPD with an XML format when the MPD includes an element indicating as a presentable component, an element indicating an associated media component, an element indicating a targeting property, and an element indicating a target screen, as an adaptation set or representation element.

The MPD may include at least one of the element indicating as a presentable component, the element indicating an associated media component, the element indicating a targeting property, and the element indicating a target screen, as an adaptation set element. The MPD may include at least one of the element indicating as a presentable component, the element indicating an associated media component, the element indicating a targeting property, and the element indicating a target screen, as a representation element.

As described above, the broadcast reception device 100 may present a media component based on the element indicating as a presentable component.

Also, the broadcast reception device 100 may present the media component based on the element indicating an associated media component.

The broadcast reception device 100 may present the media component based on the element indicating a targeting property. Also, the broadcast reception device 100 may present the media component based on the element indicating a target screen.

FIG. 99 illustrates an operation of a broadcast transmission device for transmitting media content presentation information including attributes of a media component.

The broadcast transmission device 10 acquires attributes of a media component (S2351). Specifically, the broadcast transmission device 10 may acquire attributes of a media component through the control unit. Also, the broadcast transmission device 10 may acquire at least one of an attribute indicating whether a media component is a presentable component, an attribute indicating an associated media component, a targeting property of the media component, and a target screen attribute of the media component.

The broadcast reception device 100 inserts the attributes of the media component into the media content presentation information (S2353). The broadcast reception device 100 may insert the attributes of the media component into an MPD. Specifically, the broadcast transmission device 10 may insert the attributes of the media component into the MPD through the control unit. In a specific embodiment, the broadcast transmission device 10 may insert the attributes of the media component into the MPD as common elements. Also, the broadcast transmission device 10 may insert the attributes of the media component into the MPD as adaptation set elements. Also, the broadcast transmission device 10 may insert the attributes of the media component into the MPD as representation elements.

The broadcast transmission device 10 transmits media content presentation information (S2355). The broadcast transmission device 10 may transmit the MPD. The broadcast transmission device 10 may transmit the MPD through the transmitting unit. The broadcast transmission device 10 transmits the MPD (S2355). The MPD may be transmitted through the various methods described above.

FIG. 100 illustrates an operation of a broadcast reception device based on attributes of a media component included in media content presentation information.

The broadcast reception device 100 receives media content presentation information (S2401). The reception device 100 may receive the MPD. Specifically, the broadcast reception device 100 receives the MPD through the broadcast receiving unit 110. Also, the broadcast reception device 100 may receive the MPD through the IP transmitting/receiving unit 130. The broadcast reception device 100 may receive the MPD through the various methods described above.

The broadcast reception device 100 acquires the attributes of the media component based on the media content presentation information (S2403). The broadcast reception device 100 may acquire the attributes of the media component based on the MPD. Specifically, the broadcast reception device 100 may acquire the attributes of the media component based on the MPD through the control unit 150. Specifically, the broadcast reception device 100 may acquire the attributes of the media component from the MPD. In a specific embodiment, the broadcast reception device 100 may acquire at least one of an attribute indicating whether a media component is a presentable component, an attribute indicating an associated media component, a targeting property of the media component, and a target screen attribute of the media component. In a specific embodiment, the broadcast reception device 100 may acquire the attributes of the media component from the common elements of the MPD. Also, the broadcast reception device 100 may acquire the attributes of the media component from the adaptation set elements of the MPD. Also, the broadcast reception device 100 may acquire the attributes of the media component from the representation elements of the MPD.

The broadcast reception device 100 presents the media component based on the attributes of the media component (S2405). Specifically, the broadcast reception device 100 may present the media component based on the attributes of the media component through the control unit 150. In a specific embodiment, the broadcast reception device 100 may present the media component based on the element indicating whether the media component is a presentable component. Specifically, the broadcast reception device 100 may determine whether a corresponding media component is a presentable media component. When the corresponding media component is a presentable media component, the broadcast reception device 100 may present the corresponding media component.

Also, the broadcast reception device 100 may present the media component based on the element indicating an associated media component. Specifically, the broadcast reception device 100 may identify a media component associated with the corresponding media component based on the element indicating an associated media component. Also, the broadcast reception device 100 may present the media component associated with the corresponding media component together.

The broadcast reception device 100 may present the media component based on the element indicating a targeting property. Specifically, the broadcast reception device 100 may determine a viewer targeted by the corresponding media component based on the element indicating a targeting property. Also, the broadcast reception device 100 may determine whether to present the corresponding media component based on a result of the determination. For example, the broadcast reception device 100 may compare information indicated by the element indicating a targeting property with user information and when the information indicated by the element indicating a targeting property is identical to the user information, may present the corresponding media component. Also, the broadcast reception device 100 may compare the information indicated by the element indicating a targeting property with the user information and when the information indicated by the element indicating a targeting property is not identical to the user information, may not present the corresponding media component. Specifically, when a position of the broadcast reception device 100 or an address of a user is included in a region indicated by the targeting property, the broadcast reception device 100 may present the corresponding media component.

Also, the broadcast reception device 100 may present the media component based on the element indicating a target screen. Specifically, the broadcast reception device 100 may determine a device targeted by the corresponding media component based on the element indicating a target screen. Also, the broadcast reception device 100 may determine whether to present the corresponding media component based on a result of the determination. For example, the broadcast reception device 100 may compare information indicated by the element indicating a target screen with information of the broadcasting device 100 and when the information indicated by the element indicating a target screen is identical to the information of the broadcasting device 100, may present the corresponding media component. Also, the broadcast reception device 100 may compare information indicated by the element indicating a target screen with information of the broadcasting device 100 and when the information indicated by the element indicating a target screen is not identical to the information of the broadcasting device 100, may not present the corresponding media component. Specifically, when the broadcast reception device 100 is a companion device and the element indicating the target screen represents a companion device, the broadcast reception device 100 may present the corresponding media component.

As described above, one scene may be configured by presenting a plurality of media components. Specifically, one scene may be configured by presenting a plurality of video components. Also, the MPD is signaling a plurality of replaceable media components through a plurality of representations included in an adaptation set. However, the MPD cannot signal a case where one scene is configured by combining a plurality of media components. Therefore, it is necessary for the media content presentation information to signal a relationship between the plurality of media components. Details will be described below with reference to FIGS. 101 to 109.

FIG. 101 illustrates definition of a continuous component and a composite component for a hybrid broadcast service.

As described above, the continuous component is a component which is presented on continuous streams. The composite component is a collection of a plurality of continuous components necessary to present one scene. Specifically, the composite component may be a collection of continuous components which have the same media type, represent the same scene, and are to be combined in some combination to produce a presentation. Therefore, the composite component may be a collection of a plurality of media components representing one scene in such a way that the plurality of media components are combined. For example, the composite component may be music, dialog and effects, which are necessary to give complete audio. Also, the composite component may be a right picture and a left picture of a three-dimensional (3D) view necessary to produce 3D pictures FIG. 102 illustrates an XML element form of an element capable of representing a composite component. Attributes and child elements included in the composite component will be described with reference to FIGS. 103 to 108.

FIG. 103 illustrates a relationship between attributes included in a composite component element and child elements.

The composite component element may include a contains attribute indicating at least one of an adaptation set and a representation included in the composite component. Specifically, the contains attribute indicating at least one of the adaptation set and the representation included in the composite component may represent at least one of an identifier for identifying an adaptation set included in the composite component and an identifier for identifying representation included in the composite component. For example, the contains attribute indicating at least one of the adaptation set and the representation included in the composite component may include the @id of the adaptation set included in the composite component. Also, for example, the contains attribute indicating at least one of the adaptation set and the representation included in the composite component may include the @id of the representation included in the composite component.

The composite component element may include an identifier for identifying the composite component as an attribute.

The composite component element may include a presentable attribute indicating whether the composite component is presentable. As described above, the broadcast reception device 100 may present the composite component based on the presentable attribute. Specifically, the broadcast reception device 100 may present the composite component when the composite component is a presentable component.

The composite component element may include an associated attribute indicating an associated adaptation set or representation. The associated attribute may indicate an identifier for identifying an adaptation set associated with the composite component. Also, the associated attribute may indicate an identifier for identifying a representation associated with the composite component. For example, the associated attribute may indicate the @id of the adaptation set associated with the composite component. Also, the associated attribute may indicate the @id of the representation associated with the composite component. In this case, the representation or adaptation set associated with the composite component may represent a representation or adaptation set belonging to the same program. Also, the representation or adaptation set associated with the composite component may represent a representation or adaptation set which is capable of replacing the composite component.

The composite component element may include an element indicating a targeting property. The targeting property element may indicate characteristics of a viewer targeted by a corresponding composite component. The broadcast reception device 100 may present the composite component based on the targeting property element. Specifically, the broadcast reception device 100 may determine a viewer targeted by the composite component based on the element indicating a targeting property. Also, the broadcast reception device 100 may determine whether to present a corresponding composite component based on a result of the determination. For example, the broadcast reception device 100 may compare information indicated by the element indicating a targeting property with user information and when the information indicated by the element indicating a targeting property is identical to the user information, may present the corresponding composite component. Also, the broadcast reception device 100 may compare the information indicated by the element indicating a targeting property with the user information and when the information indicated by the element indicating a targeting property is not identical to the user information, may not present the corresponding composite component.

Specifically, when a position of the broadcast reception device 100 or an address of a user is included in a region indicated by the targeting property, the broadcast reception device 100 may present the corresponding composite component.

The composite component element may include a recommended content rating element indicating a recommended content rating. As described above, the recommended content rating element may represent a recommended age of a viewer who can watch the composite component. The broadcast reception device 100 may present the composite component based on the recommended content rating element indicating a recommended content rating. Specifically, the broadcast reception device 100 may present the composite component when a rating indicated by the recommended content rating element is equal to or lower than an age set by the broadcast reception device 100.

The composite component element may include a target screen element indicating a target screen. The target screen element may indicate the type of a device which is targeted by a corresponding composite component. In this case, the target screen element may represent at least one of all devices, a primary screen, a companion screen, and an insert screen as a part of the primary screen. In a specific embodiment, as described above, the broadcast reception device 100 may present the composite component based on the target screen element. Specifically, the broadcast reception device 100 may determine a device targeted by a corresponding composite component based on the element indicating a target screen. Also, the broadcast reception device 100 may determine whether to present a corresponding composite component based on a result of the determination. For example, the broadcast reception device 100 may compare information indicated by the element indicating a target screen with information of the broadcasting device 100 and when the information indicated by the element indicating a target screen is identical to the information of the broadcasting device 100, may present the corresponding composite component. Also, the broadcast reception device 100 may compare information indicated by the element indicating a target screen with information of the broadcasting device 100 and when the information indicated by the element indicating a target screen is not identical to the information of the broadcasting device 100, may not present the corresponding composite component. Specifically, when the broadcast reception device 100 is a companion device and the element indicating the target screen represents a companion device, the broadcast reception device 100 may present the corresponding composite component.

In a specific embodiment as in FIG. 103, the contains attribute may be referred to as contains. Also, the presentable attribute may be referred to as presentable. Also, the identifier for identifying the composite component may be referred to as id. Also, the element for indicating a targeting property may be referred to as TargetingProperty. Also, the recommended content rating element may be referred to as AtscRating. Also, the target screen element may be referred to as TargetScreen element.

FIG. 104 illustrates an XML format of a composite component element when the composite component element includes a child element. FIG. 105 illustrates a relationship between a composite component element and child elements and attributes included in the child elements.

The recommended rating element may include, as attributes, an identifier for identifying schema that is a data type for indicating an element. Also, the recommended content rating element may include an identifier for identifying a reference of a corresponding recommended content rating, as an attribute. Also, the recommended content rating element may include a value indicating a recommended content rating of a corresponding composite component, as an attribute.

In a specific embodiment as in FIG. 105, the identifier for identifying a schema that is a data type for indicating an element may be referred to as schemeIdUri. Also, the value indicating a recommended content rating of a corresponding composite component may be referred to as value. Also, the identifier for identifying a reference of a corresponding recommended content rating may be referred to as Id.

The identifier for identifying a schema that is a data type for indicating an element. Also, the target screen element may include, as an attribute, a value indicating the type of a corresponding target screen. In this case, the value indicating the type of the corresponding target device may represent at least one of all devices, a primary screen, a companion screen, and an insert screen as a part of the primary screen. Also, the target screen element may include, as an attribute, an identifier for identifying an associated target screen. Specifically, the associated target screen may be a device which is targeted by the corresponding composite component.

In a specific embodiment as in FIG. 105, the identifier for identifying a schema that is a data type for indicating an element may be referred to as schemeIdUri. Also, the value for indicating the type of the corresponding target screen may be referred to as value. Also the identifier for representing the associated target screen may be referred to as Id.

FIG. 106 illustrates an XML format when an MPD includes a composite element as a common element. FIG. 107 illustrates an XML format when an MPD includes a composite element as an adaptation element or a representation element.

The MPD may include a composite component element as a common element. The MPD may include a composite component element as an adaptation set element. The MPD may include a composite component element as a representation element.

FIG. 108 is a flowchart of an operation of transmitting, by a broadcast transmission device, an MPD including a composite component element.

The broadcast transmission device 10 acquires elements of a composite component (S2451). Specifically, the broadcast transmission device 10 may acquire the elements of the composite component through the control unit. In a specific embodiment, the broadcast transmission device 10 may acquire at least one of a contains attribute for indicating at least one of an adaptation set and a representation included in the composite component, an identifier for identifying the composite component, a presentable attribute for indicating whether the composite component is representable, an associated attribute for indicating an adaptation set and a representation associated with the composite component, a recommended content rating element for indicating a recommended content rating, and a target screen element for indicating a target screen.

The broadcast reception device 100 inserts the elements of the composite component into the media content presentation information (S3453). The broadcast reception device 100 may insert the attributes of the media component into an MPD. Specifically, the broadcast transmission device 10 may insert the elements of the composite component into the MPD. In a specific embodiment, the broadcast transmission device 10 may insert the elements of the composite component into the MPD as common elements. Also, the broadcast transmission device 10 may insert the elements of the composite component into the MPD as adaptation set elements. Also, the broadcast transmission device 10 may insert the elements of the composite component into the MPD as representation elements.

The broadcast transmission device 10 transmits media content presentation information (S2455). The broadcast transmission device 10 may transmit the MPD. The broadcast transmission device 10 may transmit the MPD through the transmitting unit. The broadcast transmission device 10 transmits the MPD (S2355). The MPD may be transmitted through the various methods described above.

FIG. 109 is a flowchart of an operation of a broadcast reception device based on a composite component element included in media content presentation information.

The broadcast reception device 100 receives media content presentation information (S2501). The broadcast reception device 100 may receive the MPD. Specifically, the broadcast reception device 100 receives the MPD through the broadcast receiving unit 110. Also, the broadcast reception device 100 may receive the MPD through the IP transmitting/receiving unit 130. The broadcast reception device 100 may receive the MPD through the various methods described above.

The broadcast reception device 100 acquires the composite component element based on the media content presentation information (S2503). The broadcast reception device 100 may acquire the composite component element based on the MPD. Specifically, the broadcast reception device 100 may acquire the composite component element based on the MPD through the control unit 150. Specifically, the broadcast reception device 100 may acquire the composite component element from the MPD. In a specific embodiment, the broadcast reception device 100 may acquire at least one of a contains attribute for indicating at least one of an adaptation set and a representation included in the composite component, an identifier for identifying the composite component, a presentable attribute for indicating whether the composite component is representable, an associated attribute for indicating an adaptation set and a representation associated with the composite component, an element for indicating a targeting property, a recommended content rating element for indicating a recommended content rating, and a target screen element for indicating a target screen. In a specific embodiment, the broadcast reception device 100 may acquire the elements of the composite component from the common elements of the MPD. Also, the broadcast reception device 100 may acquire the elements of the composite component from the adaptation set elements of the MPD. Also, the broadcast reception device 100 may acquire the elements of the composite component from the representation elements of the MPD.

The broadcast reception device 100 presents a media component based on the elements of the composite component (S2505). Specifically, the broadcast reception device 100 may present the media component based on the elements of the composite component through the control unit 150. The broadcast reception device 100 may present the composite component based on at least one of a contains attribute for indicating at least one of an adaptation set and a representation included in the composite component, an identifier for identifying the composite component, a presentable attribute for indicating whether the composite component is representable, an associated attribute for indicating an adaptation set and a representation associated with the composite component, an element for indicating a targeting property, a recommended content rating element for indicating a recommended content rating, and a target screen element for indicating a target screen.

Specifically, the broadcast reception device 100 may acquire a media component included in the composite component based on the contains attribute and present the composite component.

Also, the broadcast reception device 100 may present the composite component based on the presentable attribute. Specifically, the broadcast reception device 100 may determine whether a corresponding media component is a presentable composite component. When the corresponding composite component is presentable, the broadcast reception device 100 may present the corresponding composite component.

Also, the broadcast reception device 100 may present the composite component based on the associated attribute. Specifically, the broadcast reception device 100 may identify a media component associated with the corresponding media component based on the associated attribute. Also, when the corresponding composite component is not presentable, the broadcast reception device 100 may present the associated media component.

The broadcast reception device 100 may present the composite component based on the targeting property element. Specifically, the broadcast reception device 100 may determine a viewer targeted by the composite component based on the targeting element. Also, the broadcast reception device 100 may determine whether to present the corresponding composite component based on a result of the determination. For example, the broadcast reception device 100 may compare information indicated by the targeting property element indicating a targeting property with user information and when the information indicated by the targeting property element indicating a targeting property is identical to the user information, may present the corresponding composite component. Also, the broadcast reception device 100 may compare the information indicated by the targeting property element with the user information and when the information indicated by the targeting property element is not identical to the user information, may not present the corresponding composite component. Specifically, when a position of the broadcast reception device 100 or an address of a user is included in a region indicated by the targeting property element, the broadcast reception device 100 may present the corresponding composite component.

Also, the broadcast reception device 100 may present the composite component based on the recommended content rating element indicating a recommended content rating. Specifically, the broadcast reception device 100 may present the composite component when a rating indicated by the recommended content rating element is equal to or lower than an age set by the broadcast reception device 100.

Also, the broadcast reception device 100 may present the composite component based on the target screen element. As described above, the broadcast reception device 100 may present a media component based on the target screen element. Specifically, the broadcast reception device 100 may determine a device targeted by the corresponding composite component based on the element indicating a target screen. Also, the broadcast reception device 100 may determine whether to present the corresponding composite component based on a result of the determination. For example, the broadcast reception device 100 may compare information indicated by the element indicating a target screen with information of the broadcasting device 100 and when the information indicated by the element indicating a target screen is identical to the information of the broadcasting device 100, may present the corresponding composite component. Also, the broadcast reception device 100 may compare information indicated by the element indicating a target screen with information of the broadcasting device 100 and when the information indicated by the element indicating a target screen is not identical to the information of the broadcasting device 100, may not present the corresponding composite component. Specifically, when the broadcast reception device 100 is a companion device and the element indicating the target screen represents a companion device, the broadcast reception device 100 may present the corresponding composite component.

The media content presentation information with an XML format is described above. The format of the media content presentation information is not limited thereto.

Although the embodiments of the present invention are described through the MPD with reference to FIGS. 84 to 109, the features of the present invention described with reference to FIGS. 84 to 109 may be applied to other media content presentation information than the MPD in the similar manner thereto.

In a hybrid broadcast service, a program may be divided into segments that are segmented time periods over which the program is aired. Also, the segment may be one of a show segment representing a time period over which primary content is broadcast and an interstitial segment representing a time period over which content other than the primary content is broadcast. Specifically, the interstitial segment may provide at least one of an advertisement picture, a public service advertisement, and a preview of another broadcast program. For example, a program providing a movie may include an interstitial segment providing an advertisement picture before the movie starts, an interstitial segment providing an advertisement picture during the movie, an interstitial segment providing an advertisement picture after the movie ends, a show segment providing the movie before the interstitial advertisement after the advertisement picture is provided before the movie starts and a show segment before the movie ends after the interstitial advertisement.

There are many cases where the interstitial segment includes contents which is required to be changed in real time, the interstitial segment may be changed in such a way that the content thereof is supplemented or changed unlike the show segment. Also, the broadcast reception device 100 may present one of a plurality of pieces of media content corresponding to the interstitial segments based on a personalization property or a target property. Therefore, it may be effective to perform signaling of the interstitial segment through a separate MPD different from that of the show segments.

Specifically, one program may include a show segment or show segments. Also, the signal program may include an interstitial segment or interstitial segments. One MPD may include information about all the show segments included in the one program. Also, there may be provided an individual MPD for each of the interstitial segments. Specifically, one MPD may signal information about one interstitial segment. As described above, when the interstitial segments are signaled by individual MPDs, this makes it easy for the broadcast reception device 100 to present content targeted to the interstitial segments according to the personalization property and the targeting property of the viewer. Also, it becomes easy for a broadcast operator to change media content corresponding to interstitial segments of a broadcast program during a broadcast service. Also, when a plurality of MPDs are used as described above, the broadcast transmission device 10 may signal change of the MPD before the MPD to be referred to by the broadcast reception device 100 is changed. Also, the broadcast transmission device 10 may change and transmit the MPD.

Specific operations of the broadcast transmission device 10 and the broadcast reception device 100 will be described with reference to FIGS. 110 and 111.

FIG. 110 illustrates an operation of exchanging and transmitting, by the broadcast transmission device 10 media content presentation information during transmission of a broadcast signal.

The broadcast transmission device 10 acquires information about a plurality of segments whom a program includes (S2551). Specifically, the broadcast transmission device 10 acquires information about show segments and interstitial segments whom a program includes.

The broadcast transmission device 10 generates media content presentation information about the show segments whom the program includes (S2553). Specifically, the broadcast transmission device 10 may generate media content presentation information about all the show segments whom the program includes.

The broadcast transmission device 10 generates media content presentation information about the interstitial segments whom the program includes (S2555). Specifically, the broadcast transmission device 10 may generate one piece of media content for each of the interstitial segments. In this way, when the media content for each of the interstitial segments is changed, the broadcast reception device 100 may change each piece of media content presentation information and apply the changed media content presentation information to a broadcast service. Therefore, the broadcast reception device 100 may efficiently perform change of the media content for the interstitial segments.

The broadcast transmission device 10 transmits the media content presentation information generated through a broadcast signal (S2557). Specifically, the broadcast reception device 100 may transmit the media content presentation information through the various methods described above.

Also, before a time at which the media content presentation information is to be changed is reached, the broadcast transmission device 10 may change and transmit the media content presentation information. In a specific embodiment, the broadcast transmission device 10 may change from the media content presentation information about the show segments to the media content presentation information about the interstitial segments and transmit it before the show segments are changed to the interstitial segments. For example, the broadcast transmission device 10 may change from the media content presentation information for content of a movie to the media content presentation information about an interstitial advertisement and transmit it five minutes before changing to the interstitial advertisement is performed during transmission of a program for the movie. Also, before a time at which the media content presentation information is to be changed is reached, the broadcast transmission device 10 may signal that the media content presentation information is required to be changed. In a specific embodiment, the broadcast transmission device 10 may signal that it is required to change the media content presentation information about the show segments to the media content presentation information about the interstitial segments before the show segments are changed to the interstitial segments. For example, the broadcast transmission device 10 may signal that it is required to receive the media content presentation information about an interstitial advertisement instead of the media content presentation information for content of a movie five minutes before changing to the interstitial advertisement is performed during transmission of a program for the movie.

FIG. 111 illustrates an operation of changing and receiving, by the broadcast reception device 100, media content presentation information during reception of a broadcast signal.

The broadcast reception device 100 receives a broadcast signal.

The broadcast reception device 100 acquires changed media content presentation information based on the broadcast signal. Specifically, the broadcast reception device 100 may transmit the media content presentation information through the various methods described above.

Also, when the media content presentation information is changed before a time at which the media content presentation information is to be changed is reached, the broadcast reception device 100 may receive the changed media content presentation information. In a specific embodiment, the broadcast reception device 100 may receive the media content presentation information about the interstitial segments when the media content presentation information about the show segments is changed to the media content presentation information about the interstitial segments before the show segments are changed to the interstitial segments. For example, when the media content presentation information about content of a movie is changed to the media content presentation information about the interstitial advertisement five minutes before changing to the interstitial segments is performed during transmission of a program for the movie, the broadcast reception device 100 may receive the media content presentation information about the interstitial advertisement. Also, the broadcast reception device 100 may receive media content presentation information based on information for signaling change of the media content presentation information. Specifically, before a time at which the media content presentation information is to be changed is reached, the broadcast reception device 100 may receive the media content presentation information based on information for signaling that it is required to change the media content presentation information. In a specific embodiment, the broadcast reception device 100 may receive information for signaling that it is required that the media content presentation information about the show segments is changed to the media content presentation information about the interstitial segments before the show segments are changed to the interstitial segments. In this case, the broadcast reception device 100 may receive media content presentation information based on information for signaling change of the media content presentation information. For example, the broadcast reception device 100 may receive information for signaling that it is required to receive the media content presentation information about the interstitial advertisement instead of the media content presentation information about the content of the movie five minutes before change to the interstitial segments is performed during reception of a program for the movie. Also, the broadcast reception device 100 may receive the media content presentation information about the interstitial advertisement according to the information for signaling that it is required to receive the media content presentation information about the interstitial advertisement instead of the media content presentation information about the content of the movie.

In a specific embodiment, when there are a plurality of pieces of media content presentation information, the broadcast reception device 100 may receive any one of the plurality of pieces of media content presentation information based on user information. Specifically, the broadcast reception device 100 may compare a targeting property included in the media content presentation information with the user information of the broadcast reception device 100, and receive the media content presentation information. For example, when a region indicated by the targeting property included in the media content presentation information includes a position indicated by position information of the broadcast reception device 100, the broadcast reception device 100 may receive the media content presentation information.

The broadcast reception device 100 presents the media content according to the changed media content presentation information (S2605).

The media content presentation information of FIGS. 110 and 111 may be an MPD in a specific embodiment.

Referring to FIGS. 112 and 113, there will be described information for signaling a broadcast service for interworking with the media content presentation information in a hybrid broadcast.

FIG. 112 illustrates information for signaling a broadcast service for interworking with the media content presentation information in a hybrid broadcast.

The broadcast transmission device 10 may insert media component acquisition information signaling information to information for signaling a broadcast service and transmit the media component acquisition information signaling information. Media component acquisition information indicates information including a transport parameter for acquiring a media component included in the broadcast service. The media component acquisition information signaling information indicates information for acquiring the media component. In this case, the broadcast reception device 100 may receive the information for signaling the broadcast service and extract the media component acquisition information signaling information. Also, the broadcast reception device 100 may acquire a media component based on the extracted media component acquisition information signaling information.

The broadcast transmission device 10 may signal the media component included in one service as one piece of media content presentation information. In this case, the broadcast reception device 100 merely receives the one piece of media content presentation information in order to present the one service. Also, the media content presentation information may signal a broadcast service in the unit of a media component.

To this end, the media component acquisition information in the hybrid broadcast may include information about media content presentation information in order to interwork with the media content presentation information. Specifically, the broadcast transmission device 10 may insert information for connecting the media component included in the broadcast service with the media content presentation information to the media component acquisition information and transmit it. In a specific embodiment, the broadcast transmission device 10 may insert a representation identifier for identifying representation of an MPD corresponding to the media component included in the broadcast service to the media component acquisition information and transmit it. In this case, the broadcast transmission device 10 may transmit an identifier of a period including the representation corresponding to the media component. The broadcast reception device 100 may acquire the information for connecting the media component included in the broadcast service with the media content presentation information from the media component acquisition information and receive the media component. In a specific embodiment, the broadcast reception device 100 may acquire the representation identifier of the MPD corresponding to the media component included in the broadcast service from the media component acquisition information. Also, the broadcast reception device 100 may acquire the MPD and receive a media component corresponding to the acquired representation identifier.

Also, the broadcast transmission device 10 may insert information for identifying signaling information for signaling an application associated with a broadcast service to the information for signaling the broadcast service. Also, the broadcast transmission device 10 may insert reception information necessary to receive the signaling information for signaling an application associated with a broadcast service to the information for signaling the broadcast service and transmit it. Specifically, the broadcast transmission device 10 may insert information for receiving the information for signaling an application associated with a broadcast service to the information for signaling the broadcast service and transmit it. The information for receiving the information for signaling an application associated with a broadcast service may be a session identifier for identifying a session of a session-based transport protocol for transmitting the information for signaling an application associated with a broadcast service. For example, the information for receiving the information for signaling an application associated with a broadcast service may be a TSI for identifying an FLUTE session. In another specific embodiment, the information for receiving the information for signaling an application associated with a broadcast service may be a session identifier for identifying a packet of a packet-based transport protocol for transmitting the information for signaling an application associated with a broadcast service.

Also, as the signaling information for signaling an application associated with a broadcast service, information in which a TPT defined in the ATSC 2.0 is changed may be used. Also, in order to transmit a trigger for triggering a specific operation of the application associated with the broadcast service, the broadcast transmission device 10 may use in-band event signaling which is defined in MPEG-DASH. Also, in order to transmit a trigger, the broadcast transmission device 10 may use an event stream which is defined in MPEG-DASH.

Also, as described above, the broadcast transmission device 10 may insert information for acquiring the signaling information for signaling the media content presentation information to the information for signaling the broadcast service and transmit it. In this case, the broadcast reception device 100 may receive the information for signaling the broadcast service and extract information for acquiring the signaling information for signaling the media content presentation information. Also, the broadcast reception device 100 may acquire the media content presentation information based on the information for acquiring the signaling information for signaling the extracted media content presentation information.

Also, as described above, the broadcast transmission device 10 may insert a path through which reference time signaling information can be acquired to the information for signaling the broadcast service and transmit it. The reference time may be a time which is a reference of broadcast service representation. Also, the reference time signaling information is information for signaling a reference time. In this case, the broadcast reception device 100 may receive the information for signaling the broadcast service and extract a path through which the reference time signaling information can be acquired. The broadcast reception device 100 may acquire a reference time based on the path through the reference time signaling information can be acquired. Also, the broadcast reception device 100 may perform synchronization of the broadcast service based on the acquired reference time.

FIG. 112 illustrates information for connecting a broadcast service for hybrid broadcasts with representation of an MPD. FIG. 113 illustrates a syntax of information for signaling a broadcast service for a hybrid broadcast.

In a specific embodiment as in FIG. 112 or 113, the information for signaling a broadcast service may include at least one of service_id, Timebase_location, MPD_location, location_signaling_location and app_signaling_location.

The service_id indicates an identifier for identifying the broadcast service.

The Timebase_location indicates a path through which reference time signaling information of the broadcast service can be acquired.

The MPD_location indicates information for acquiring information for signaling the MPD.

The location_signaling_location indicates media component acquisition information signaling information. The media component acquisition information may include, as an element, at least one of representation_id, IP_address, port, and tsi, dataPipe_id.

The representation_id indicates an identifier of representation corresponding to a media component included in the broadcast service. In this case, the representation_id may include a period identifier for identifying a period including the representation.

The IP_address indicates an IP address for identifying IP datagram for transmitting a media component.

The port indicates a port number for identifying UDP datagram for transmitting a media component.

The tsi indicates an identifier for identifying a session for transmitting a media component.

The dataPipe_id indicates an identifier for identifying a session for transmitting a media component.

The app_signaling_location indicates information for acquiring information for signaling an application.

The information for signaling an application may include at least one of app_signaling_id and FLUTE delivery session.

The app_signaling_id indicates an identifier for identifying information for signaling an application associated with a broadcast service. Specifically, the app_signaling_id may be an identifier for identifying information in which the TPT described above is changed.

The FLUTE delivery session indicates information for identifying an FLUTE session for transmitting information for signaling an application associated with the broadcast service.

The above-mentioned features, structures or effects are included in at least one embodiment, but are not necessarily limited to only one embodiment. Furthermore, the features, structures or effects of each embodiment may be combined or changed by those skilled in the art so as to be implemented for other embodiments. Therefore, such combination or modification should be construed as falling within the scope of the present disclosure.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An operating method of a broadcast reception device, the method comprising:
receiving a broadcast signal including components of a service in Dynamic Adaptive Streaming over HTTP (DASH) format, a first signaling table for the service, and a second signaling table providing mapping between the service components and DASH representations found in a Media Presentation Description (MPD), wherein the second signaling table is different from the MPD,
the first signaling table including a service identifier identifying the service and location information to obtain the second signaling table and the MPD, and
the second signaling table including a transport session id representing a transport session carrying one or more components and a DASH representation id representing each DASH representation corresponding to the one or more components carried in the transport session;
obtaining the first signaling table from the broadcast signal;
obtaining the second signaling table and the MPD based on the first signaling table; and
presenting media content based on the second signaling table and the MPD,
wherein the MPD is transmitted in the broadcast signal or in a network which is different from a network of the broadcast signal.

2. The operating method according to claim 1, further comprising acquiring an attribute of a media component included in the media content from the MPD,
wherein the presenting of the media content based on the second signaling table and the MPD comprises presenting the media component based on the attribute of the media component.

3. The operating method according to claim 1,
wherein the broadcast signal includes plural data pipes carrying packets including the DASH formatted service components, the first signaling table, and the second signaling table, and
at least one packet includes a physical layer identifier of a data pipe in which the MPD is transmitted.

4. A broadcast reception device for receiving a broadcast signal, the broadcast reception device comprising:
a broadcast receiver configured to receive a broadcast signal including components of a service in Dynamic Adaptive Streaming over HTTP (DASH) format, a first signaling table for the service, and a second signaling table providing mapping between the service components and DASH representations found in a Media Presentation Description (MPD), wherein the second signaling table is different from the MPD.
the first signaling table including a service identifier identifying the service and location information to obtain the second signaling table and the MPD,
the second signaling table including a transport session id representing a transport session carrying one or more components and a DASH representation id representing each DASH representation corresponding to the one or more components carried in the transport session; and
a controller configured to obtain the first signaling table from the broadcast signal and to obtain the second signaling table and the MPD based on the first signaling table,
wherein the controller is further configured to present media content based on the second signaling table and the MPD, and
the MPD is transmitted in the broadcast signal or in a network which is different from a network of the broadcast signal.

5. A broadcast transmission device for transmitting a broadcast stream, the broadcast transmission device comprising:
an encoder configured to encode components of a service in Dynamic Adaptive Streaming over HTTP (DASH) format, a first signaling table for the service, and a second signaling table providing mapping between the service components and DASH representations found in a Media Presentation Description (MPD), wherein the second signaling table is different from the MPD,
the first signaling table including a service identifier identifying the service and location information to obtain the second signaling table and the MPD, and
the second signaling table including a transport session id representing a transport session carrying one or more components and a DASH representation id representing each DASH representation corresponding to the one or more components carried in the transport session; and
a transmitter configured to transmit a broadcast signal including the components, the first signaling table, and the second signaling table, wherein the MPD is transmitted in the broadcast signal or in a network which is different from a network of the broadcast signal.

6. An operating method of a broadcast transmission device, the method comprising:
encoding components of a service in Dynamic Adaptive Streaming over HTTP (DASH) format, a first signaling table for the service, and a second signaling table providing mapping between the service components and DASH representations found in a Media Presentation Description (MPD), wherein the second signaling table is different from the MPD,
the first signaling table including a service identifier identifying the service and location information to obtain the second signaling table and the MPD, and
the second signaling table including a transport session id representing a transport session carrying one or more components and a DASH representation id representing each DASH representation corresponding to the one or more components carried in the transport session; and
transmitting a broadcast signal including the components, the first signaling table, and the second signaling table,
wherein the MPD is transmitted in the broadcast signal or in a network which is different from a network of the broadcast signal.

* * * * *